United States Patent
Numako et al.

(10) Patent No.: US 6,366,737 B1
(45) Date of Patent: Apr. 2, 2002

(54) EXTERNAL FLASH CONTROL SYSTEM

(75) Inventors: Norio Numako, Tochigi; Masahiro Kawasaki, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,481

(22) Filed: Mar. 20, 2000

(30) Foreign Application Priority Data

Mar. 19, 1999 (JP) .......................................... P11-076232

(51) Int. Cl.⁷ .............................................. G03B 17/02
(52) U.S. Cl. ...................... 396/180; 396/171; 396/182; 396/56
(58) Field of Search ............................ 396/56, 57, 155, 396/171, 180, 182, 198; 315/241 P

(56) References Cited

U.S. PATENT DOCUMENTS

| | | |
|---|---|---|
| 4,368,966 A | 1/1983 | Hagyuda |
| 4,415,247 A | 11/1983 | Takematsu |
| 4,692,013 A | 9/1987 | Okino |
| 5,384,611 A * | 1/1995 | Tsuji et al. .................... 396/57 |
| 5,528,333 A | 6/1996 | Lee |
| 5,701,519 A * | 12/1997 | Fukuhara et al. ............. 396/48 |

FOREIGN PATENT DOCUMENTS

| | | |
|---|---|---|
| DE | 4022536 | 1/1991 |
| GB | 2087594 | 5/1982 |
| GB | 2150709 | 7/1985 |
| JP | 57-56831 | 4/1982 |
| JP | 4-343336 | 11/1992 |

* cited by examiner

Primary Examiner—Russell Adams
Assistant Examiner—Arthur A Smith
(74) Attorney, Agent, or Firm—Greenblum & Bernstein, P.L.C.

(57) ABSTRACT

A flash control system remotely controls an external flash by a camera. In the camera, a stop value is calculated as a photographic exposure factor for the external flash, and a flash-light emission timing of the external flash is calculated. A built-in flash of the camera is controlled to emit two light signals at a time interval representing the stop value. The external flash detects the two light signals. A timing of a flash-light emission of the external flash is controlled in accordance with one of the two light signals. An amount of the flash-light emission of the external flash is controlled in accordance with the time interval.

19 Claims, 33 Drawing Sheets

| Ev | EXPOSURE WAVE PROFILE | TEv | AVPEAK |
|---|---|---|---|
| : | : | : | 3.0 |
| 9 | △ ALM | T15 | 3.0 |
| 10 | △ AJK | T14 | 3.0 |
| 11 | △ AHI | T13 | 3.5 |
| 12 | △ AFG | T12 | 4.0 |
| 13 | △ ADE | T11 | 4.5 |
| 14 | △ ABC | T10 | 5.0 |
| : | : | : | : |

FIG. 18

| $A_VE$ | $TA_V$(ms) | $VA_V$(mV) | SIGNAL LEVEL OF P5 |
|---|---|---|---|
| (1) |  | 40 | 0 |
| 1.4 | 1.0 | 80 | 0 |
| 2 | 1.1 | 160 | 0 |
| 2.8 | 1.2 | 320 | 0 |
| 4 | 1.3 | 640 | 0 |
| 5.6 | 1.4 | 1280 | 0 |
| 8 | 1.5 | 2560 | 0 |
| (8) | (1.5) | (80) | (1) |
| 8.3 | 1.51 | 86 | 1 |
| 11 | 1.6 | 160 | 1 |
| 16 | 1.7 | 320 | 1 |
| 22 | 1.8 | 640 | 1 |
| 32 | 1.9 | 1280 | 1 |
| (44) |  | 2560 | 1 |

…

EXTERNAL FLASH CONTROL SYSTEM

BACKGROUND OF THE INVENTION

1. Field of the Invention

The present invention relates to a flash control system for remotely controlling a flash-light emission of an external flash device by a light signal output from a camera associated with the external flash device.

2. Description of the Related Art

Conventionally, a flash-light emission of an external flash device is remotely controlled by a camera in accordance with a so-called slave method. Namely, when a flash light is emitted from a built-in flash device of the camera, the emitted flash light serves as a trigger for initiating an flash-light emission of the external flash device.

In this external flash control system, an amount of the flash-light emission of the external flash device cannot be accurately controlled, because only a timing of the flash-light emission of the external flash device is adjusted, with the amount of the flash-light emission being fixed. Thus, it is difficult to provide highly accurate exposure in response to photographing conditions which are variable depending on an object-distance or the like.

SUMMARY OF THE INVENTION

Therefore, an object of the present invention is to provide a flash control system for remotely controlling a flash-light emission of an external flash device by a light signal output from a camera, in which both a timing and an amount of the flash-light emission are properly and accurately controllable.

In accordance with an aspect of the present invention, there is provided a flash control system for remotely controlling an external flash device by a camera associated with the external flash device. In the flash control system, the camera includes a stop value calculator that calculates a stop value as an exposure factor for the external flash device, a light signal source that emits a light signal, and a light signal controller that controls the light signal source to emit at least two light signals therefrom at a time interval such that the stop value is represented by the time interval between the two light signals. The external flash device includes a light signal detector that detects the two light signals emitted from the light signal source, and a flash-light emission controller that controls an amount of the flash-light emission of the external flash device in accordance with the time interval between the two light signals.

Preferably, in the flash control system, the camera further includes a flash-light emission timing calculator that calculates a flash-light emission timing at which a flash-light should be emitted from the external flash device. In this case, the light signal controller further controls an emission of one of the two light signals such that the flash-light emission timing is represented by the emission of the one of the two light signals, and the flash-light emission controller further controls a timing of the flash-light emission of the external flash device in accordance with the emission of the one of the two light signals. Preferably, the control of the timing of the flash-light emission of the external flash device by the flash-light emission controller is based on a last light signal of the two light signals.

The calculation of the stop value by the stop value calculator may be based on at least a photometry measurement performed by the camera upon photographing. Also, the light signal source may comprise a flash lamp of a built-in flash device incorporated in the camera.

Preferably, the flash-light emission controller includes a light detector that detects the flash-light emission of the external flash device as a reflected light, a first processor that processes the reflected light, detected by the light detector, to produce a first light-quantitative data representing an amount of the reflected light, a second processor that processes the time interval to produce a second light-quantitative data deriving from the stop value, and a comparator that compares the first light-quantitative data with the second light-quantitative data, such that the flash-light emission of the external flash device is stopped when it is determined by the comparator that the first-quantitative data coincides with the second light-quantitative data. The light detector may comprise the light signal detector for detecting the two light signals.

In accordance with another aspect of the present invention, there is provided an external flash device, which comprises a flash lamp that emits a flash-light, a light signal detector that detects two light signals emitted at a time interval rep-resenting a stop value as a photographic exposure factor, and a flash-light emission controller that controls an amount of a flash-light emission of the flash lamp in accordance with the time interval between the two light signals.

Preferably, the external flash device further comprises a timing controller that controls a timing of the flash-light emission of the flash lamp on the basis of a detected-timing at which one of the two light signals is detected by the light signal detector. Preferably, the control of the timing of the flash-light emission of the flash lamp by the flash-light emission controller is based on a last light signal of the at least two light signals.

Preferably, the flash-light emission controller includes a light detector that detects the flash-light emission of the external flash device as a reflected light, a first processor that processes the reflected light, detected by the light detector, to produce a first light-quantitative data representing an amount of the reflected light, a second processor that processes the time interval to produce a second light-quantitative data deriving from the stop value, and a comparator that compares the first light-quantitative data with the second light-quantitative data, such that the flash-light emission of the flash lamp is stopped when it is determined by the comparator that the first-quantitative data coincides with the second light-quantitative data. The light detector may comprise the light signal detector for detecting the at least two light signals.

In accordance with yet another aspect of the present invention, there is provided a camera, which comprises a stop value calculator that calculates a stop value as a photographic exposure factor for an external flash device, a light signal source that emits a light signal to the external flash device; and a light signal controller that controls the light signal source to emit at least two light signals therefrom at a time interval such that the stop value is represented by the time interval between the at least two light signals.

Preferably, the camera further comprises a flash-light emission timing calculator that calculates a flash-light emission timing at which a flash-light should be emitted from the external flash device. In this case, the light signal controller further controls the emission of the at least two light signals such that the flash-light emission timing is represented by an emission of one of the at least two light signals. Preferably, the control of the emission of the at least two light signals by the light signal controller is performed such that the flash-light emission timing is represented by an emission of a last light signal of the at least two light signals.

When the camera comprises a lens shutter type camera, a timing of the emission of the last light signal of the at least two light signals coincides with a time at which an aperture of a shutter of the lens shutter type camera reaches a maximum aperture during an opening-action of the shutter.

When the camera comprises a single lens reflex type camera, a timing of an emission of a first light signal of the at least two light signals coincides with a time, at which a leading shutter curtain of a focal-plane shutter of the single lens reflex type camera reaches an end position thereof.

BRIEF DESCRIPTION OF THE DRAWINGS

The object and other objects of the present invention will be better understood from the following description, with reference to the accompanying drawings, in which:

FIG. 18 is a table showing relationships between parameters for controlling the amount of the flash-light emission of the external flash device;

DESCRIPTION OF THE PREFERRED EMBODIMENTS

Figure 1:
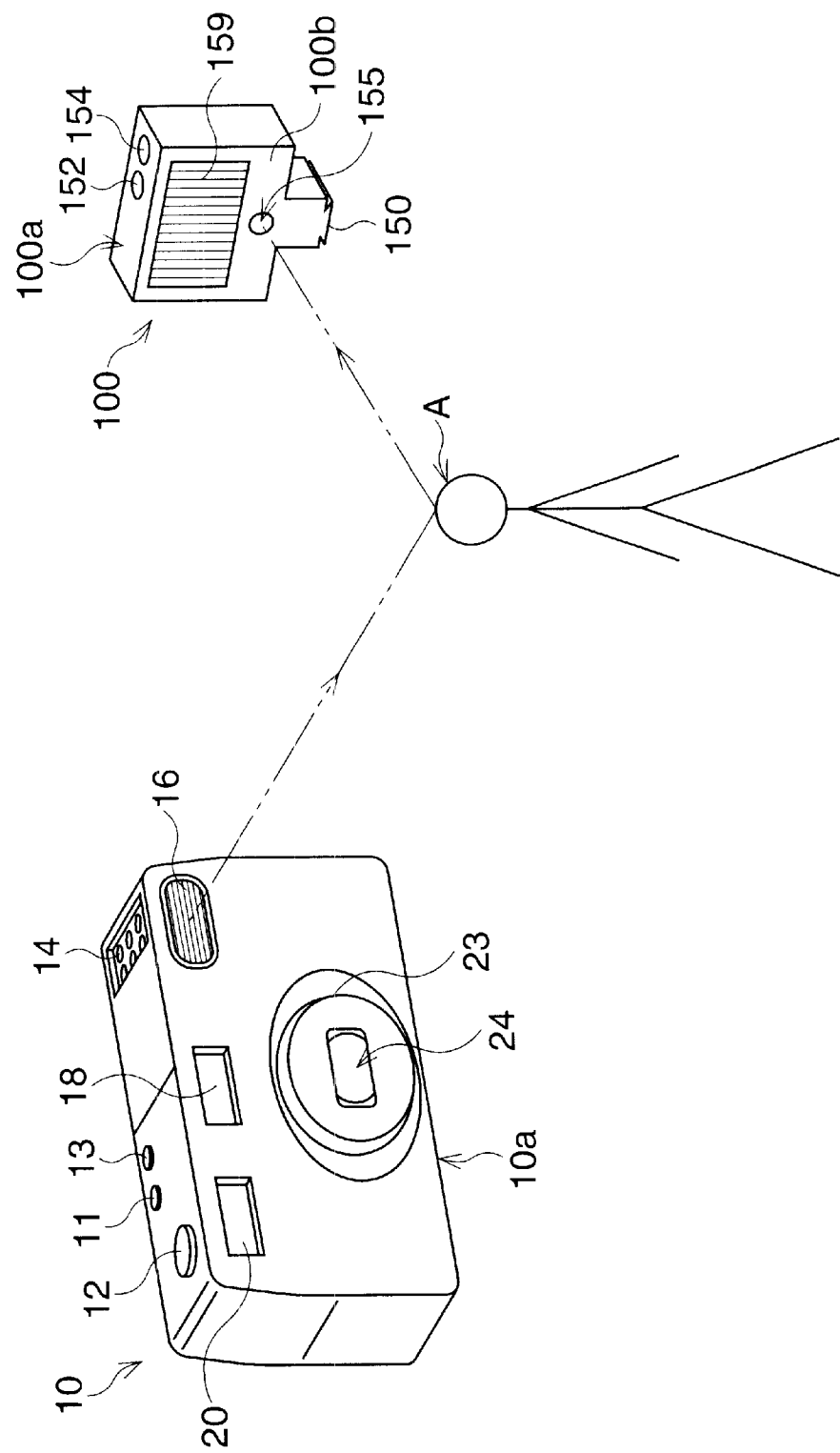
FIG. 1 is a perspective view schematically showing a situation in which an object is photographed by a lens shutter (LS) camera, using an external flash device, in accordance with a first embodiment of a flash control system of the present invention.

FIG. 1 schematically shows a situation in which an object A (person) is photographed by a camera 10, using an external flash device 100, and a flash-light-emission of the external flash device 100 is controlled by a first embodiment of a flash-control system according to the present invention. The camera 10 is formed as a lens-shutter (LS) type camera in which a shutter is incorporated in a photographing lens system.

As well known, in the LS type camera 10, the shutter comprises a plurality of blades which are radially and movably arranged so as to define continuously varying apertures. The shutter is usually closed, and thus no aperture is defined by the blades. While a photographing operation is performed, the shutter is opened by moving the blades such that an aperture of the shutter is gradually increased toward a given stop value. As soon as the aperture reaches the given stop value, the shutter is closed. Thus, the photographing operation can be executed with a proper exposure.

The camera 10 has an internal flash device or built-in flash device, and the built-in flash device is associated with a flash-window 16 provided in a front of a camera body 10a of the camera 10. Of course, when the built-in flash device is electrically activated, a flash-light is emitted through the flash-window 16. According to the present invention, a flash-light emission of the built-in flash device is also utilized to remotely control the external flash device 100 in a manner as stated in detail hereinafter.

As shown in FIG. 1, the camera 10 has a viewfinder window 18 and a photometry/distance measurement window 20 provided in the front of the camera body 10a. Of course, the viewfinder window 18 is formed as a part of a viewfinder optical system, and the photometry/distance measurement window 20 is associated with both a photometry measurement sensor and an object-distance measurement sensor.

The camera 10 also has a lens barrel 23 provided in the front of the camera body 10a and containing the photographing lens system, generally indicated by reference 24. The lens barrel 23 is movable between a retracted position, in which the lens barrel 23 is received in the camera body 10a, as shown in FIG. 1, and a projected position, in which the lens barrel 23 is moved from the retracted position. Of course, when a photographing operation is performed, the lens barrel 23 is at the projected position.

The camera 10 is provided with a power ON/OFF switch button 13, a release switch button 12 and a flash-mode selection switch button 11, and these switch buttons 13, 12 and 11 are suitably arranged on a top of the camera body 10a.

The power ON/OFF switch button 13 is formed as a transfer-type switch button, which is shiftable between an ON-side and an OFF-side. By shifting the power ON/OFF switch button 13 to the ON-side, the camera 10 is brought into a photographing-operation-enabling state, and, by shifting the power ON/OFF switch button 13 to the OFF-side, the camera 10 is brought into a photographing-operation-disabling state.

The release switch button 12 is formed as a self-return type switch button, which is manipulated in a two-step depression manner. Namely, when the release switch button 12 is partly depressed, a photometry measurement and an object-distance measurement are performed, and, when the release switch button 12 is fully depressed, a photographing operation is performed.

The flash-mode selection switch button 11 is also formed as a self-return switch button. By manipulating the flash-mode selection switch button 11, it is possible to select one of an automatic internal flash mode, an internal flash-OFF mode, an internal flash-ON mode and an external flash-ON mode. Namely, a selection of each individual flash mode is sequentially and cyclically switched in a given order by-every depressing of the flash-mode selection switch button 11. Note, in the situation as shown in FIG. 1, the external flash-ON mode is selected.

In the situation shown in FIG. 1, the external flash device 100 is utilized in a so-called wireless mode in which the external flash device 100 is separated from the camera 10. However, the external flash device 100 may be optionally utilized in a so-called clip-on mode in which the external flash device 100 is mounted on the top of the camera body 10a. To this end, a mount 14 for mounting the external flash device 100 on the camera 10 is provided in the top of the camera body 10a, and the external flash device 100 has a mount foot 150 which is detachably connected to the mount 14.

The external flash device 100 has a power ON/OFF switch button 154 and a mode selection switch button 152 provided on at a top of a body 100a thereof. Of course, the external flash device 100 is electrically powered ON by a turn-ON of the power ON/OFF switch button 154, and is electrically powered OFF by a turn-OFF of the power ON/OFF switch button 154. The mode selection switch button 152 is formed as a self-return type switch button. By manipulating the mode selection switch button 152, either the wireless mode or the clip-on mode is selected. Namely, a selection of each mode is alternately switched by every depressing of the mode selection switch button 152. Note, in the situation as shown in FIG. 1, the wireless mode is selected.

Also, the external flash device 100 has a flash window 159 provided on a front of the body 100a thereof, and the flash window 159 is associated with a flash lamp, such as a xenon lamp, contained in the body 100a. When the flash lamp is electrically energized, the flash-light is emitted from the flash lamp through the flash window 159. Further, the external flash device 100 has a light receiver 155 provided in the front of the body 100a thereof, and the light receiver 155 includes a photo-sensor, such as a photo-transistor.

When a photographing operation is performed in the situation as shown in FIG. 1, i.e. when the external flash-ON mode and the wireless mode are selected in the camera 10 and the external flash device 100, respectively, the built-in flash device of the camera 10 is used as a light-signal-producing source for controlling both an amount of flash-light-emission and a flash-timing of the external flash device 100.

When the release switch button 12 is partly depressed, an exposure factor for obtaining a proper exposure by a flash-light-emission of the external flash device 100 is calculated on the basis of a photometry measurement and an object-distance measurement performed by the partial depression of the release switch button 12. Then, when the release switch button 12 is fully depressed, an opening-action of the shutter is started. In the first embodiment, during the opening-action of the shutter, a light-pulse signal is twice emitted from the built-in flash device of the camera 10 to the external flash device 100 such that the calculated exposure factor, which determines an amount of a flash-light to be emitted from the external flash device 100, is represented by a time interval between the twice-emitted light-pulse signals, i.e. the first light-pulse signal and the second light-pulse signal, and such that the second light-pulse signal serves as a flash-timing signal for initiating a flash-light emission of the external flash device 100.

The first and second light-pulse signals, emitted from the built-in flash device, are made incident on the object A, and are then reflected toward the external flash device 100, as shown by a double-chained line in FIG. 1. The reflected light-pulse signals are received by the light receiver 155 of the external flash device 100, and are then processed such that a flash-light emission of the external flash device 100 is initiated upon receiving the second light-pulse signal, and such that the flash-light emission of the external flash device 100 is continued until a total amount of the flash-light-emission reaches a value calculated on the basis of the exposure factor, represented by the time interval between the first light-pulse signal and the second light-pulse signal.

Note, if necessary, the first light-pulse signal may be utilized as the flash-timing signal for the flash-light emission of the external flash device 100. Of course, in this case, the flash-light emission of the external flash device 100 is initiated after a given time period has elapsed from a time at which the second light-pulse signal is received by the light receiver 155.

Figure 2:
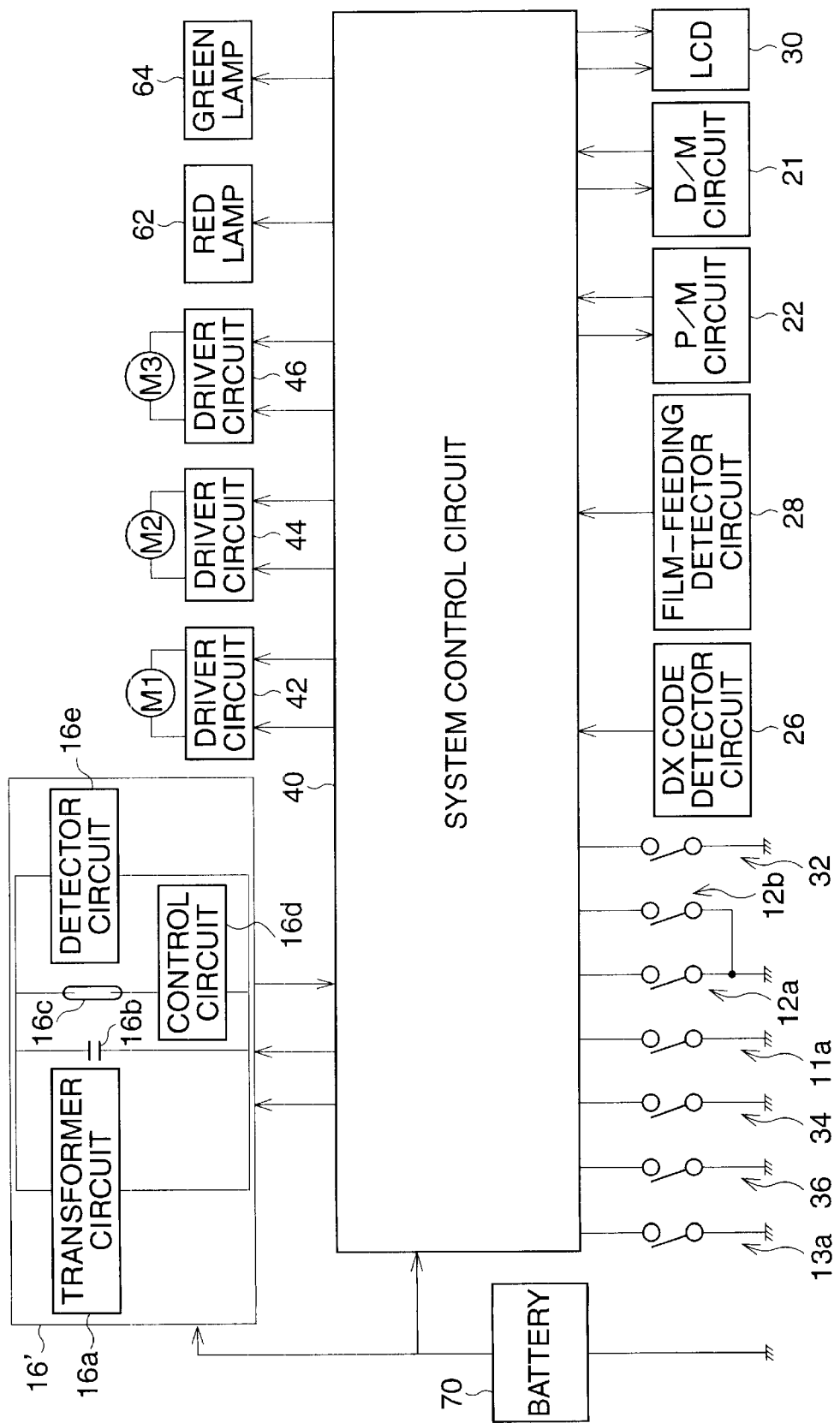
FIG. 2 is a schematic block diagram of the LS camera.

FIG. 2 schematically shows a block diagram of the camera 10. The camera 10 is provided with a system control circuit 40, which may be constituted as a microcomputer, used to control the camera 10 as a whole, comprising, for example, a central processing unit (CPU), a read-only memory (ROM) for storing programs and constants, a random-access memory (RAM) for storing temporary data, and an input/output interface circuit (I/O).

The system control circuit 40 is electrically powered by a battery 70, and the power ON/OFF switch button 13, formed as a transfer-type switch button, is associated with a power ON/OFF switch 13a, which is turned ON by shifting the power switch button 13 to the ON-side, and which is turned OFF by shifting the power switch button 13 to the OFF-side. As long as the battery 70 is in an active state, it is monitored by the system control circuit 40 whether the camera 10 is in the photographing-operation-enabling state (i.e. ON-state) or the photographing-operation-disabling state (i.e. OFF-state) by the turn-ON and the turn-OFF of the power ON/OFF switch 13a.

In particular, when the power ON/OFF switch 13a is turned ON, the lens barrel 23 is moved from the retracted position (FIG. 1) to the projected position, whereby the camera 10 is set in the photographing-operation-enabling state. When the power ON/OFF switch 13a is turned OFF, the lens barrel 23 is returned from the projected position to the retracted position (FIG. 1), whereby the camera 10 is set in the photographing-operation-disabling state.

In FIG. 2, the built-in flash device, associated with the flash-window 16, is generally indicated by reference 16', and is electrically powered by the battery 70. The built-in flash device 16' includes a flash lamp 16c, such as a xenon lamp, a main capacitor 16b for electrically energizing the flash lamp 16c, and a step-up transformer circuit 16a for increasing an output voltage of the battery 70 to develop a voltage high enough to electrically charge the main capacitor 16b.

The built-in flash device 16' also includes a flash-light-emission control circuit 16d for controlling the energization of the flash lamp 16c, i.e. a turn-ON and a turn-OFF of the flash lamp 16c. For example, the flash-light-emission control circuit has an insulated-gate bipolar transistor (IGBT) incorporated therein, and the control of the energization of the flash lamp 16c is performed by switching ON and OFF the IGBT.

Further, the built-in flash device 16' includes a charge-voltage detector circuit 16e for detecting a charge voltage of the main capacitor 16b, and the charge-voltage detector circuit 16e outputs a signal representing the charge voltage of the main capacitor 16b. The output signal is retrieved, as a charge voltage data, by the system control circuit 40, such that the charging of the main capacitor 16b is properly controlled.

Note, the main capacitor 16b must be charged to, for example, 270 volts, before the xenon lamp 16c can be electrically energized so as to emit a flash-light therefrom. Namely, 270 volts represents a minimum voltage at which the xenon lamp 16c can emit a flash-light.

In FIG. 2, reference 36 indicates a back-cover switch for detecting whether a back-cover of the camera body 10a is opened or closed. When the back-cover is closed, the switch 36 is turned ON, and, when the back-cover is opened, the switch 36 is turned OFF. By detecting a change of the state of the back-cover switch 36, it is possible to determine whether a film cartridge has been loaded in the camera 10. Namely, when the back-cover switch 36 is changed from the OFF-state to the ON-state, it is possible to reckon that the loading of the film cartridge has been performed.

The back-cover switch 36 is associated with a DX code detector circuit 26. When the back-cover switch 36 is changed from the OFF-state to the ON-state, i.e. when a film cartridge is loaded in the camera 10, a DX code data, which represents a sensitivity of a photographic film concerned, is read from the loaded film cartridge by the DX code detector circuit 26, and is then retrieved by the system control circuit 40.

Also, the back-cover switch 36 is associated with a driver circuit 42 for driving a film-feeding motor M1, and the driver circuit 42 is operated under control of the system control circuit 40. When the loading of the film cartridge, i.e. the change of the back-cover switch 36 from the OFF-state to the ON-state is detected by the system control circuit 40, the driver circuit 42 is operated, thereby driving the film-feeding motor M1 such that the film is drawn out of the film cartridge by a predetermined length, and thus a first frame of the film is positioned onto a photographing plane.

Of course, whenever a photographing operation is completed, the film-feeding motor M1 is automatically driven by the driver circuit 42 such that the film is fed from the film cartridge by a length corresponding to one frame. Namely, the camera 10 is provided with a film-feeding detector circuit 28 for detecting a feeding of one frame of the film. When the feeding of one frame of the film is detected by the film-feeding detector circuit 28, the driving of the film-feeding motor M1 is stopped.

In FIG. 2, reference 34 indicates a film-rewinding switch, and this switch 34 is operated by a film-rewinding switch button, which may be provided in a bottom of the camera body 10a. The film-rewinding switch 34 is associated with the driver circuit 42 for driving the film-feeding motor M1. When the film-rewinding switch 34 is turned ON, the film-feeding motor M1 is reversely driven such that the film is forcibly rewound in the film cartridge. Further, after the last frame of the film is exposed by a photographing operation, the film-feeding motor M1 is reversely driven for rewinding all the film in the film cartridge. Note, it is detected by the film-feeding detector circuit 28 whether the rewinding of the film is completed.

The release switch button 12 is associated with both a photometry measurement switch 12a and a release switch 12b. Namely, when the release switch button 12 is partly depressed, the photometry measurement switch 12a is turned ON, and, when the release switch button 12 is fully depressed, the release switch 12b is turned ON.

The photometry measurement switch 12a is associated with both a photometry measurement circuit 22 and a distance measurement circuit 21 containing the aforesaid photometry measurement sensor and the aforesaid distance measurement sensor, respectively, associated with the photometry/distance measurement window 20. The photometry measurement circuit 22 detects an intensity of light, reflected from the object A (FIG. 1), through the window 20, thereby producing a luminance signal representing a luminance of the object A. The distance measurement circuit 22 detects an object-distance to the object A, thereby producing an object-distance signal representing the object-distance to the object A. The respective luminance signal and object-distance signal are suitably retrieved as a luminance data and an object-distance data by the system control circuit 40, in which a proper exposure value data is calculated on the basis of the luminance data, the object-distance data and the DX code data.

The release switch 12b is associated with a driver circuit 44 for driving a focusing motor M2, and the driver circuit 44 is operated under control of the system control circuit 40 to drive the focusing motor M2, which is associated with an automatic focusing mechanism incorporated in the photographing lens system 24. When the release switch 12b is turned ON, the automatic focusing mechanism is actuated by driving the motor M2 such that the photographing lens system 24 is moved from an initial position in accordance with the object-distance data, obtained from the distance measurement circuit 21, until the object A is focused on the photographing plane defined in the camera 10.

Further, the release switch 12b is associated with a driver circuit 46 for driving a shutter motor M3, and the driver circuit 46 is operated under control of the system control circuit 40 to drive the shutter motor M3, which is associated with the shutter incorporated in the photographing lens system 24. When the release switch 12b is turned ON, the shutter is actuated by the shutter motor M3 such that a photographing operation is performed with a given exposure time determined on the basis of the calculated proper exposure value. Namely, during the photographing operation, the shutter is opened and closed by the shutter motor M3 such that the given exposure time can be obtained.

The shutter is associated with a shutter switch 32. When the shutter is in an initial-state or closed-state, no aperture is defined by the blades. When an opening-action of the shutter is started, the shutter switch 32 is turned ON. The opening-action of the shutter is continued until an aperture reaches a given stop value, and then the shutter is closed. When the aperture of the shutter is completely closed, the shutter switch 32 is turned OFF. The ON-state and OFF-state of the shutter switch 32 is monitored by the system control circuit 40 to control the driving of the shutter motor M3.

The flash-mode selection switch button 11 is associated with a flash-mode selection switch 11a, which is turned ON by a depression of the flash-mode selection switch button 11. As mentioned above, by manipulating the flash-mode selection switch button 11, one of the automatic internal flash mode, the internal flash-OFF mode, the internal flash-ON mode and the external flash-ON mode is selected. Namely, a selection of each individual flash mode is sequentially and cyclically switched in a given order by every turning ON of the flash-mode selection switch 11a.

In FIG. 2, reference 30 indicates a liquid crystal display (LCD) 30 which is provided in a suitable location of the camera body 10a. The LCD 30 is operated under control of the system control circuit 40, and displays various messages regarding a selected flash mode, a number of frames of a loaded film cartridge and so on.

Also, in FIG. 2, respective references 62 and 64 indicate a red lamp and a green lamp, each of which is provided in a suitable location on the camera body 10a. Each of the red and green lamps 62 and 64 is suitably lit or blinked ON and OFF to announce a predetermined message, as stated in detail hereinafter.

When either the automatic internal flash mode or the internal flash-ON mode is selected by manipulating the flash-mode selection switch button 11, i.e. when a photographing operation is performed by emitting a flash-light from the built-in flash device 16' for the purpose of exposure, a first stop value, corresponding to a flash-light-emission aperture, is calculated by the system control circuit 40 on the basis of a photographic film sensitivity data (DX code data) obtained from the DX code detector circuit 26, an object-distance data obtained from the object-distance measurement circuit 21, and a charge voltage data of the main capacitor 16b obtained from the detector circuit 16e.

Note, the flash-light-emission aperture is defined as an aperture of the shutter at which a flash-light emission of the built-in flash device 16' is started during an opening-action of the shutter in the automatic internal flash mode or the internal flash-ON mode.

Also, in the system control, circuit 40, a duration of shutter-open time is calculated on the basis of an exposure value as calculated in the aforesaid manner. Note, the duration of shutter-open time is defined as a duration of time counted from a time, at which an opening-action of the shutter is started, to a time, at which a closing-action of the shutter is started.

After the calculations of the first stop value and duration of shutter-open time, the shutter motor M3 is driven by the driver circuit 46, whereby an opening-action of the shutter is started at a constant speed. When an aperture of the shutter reaches the calculated flash-light-emission aperture, a flash-light is immediately emitted from the built-in flash device 16'. Thereafter, when the calculated duration of shutter-open time has elapsed, the shutter motor M3 is reversely driven so that a closing-action of the shutter is started at a higher speed than the opening-action of the shutter. Thus, it is possible to achieve the photographing operation with a proper exposure by utilizing the built-in flash lamp 16'.

When the external flash-ON mode and the wireless mode are selected in the camera 10 and the external flash device 100, respectively, i.e when a photographing operation is performed by emitting a flash-light from the external flash device 100 for the purpose of exposure (FIG. 1), a second stop value, corresponding to a maximum aperture determined by an exposure value as calculated in the aforesaid manner, is calculated by the system control circuit 40, and a flash-light emission of the external flash device 100 is started at the second stop value.

Thereafter, the shutter motor M3 is driven by the driver circuit 46, whereby an opening-action of the shutter is started at a constant speed. During the opening-action of the shutter, a flash-light is twice emitted as a light-pulse signal from the built-in flash device 16' on the basis of the calculated second stop value, such that the second stop value is represented by a time interval between the twice-emitted light-pulse signals: the first light-pulse signal and the second light-pulse signal, and such that the second light-pulse signal serves as a flash-timing signal for initiating a flash-light-emission of the external flash device 100. In short, the second stop value is transmitted to the external flash device 100 as the exposure factor for obtaining the proper exposure by the flash-light-emission of the external flash device 100.

As already stated, the first and second light-pulse signals, emitted from the built-in flash device 16', are received by the light receiver 155 of the external flash device 100, and are then processed such that a flash-light-emission of the external flash device 100 is initiated upon receiving the second light-pulse signal, and such that the flash-light-emission of the external flash device 100 is continued until a total amount of the flash-light-emission reaches a value represented by the exposure factor or time interval between the first light-pulse signal and the second light-pulse signal. Note, in the first embodiment, of course, the second light-pulse signal is emitted from the built-in flash device 16' when an aperture of the shutter reaches the maximum aperture corresponding to the second stop value.

Figure 3:
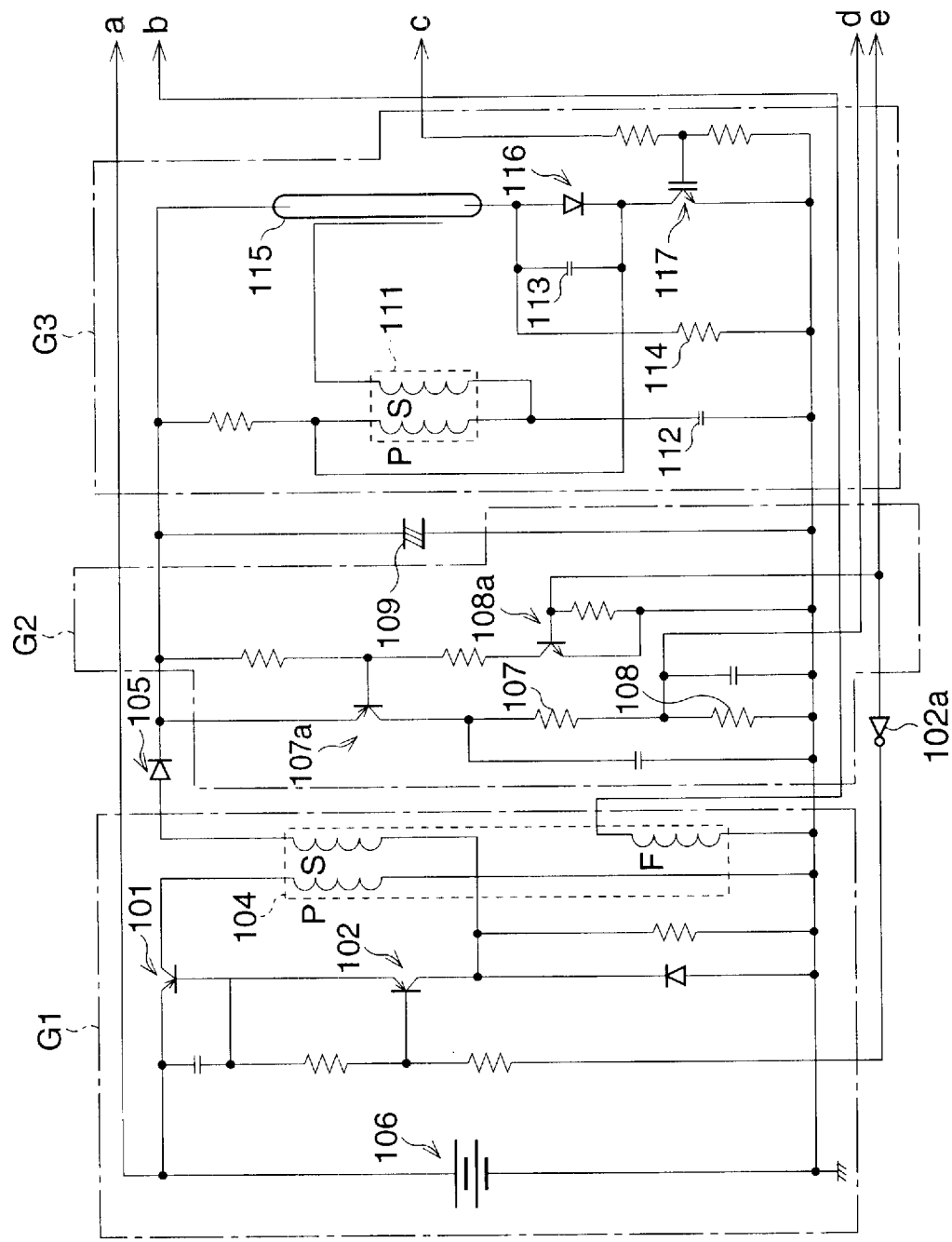
FIG. 3 is a part of a wiring diagram of the external flash device.
Figure 4:
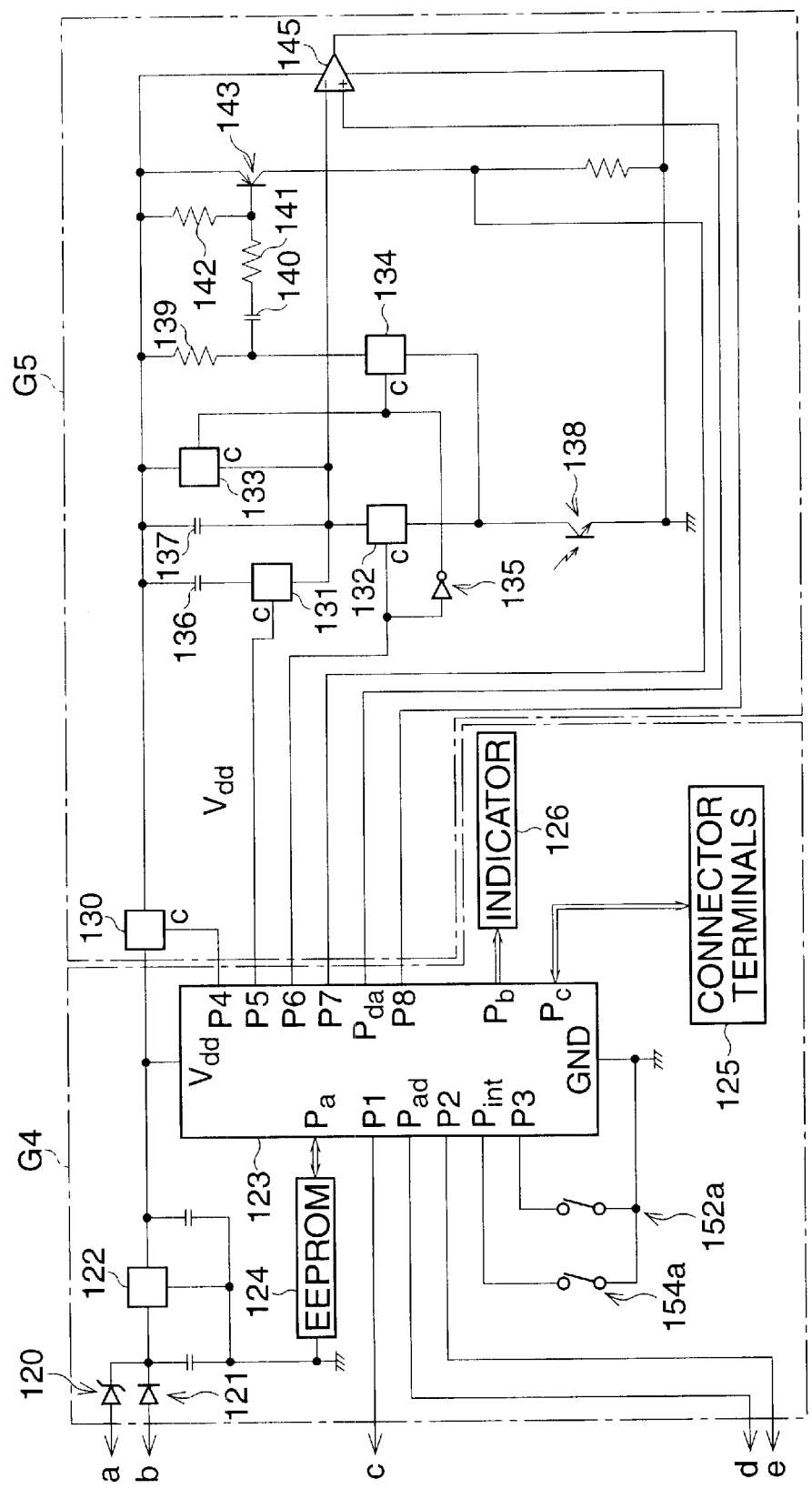
FIG. 4 is the remaining part of the wiring diagram of the external flash device.

FIGS. 3 and 4 show a wiring diagram of the external flash device 100. Note, respective terminals a, b, c and d shown in FIG. 3 are connected to terminals a, b, c and d shown in FIG. 4. The wiring diagram shown in FIGS. 3 and 4 may be sectioned into five sections indicated by references G1, G2, G3, G4 and G5, respectively.

The respective power ON/OFF switch button 154 and mode selection switch button 152, shown in FIG. 1, are associated with a power ON/OFF switch 154a and a mode selection switch 152a included in the section G4. Also, the xenon lamp contained in the body 100a of the external flash device 100 is indicated by reference 115 in the section G3, and the photo-transistor included in the light receiver 155 is indicated by reference 138 in the section G5. A main capacitor 109 for electrically energizing the xenon lamp 115 is arranged and illustrated between the sections G2 and G3, and a detachable battery 106 for electrically powering the external flash device 100 is included in the section G1.

The section G4 forms a controller for controlling the external flash device 100 as a whole. The controller G4 includes a central processing unit (CPU) 123 and peripheral elements thereof. As shown in FIG. 4, the CPU 123 has a plurality of ports indicated by references $P_a$, P1, $P_{ad}$, P2, $P_{int}$, P3, P4, P5, P6, P7, $P_{da}$, P8, $P_b$ and $P_c$.

Each of the ports P1, P2, P4, P5 and P6 is formed as an output port, from which either a high level signal [1] or a low level signal [0] is suitably output. Namely, a signal level of each output port (P1, P2, P4, P5, P6) is suitably alternated between a low level [0] and a high level [1].

Each of the ports $P_{int}$, P3, P7 and P8 is formed as an input port, to which either a high level signal [1] or a low level signal [0] is suitably input. Namely, a signal level of each input port ($P_{int}$, P3, P7, P8) is suitably alternated between a low level [0] and a high level [1].

The port $P_{ad}$ is formed as an analog-to-digital (A/D) converter port. Namely, an analog signal is retrieved, as a digital data, by the CPU 123 via the A/D converter port $P_{ad}$.

The port $P_{da}$ is formed as a digital-to-analog (D/A) converter port. Namely, a digital data is output, as an analog signal, from the CPU 123 via the D/A converter port $P_{da}$.

The port $P_a$ is formed as an I/O port, and is connected to an electrically erasable read-only memory (EEPROM) 124 storing various data, such as flash-light-emission correction data for the external flash device 100.

The port $P_b$ is formed as an I/O port, and connected to various indicators, provided on the body 100a of the external flash device 100, one of which is representatively indicated by reference 126. The indicator 126 is used to announce whether an electrical charge of the main capacitor 109 is completed. For example, the indicator 126 comprises a light-emitting diode (LED) which is lit when the electrical charge of the main capacitor 109 is not completed.

The port $P_c$ is formed as an I/O port, and is connected to connecter terminals 125 provided in the mount foot 150 (FIG. 1). When the clip-on mode is selected by manipulating the mode selection switch button 152, i.e when the external flash device is mounted on the camera body 10a, the CPU 123 is connected to the system control circuit 40 through the connector terminals 125.

The CPU 123 also has a power terminal $V_{dd}$ connected to the battery 106 through a regulator 122 and a Schottky diode 120, and is grounded through a ground terminal GND. When the power ON/OFF switch 154a, connected to the input port $P_{int}$, is turned ON by depressing the power ON/OFF switch button 154 (FIG. 1), an ON-signal or high level signal [1] is input to the input port $P_{int}$, thereby electrically energizing the CPU 123.

As shown in FIG. 4, the mode selection switch 152 is connected to the input port P3. Whenever the mode selection switch 152a is turned ON by depressing the mode selection switch button 152 (FIG. 1), an ON-signal or high level signal [1] is input to the input port P3, thereby alternately switching the selection of the wireless mode and the clip-on mode. As already stated, in the situation as shown in FIG. 1, the wireless mode is selected.

The section G1 is formed as a step-up circuit including an oscillation circuit having transistors 101 and 102, and a step-up transformer, generally indicated by reference 104, and the transformer 104 is electrically powered by the battery 106 through the oscillation circuit, thereby developing a voltage high enough to electrically charge the main capacitor 109.

In particular, when a high level signal [1] is output from the output port P2, i.e. when a signal level of the output port P2 is changed from a low level [0] to a high level [1], a low level signal is input to the base of the transistor 102 due to an existence of an invertor 102a (FIG. 4), so that the transistor 102 is turned ON, thereby producing an emitter current in the transistor 102. Then, the transistor 101 is turned ON, due to the production of the emitter current in the transistor 102, and thus a current flows through a primary winding P of the transformer 104, thereby developing a high voltage in a secondary winding S of the transformer 104. The developed high voltage is applied to the main capacitor 109 through a diode 105. When the transformer 104 is magnetically saturated, the transistor 101 is temporarily turned OFF. In short, the turn-ON and the turn-OFF of the transistor 101 are repeated such that the high voltages are successively applied to the main capacitor 109, thereby an electrical charge of the main capacitor 109 is performed.

Note, the transformer 104 is provided with a subsidiary winding F, and a voltage, developed in the subsidiary winding F, is applied to the regulator 122 through a diode 121. Thus, it is possible to prevent a change in voltage of the power terminal $V_{dd}$ of the CPU 123, even if a drop in the voltage of the battery 106 occurs during the charging of the main capacitor 109.

The section G2 is formed as a charge-voltage detector circuit for detecting a charge voltage of the main capacitor 109. As is apparent from FIG. 3, the charge-voltage detector circuit G2, including resistors 107 and 108, transistors 107a and 108a and so on, is constituted such that an electrical connection is established between the main capacitor 109 and the resistors 107 and 108 while the charging of the main capacitor 109 is performed due to the outputting of the high level signal from the output port P2.

Thus, the charge voltage of the main capacitor 109 is divided by the resistors 107 and 108 into two divided voltages, each of which represents the charge voltage of the main capacitor 109. One of the divided voltages is input to the A/D converter port $P_{ad}$ of the CPU 123. Namely, the divided voltage is suitably retrieved, as a digital charge voltage data representing the charge voltage of the main capacitor 109, from the charge-voltage detector circuit G2, thereby properly controlling the charging of the main capacitor 109. For example, the main capacitor 109 is charged until the charge voltage thereof becomes, for example, 330 volts.

The section G3 is formed as a flash-light-emission control circuit for controlling an electrical energization of the xenon lamp 115, i.e. a flash-light-emission of the xenon lamp 115. The flash-light-emission control circuit G3 includes a trigger transformer 111 having a primary winding P and a secondary winding S, capacitors 112 and 113, a diode 116, an insulated-gate bipolar transistor (IGBT) 117 and so on, and starting and stopping of the flash-light-emission of the xenon lamp 115 are controlled by turning the IGBT 117 ON and OFF.

When the charge voltage of the main capacitor 109 reaches 330 volts, i.e. the main capacitor 109 is completely charged, and when the IGBT 117 is turned ON by an outputting of a high-level signal [1] from the output port P1, an oscillation is caused between the capacitor 112 and the primary winding P of the trigger transformer 111, thereby developing a high voltage in the secondary winding S of the trigger transformer 111, resulting in a flash-light-emission of the xenon lamp 115. At this time, a cathode potential of the diode 116 becomes zero, and thus both the voltage of the capacitor 113 and the charge voltage of the main capacitor 109 are applied to the xenon lamp 115. The voltage of the capacitor 113 is equal to the charge voltage of the main capacitor 109, and thus the xenon lamp 115 is subjected to an application of twice as much voltage as the charge voltage of the main capacitor 109, whereby the flash-light-emission of the xenon lamp 115 can be performed in a stable condition. Of course, when the IGBT 117 is turned OFF by an outputting of the low-level signal [0] from the output port P1, the flash-light-emission of the xenon lamp 115 is stopped.

The section G5 is formed as a light-receiver circuit associated with the light receiver 155 for detecting a light-pulse signal (a reflected light from the object A) emitted from the built-in flash device 16' of the camera 10 and an amount of flash-light-emission of the external flash device 100. Thus, the photo-transistor 138 of the light receiver 155 forms a part of the light-receiver circuit G5.

The light-receiver circuit G5 includes an analog switch 130, a control terminal C of which is connected to the output port P4. When a signal level of the output port P4 is changed from a low level [0] to a high level [1], the analog switch 130 is turned ON, whereby the light-receiver circuit G5 is electrically energized.

The light-receiver circuit G5 also includes analog switches 131, 132, 133 and 134. Control terminals C of the analog switches 131 and 132 are connected to the output ports P5 and P6, respectively, and each of control terminals C of the analog switches 133 and 134 is connected to the output port P6 via an inverter 135.

When a signal level of the output port P5 is maintained at a low level [0], the analog switch 131 is in an OFF-state. Of course, when the signal level of the output port P5 is changed from the low level [0] to a high level [1], the analog switch 131 is turned ON.

When a signal level of the output port P6 is maintained at a low level [0], the analog switch 132 is in an OFF-state, but the analog switches 133 and 134 are in an ON-state, due to the existence of the inverter 135. Of course, when the signal level of the output port P6 is changed from the low level [0] to a high level [1], the analog switch 132 is turned ON, and the analog switches 133 and 134 are turned OFF.

As is apparent from FIG. 4, the light-receiver circuit G5 is provided with a differentiating circuit for detecting a light-pulse signal emitted from the built-in flash device 16' of the camera 10. Namely, the differentiating circuit is formed by a capacitor 140, and resistors 141 and 142, and is associated with a resistor 139 and a transistor 143. The collector of the photo-transistor 138 is connected to the resistor 139 and the capacitor 140 via the analog switch 134. Thus, when the signal level of the output port P6 is maintained at the low level [0], i.e. when the analog switch 134 is in the ON-state, an electrical connection is established between the collector of the photo-transistor 138 and the resistor 139 and capacitor 140.

Accordingly, when the light-pulse signal, emitted from the built-in flash device 16', is detected by the photo-transistor 138, a collector current is produced in the photo-transistor 138, and is fed to the differentiating circuit, resulting in an application of a voltage to the base of the transistor 143. When the voltage exceeds a predetermined threshold, the transistor 143 is turned ON, and is then turned OFF immediately. Namely, the ON-state of the transistor 143 remains for only a very short time corresponding to an emission-time of the light-pulse signal.

Note, a light-amount of the light-pulse signal, emitted from the built-in flash device 16', is previously set such that the voltage sufficiently exceeds the predetermined threshold, and thus, even though ordinary external light is detected by the photo-transistor 138, the transistor 143 cannot be turned ON.

While the ON-state of the transistor 143 remains for only the very short time corresponding to the emission-time of the light-pulse signal, a signal level of the input port P7, connected to the collector of the transistor 143, is changed from a low level [0] to a high level [1]. Namely, the CPU 123 detects the emission of the light-pulse signal from the built-in flash device 16' by detecting the change of the signal level of the input port P7.

Accordingly, as mentioned above, when the first light-pulse signal and the second light-pulse signal are emitted from the built-in flash device 16', the CPU 123 detects the time interval, representing the second stop value, between the first light-pulse signal and the second light-pulse signal. Also, when the emission of the second light-pulse signal is detected by the CPU 123, the signal level of the output port P1 is changed from the low level [0] to the high level [1], thereby turning ON the IGBT 117, resulting in a flash-light emission of the xenon lamp 115.

The light-receiver circuit G5 is also provided with a set of capacitors 136 and 137, arranged in parallel, in order to detect an amount of the flash-light-emission of the flash lamp 115 by the photo-transistor 138 of the light receiver 155. The capacitor 136 has a capacitance considerably larger than that of the capacitor 137. Namely, for example, in the first embodiment, a ratio of the capacitor 137 to the capacitor 136 in capacitance is 1:31. The collector of the photo-transistor 138 is connected to the capacitor 137 via the analog switch 132, and is further connected to the capacitor 136 via both the analog switches 132 and 131.

When the analog switch 131 is in the OFF-state (P5=0), and when the analog switch 132 is in the ON-state (P6=1), an electrical connection is established between the collector of the photo-transistor 138 and the capacitor 137 exhibiting a small capacitance. When both the analog switches 131 and 132 are in the ON-state (P5=1 and P6=1), an electrical connection is established between the collector of the photo-transistor 138 and both the capacitors 136 and 137 exhibiting a sum of the capacitances of the capacitors 136 and 137. Namely, the latter is equivalent to a case where the collector of the photo-transistor 138 is connected to a capacitor exhibiting a large capacitance which is 32 times that of the capacitor 137.

When the flash-light-emission of the flash lamp 115 is detected as a reflected light by the photo-transistor 138 of the light receiver 155, a collector current is produced in the photo-transistor 138. The produced collector current is accumulated in either only the capacitor 137 or both the capacitors 136 and 137, and thus a charge voltage is developed in either only the capacitor 137 or both the capacitors 136 and 137. In particular, when an amount of the flash-lightemission of the flash lamp 115, to be detected, is small, the produced collector current is accumulated in only the capacitor 137. On the other hand, when an amount of the flash-light-emission of the flash lamp 115, to be detected, is large, the produced collector current is accumulated in both the capacitors 136 and 137. Of course, in any event, a charge voltage is developed in either only the capacitor 137 or both the capacitors 136 and 137, and the amount of the flash-light-emission of the flash lamp 115 is represented by the developed voltage.

Note, the electrical charges of the capacitor 137 are discharged by turning ON the analog switch 133, and the electrical charges of the capacitor 136 are discharged by turning ON the analog switches 131 and 133. Of course, while the charges of the capacitors 136 and 137 are discharged, the analog switch 132 is in the OFF-state.

The light-receiver circuit G5 is further provided with a comparator 145 associated with the capacitors 136 and 137, and the comparator 145 has a first input terminal, indicated by a "minus symbol", a second input terminal, indicated by a "plus symbol", and an output terminal. The first input terminal of the comparator 145 is directly connected to the capacitor 137, and is also connected to the capacitor 136 via the analog switch 131. Namely, the charge voltage, developed in either only the capacitor 137 or both the capacitors 136 and 137, is applied to the first input terminal of the comparator 145. The second input terminal of the comparator 145 is connected to the D/A converter port $P_{da}$, and the output terminal of the comparator 145 is connected to the input port P8.

The D/A converter port $P_{da}$ outputs a reference voltage to the second input terminal of the comparator 145. The reference voltage is prepared by the CPU 123 on the basis of the time interval between the first light-pulse signal and the second light-pulse signal. As stated above, since the second stop value is represented by the time interval between the first light-pulse signal and the second light-pulse signal, the reference voltage also represents the second stop value. Thus, the charge voltage, developed in either only the capacitor 137 or both the capacitors 136 and 137, is compared with the reference voltage representing the second stop value.

When the charge voltage is less than the reference voltage, a low level signal [0] is output from the output terminal of the comparator 145 to the input port P8. When the charge voltage reaches the reference voltage, a high level signal [1] is output from the output terminal of the comparator 145 to the input port P8. When a signal level of the input port P8 is changed from the low level [0] to the high level [1], the signal level of the output port P1 is changed from the high level [1] to the low level [0], thereby stopping the flash-light emission of the xenon lamp 115. Namely, an amount of the flash-light emission from the xenon lamp 115 corresponds to the second stop value.

Figure 5:
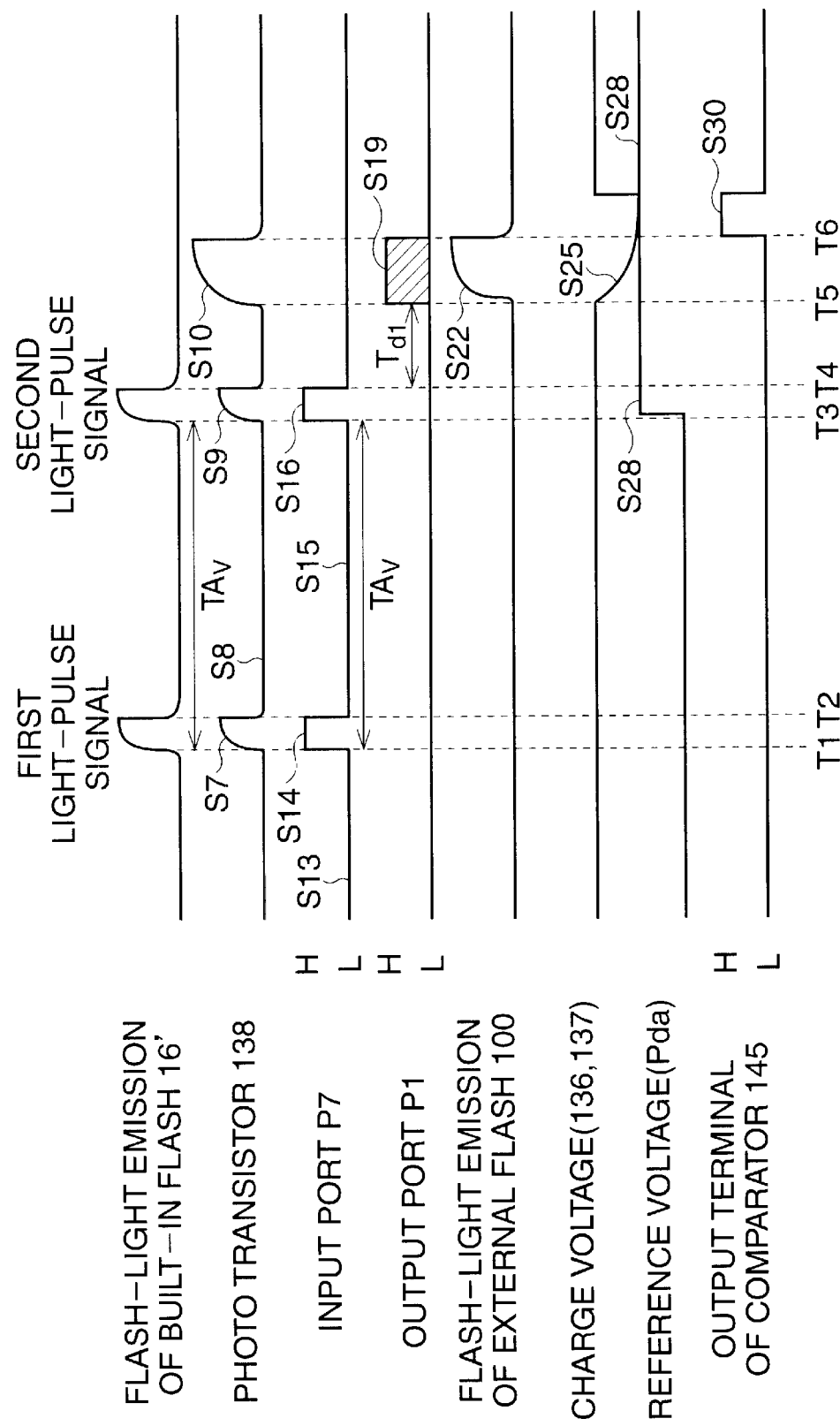
FIG. 5 is a timing chart showing a control of both a timing and an amount of a flash-light emission of the external flash device according to the first embodiment of the flash control system of the present invention.

FIG. 5 shows a timing chart in which the flash-light emission of the external flash device 100 is performed in the wireless mode. Of course, in this case, the external flash-ON mode is selected in the camera 10.

As stated above, in the external flash-ON mode (camera 10) and the wireless mode (external flash device 100), the light-pulse signal is twice emitted from the built-in flash device 16'. As shown in the timing chart of FIG. 5, the first light-pulse signal is emitted at a time of T1, and then the second light-pulse signal is emitted at a time of T3. A time interval between the first and second light-pulse signals, indicated by reference $TA_V$, represents the aforesaid second stop value, and the second light-pulse signal serves as a flash-timing signal for initiating the flash-light-emission of the external flash device 100.

The first light-pulse signal, emitted from the built-in flash device 16', is reflected by the object A, and then is made incident on the light receiver 155. The incident light-pulse signal is detected by the photo-transistor 138, and thus a collector current is produced in the photo-transistor 138, as indicated by reference S7, thereby turning ON the transistor 143 (P6=0), resulting in a change of the signal level of the input port P7 from the low level [0], indicated by reference S13, to the high level [1], indicated by reference S14. At this time, the CPU 123 starts a measurement of the time interval $TA_V$.

The emission of the first light-pulse signal from the built-in flash device 16' ends at a time of T2. Namely, the emission of the first light-pulse signal continues over a short time interval between the times of T1 and T2, and thus the collector current is continuously produced during the short time interval, thereby maintaining the signal level of the input port P7 at the high level [1] therebetween.

When the emission of the first light-pulse signal is completed, the production of the collector current in the photo-transistor 138 expires. Namely, the collector current becomes zero in the photo-transistor 138, as indicated by reference S8, thereby turning OFF the transistor 143, resulting in a return of the signal level of the input port P7 to the low level [0], as indicated by reference S15.

When the time of T3 has been reached, i.e. when the time interval $TA_V$ has elapsed, the emission of the second light-pulse signal from the built-in flash device 16' starts. Similar to the emission of the first light-pulse signal, the emission of the second light-pulse signal is detected by the photo-transistor 138, and thus a collector current is again produced in the photo-transistor 138, as indicated reference S9, thereby tuning ON the transistor 143. Namely, the signal level of the input port P7 is again changed from the low level [0], indicated by reference S15, to the high level [1], indicated by reference S16. At this time, the measurement of the time interval $TA_V$ is completed by the CPU 123.

After the detection of the emission of the second light-pulse signal, i.e. after the completion of the measurement of the time interval $TA_V$, a reference voltage is calculated by the CPU 123 on the basis of the measurement of the time interval $TA_V$, and is then output from the D/A converter port $P_{da}$ to the second input terminal of the comparator 145, as indicated by reference S28.

Similar to the emission of the first light-pulse signal, the emission of the second light-pulse signal from the built-in flash device 16' ends at a time of T4. Namely, the emission of the second light-pulse signal continues over a short time interval between the times of T3 and T4, and thus the collector current is continuously produced during the short time interval, thereby maintaining the signal level of the input port P7 at the high level [1] therebetween.

When the emission of the second light-pulse signal is completed, the production of the collector current in the photo-transistor 138 expires. Namely, the collector current becomes zero in the photo-transistor 138, thereby turning OFF the transistor 143, resulting in a return of the signal level of the input port P7 to the low level [0].

As soon as the signal level of the input port P7 returns to the low level [0], the signal level of the output port P1 is changed from the low level [0] to the high level [1], as indicated by reference S19, thereby turning ON the IGBT 117, resulting in a flash-light emission of the xenon lamp 115 of the external flash device 100, as indicated by reference S22.

Note, in the timing chart of FIG. 5, although the change of the signal level of the output port P1 from the low level [0] to the high level [1] is caused at a time of T5 when a time period $T_{d1}$ has elapsed from the time of T4, the time period $T_{d1}$ is as short as to be negligible. The time period $T_{d1}$ is merely provided for the convenience of illustration of the timing chart of FIG. 5. Namely, due to the provision of the time period $T_{d1}$, some pulse-waves can be averted from being too close to each other on the timing chart. In short, the times of T4 and T5 substantially coincide with each other.

By the change of the signal level of the output port P1 from the low level [0] to the high level [1], the IGBT 117 is turned ON, whereby an flash-light emission of the xenon lamp 115 starts, as indicated by reference S22. The flash-light, emitted from the xenon lamp 115, is detected as a reflected light by the photo-transistor 138 of the light receiver 155. Thus, a collector current is produced in the photo-transistor 138, as indicated by reference S10.

On the other hand, when the change of the signal level of the output port P1 from the low level [0] to the high level [1] is caused, the signal level of the output port P6 is simultaneously changed from the low level [0] to the high level [1], thereby turning ON the analog switch 132. Also, if necessary, the signal level of the output port P5 is changed from the low level [0] to the high level [1], thereby turning ON the analog switch 131. Namely, the produced collector current is accumulated in either only the capacitor 137 or both the capacitors 136 and 137, thereby developing a charge voltage therein. The developed charge voltage is gradually increased as indicated by reference S25, and is input to the first input terminal of the comparator 145.

Thus, in the comparator 145, the charge voltage, developed in either only the capacitor 137 or both the capacitors 136 and 137, is compared with the reference voltage representing the second stop value. At a time of T6 when the charge voltage (S25) reaches the reference voltage (S28), i.e. when a total amount of the flash-light emission from the xenon lamp 115 reaches a proper amount of light represented by the second stop value, a signal level of the output terminal of the comparator 145 is changed from a low level [0] to a high level [1], as indicated by reference S30. Then, when the high level signal [1] is input to the input port P8, the signal level of the output port P1 is returned from the high level [1] to the low level [0], thereby turning OFF the IGBT 117, resulting in stoppage of the flash-light emission from the xenon lamp 115. Thus, the object A is exposed with the proper amount of light represented by the second stop value.

When the flash-light emission from the xenon lamp 115 is stopped, the signal level of the output port P6 is changed from the high level [1] to the low level [0], thereby turning ON the analog switch 133, and thus the electrical charges are discharged from the capacitor 137. Of course, if both the capacitors 136 and 137 are charged during the flash-light emission of the xenon lamp 115, the electrical charges are discharged from the both capacitors 136 and 137.

During the detection of the flash-light emission from the xenon lamp 115, the photo-transistor 138 also detects external light. Nevertheless, an amount of the external light is negligible, because the amount of the detected external light is very small in comparison with the amount of the flash-light emission from the xenon lamp 115 to be detected.

Figure 6:
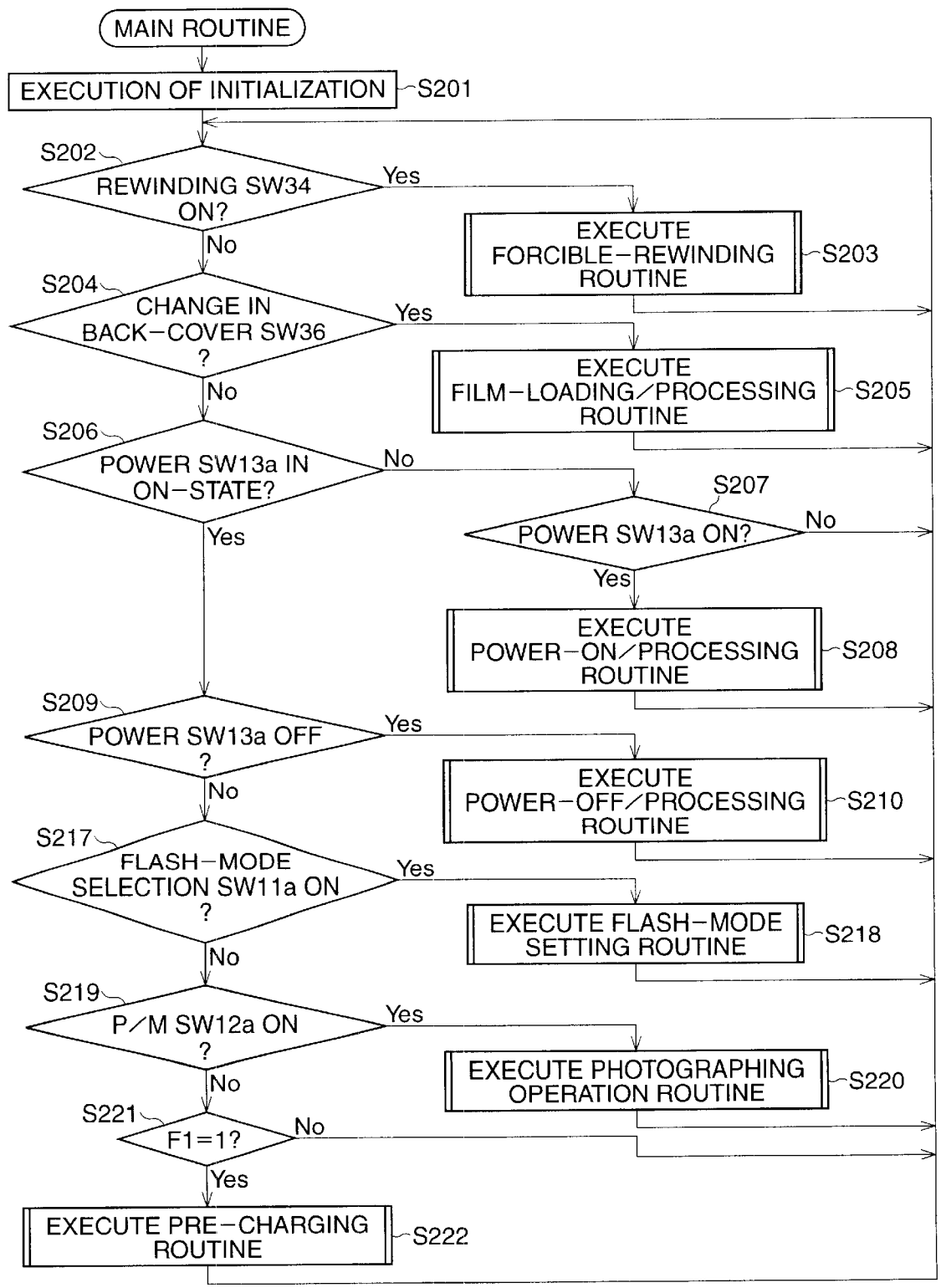
FIG. 6 is a flowchart of a main control routine executed in a system control circuit of the LS camera.

FIG. 6 shows a flowchart of a main routine executed in the system control circuit 40 of the camera 10. Namely, the camera 10 operates in accordance with the main routine. The main routine is constituted as a loop routine repeatedly executed at a predetermined time interval, and an execution of the main routine is started by loading the battery 70 into the camera 10, regardless of the turn-ON and the turn-OFF of the power ON/OFF switch 13a.

At step S201, the system control circuit 40 is subjected to initialization. Namely, the system control circuit 40 includes various elements, such as CPU, RAM, input ports, output ports, registers and so on, and these elements are initialized.

At step S202, it is determined whether the film-rewinding switch 34 has been turned ON. When the turn-ON of the switch 34 is confirmed, the control proceeds to step S203, in which a forcible-rewinding routine is executed. Namely, the film, loaded in the camera 10, is forcibly rewound. It is detected by the film-feeding detector circuit 28 whether the rewinding of the film has been completed.

At step S202, if the film-rewinding switch 34 is in the OFF-state, the control proceeds to step S204, in which it is determined whether a change of the back-cover switch 36 has occurred. When the back-cover switch 36 has changed from an OFF-state to an ON-state, i.e. when it is reckoned that a loading of a film cartridge has been performed, the control proceeds to step S205, in which a film-loading/processing routine, involved in the loading of the film cartridge, is executed.

In executing the film-loading/processing routine, first, a film counter, contained in the system control circuit 40, is reset to "0" when the back-cover switch 36 is turned OFF (i.e. when the back-cover is opened). Note, a counting result of the film counter is displayed on the LCD 30. Also, the driver circuit 42 is operated, thereby driving the film-feeding motor M1 such that the film is drawn out of the film cartridge by a predetermined length, and thus a first frame of the film is positioned onto the photographing plane. Further, a DX code data, representing a sensitivity of the film, is read from the loaded film cartridge by the DX code detector circuit 26.

At step S204, when a change has not occurred in the back-cover switch 36, the control proceeds to step S206, in which it is determined whether the power ON/OFF switch 13a is in an ON-state. When the power ON/OFF switch 13a is in an OFF-state, the control proceeds to step S207, in which it is determined whether the power ON/OFF switch 13a has been turned ON. When the power ON/OFF switch 13a is in the OFF-state, the control returns to step S202.

On the other hand, at step S207, when the turn-ON of the power ON/OFF switch 13a is confirmed, the control proceeds to step S208, in which a power-ON/processing routine, involved in the turn-ON of the power ON/OFF switch 13a, is executed. In executing the power-ON/processing routine, the lens barrel 23 is moved from the retracted position to the projected position, whereby the camera 10 is set in the photographing-operation-enabling state. Thereafter, the control returns to step S202.

At step S206, when the power ON/OFF switch 13a is in the ON-state, the control proceeds to step S209, in which it is determined whether the power ON/OFF switch 13a has been turned OFF. When the turn-OFF of the power ON/OFF switch 13a is confirmed, the control proceeds to step S210, in which a power-OFF/processing routine, involved in the turn-OFF of the power ON/OFF switch 13a, is executed. In executing the power-OFF/processing routine, the lens barrel 23 is returned from the projected position to the retracted position, whereby the camera 10 is set in the photographing-operation-disabling state. Further, various functions of the camera 10 are initialized.

At step S209, when the turn-OFF of the power ON/OFF switch 13a is not confirmed, i.e. when the power ON/OFF switch 13a is in the ON-state, the control proceeds to step S217, in which it is determined whether the flash-mode selection switch 11a has been turned ON by a depression of the flash-mode selection switch button 11. When the turn-ON of the flash-mode selection switch 11a is confirmed, the control proceeds to step S218, in which a flash-mode setting routine is executed. In an execution of the flash-mode setting routine, one of the automatic internal flash mode, the internal flash-OFF mode, the internal flash-ON mode and the external flash-ON mode is selected and set. As mentioned above, the selection of each individual flash mode is sequentially and cyclically switched in a given order by every turning ON of the flash-mode selection switch 11a. After the selected flash mode is set, the control returns to step S202.

At step 217, when the turn-ON of the flash-mode selection switch 11a is not confirmed, the control proceeds to step S219, in which it is determined whether the photometry measurement switch 12a has been turned ON, i.e. whether the release switch button 12 has been partly depressed. When the turn-ON of the photometry measurement switch 12a is confirmed, the control proceeds to step S220, in which a photographing operation routine is executed. Of course, when the photometry measurement switch 12a is turned ON, both the object-distance measurement circuit 21 and the photometry measurement circuit 22 are electrically energized. Namely, an object-distance to the object A and a luminance of the object A are respectively measured by the circuits 21 and 22, thereby producing an object-distance signal and a luminance signal in the circuits 21 and 22.

Note, the photographing operation routine is explained in detail hereinafter with reference to FIGS. 7 and 8.

At step 217, when the turn-ON of the flash-mode selection switch 11a is not confirmed, the control proceeds to step S221, in which it is determined whether a flag F1 is "1" or "0". The flag F1 indicates whether an electrical charging of the main capacitor 16b of the built-in flash device 16' is required. Namely, when the charge-requiring flag F1 is given a setting of "1", the electrical charging of the main capacitor 16b is required, and, when the charge-requiring flag F1 is given a setting of "0", the electrical charging of the main capacitor 16b is not required. Note, when the battery 70 is loaded into the camera 10, the charge-requiring flag F1 is initialized to be "1" at step S201.

At step 221, if F1=1, the control proceeds to step S222, in which a pre-charging routine is executed for performing the electrical charging of the main capacitor 16b, whereby the built-in flash device 16' is made available for a flash-light emission. On the other hand, if F1=0, the control returns to step S202.

Note, the pre-charging routine is explained in detail hereinafter with reference to FIG. 9.

After the power-ON/processing routine (S208) is executed or after a photographing operation is performed with a flash-light emission of the built-in flash device 16', the charge-requiring flag F1 is made to be "1" for the electrical charging of the main capacitor 16b. When the electrical charging of the main capacitor 16b is completed, the charge-requiring flag F1 is made to be "0".

Figure 7:
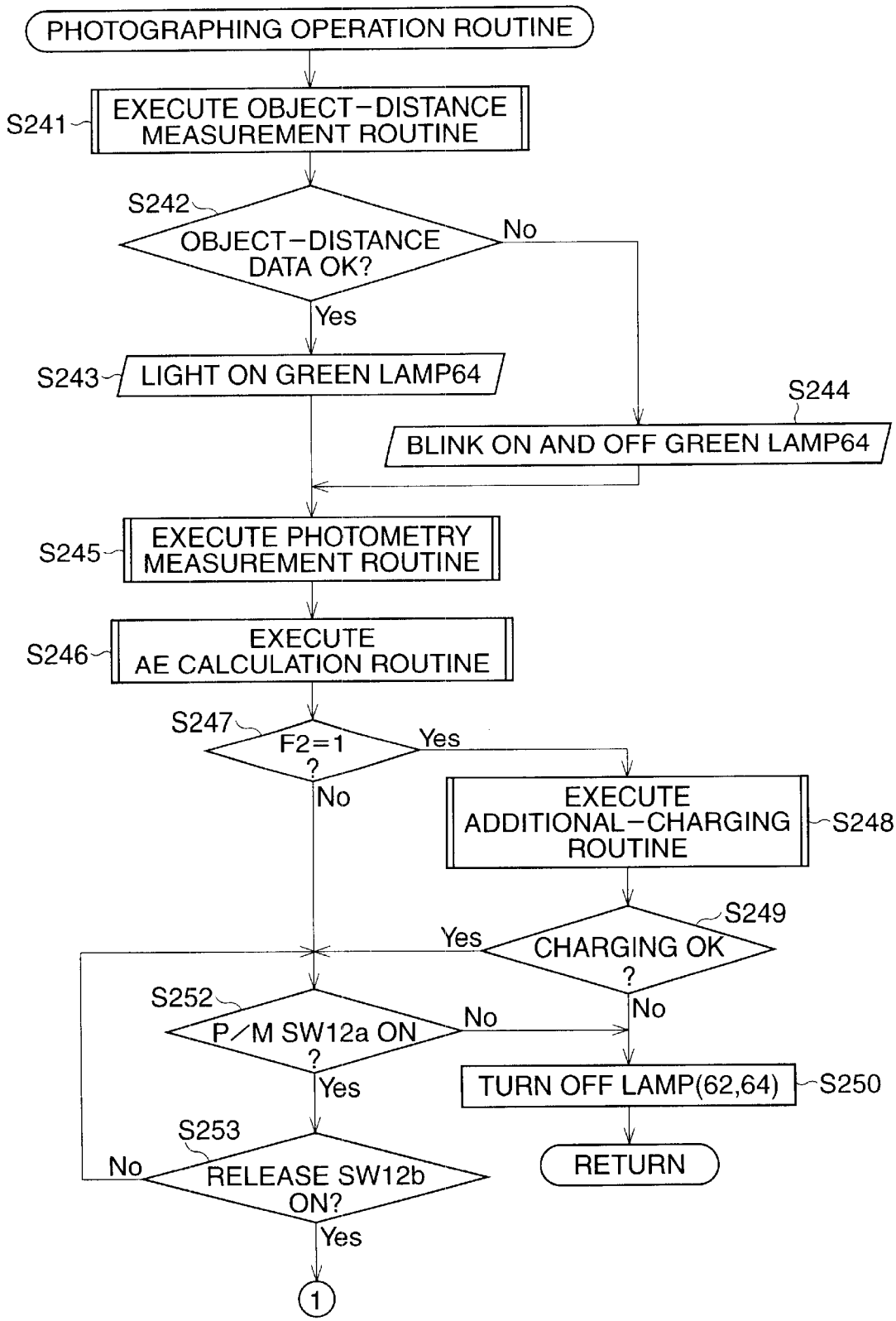
FIG. 7 is a part of a flowchart of a photographing operation routine executed in the main routine of FIG. 6.
Figure 8:
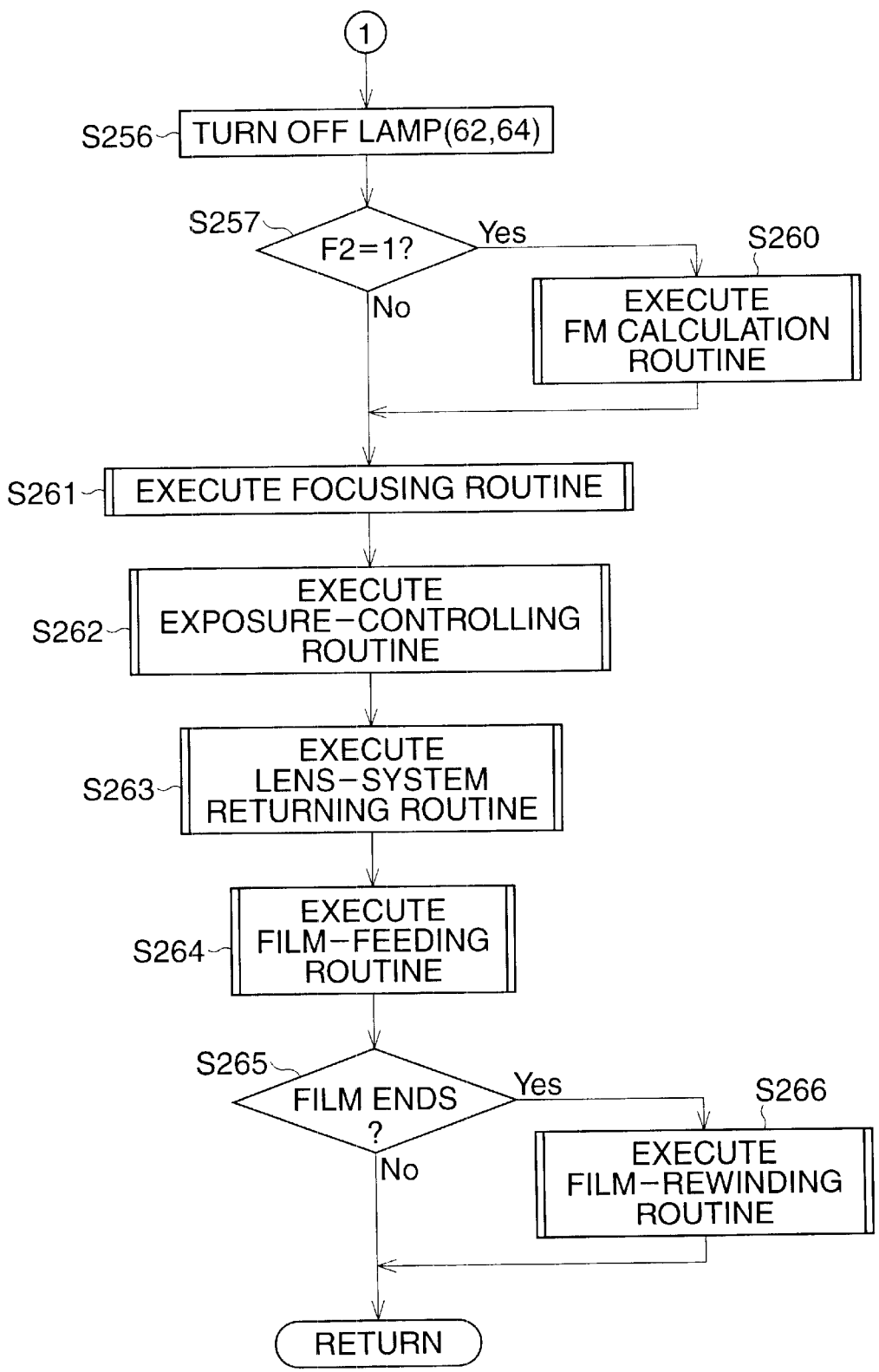
FIG. 8 is the remaining part of the flowchart of the photographing operation routine executed in the main routine of FIG. 6.

FIGS. 7 and 8 show a flowchart of the photographing operation routine executed in step S220 of the main routine of FIG. 6.

At step S241, an object-distance measurement routine is executed, whereby the object-distance signal, representing the object-distance to the object A, is retrieved as an object-distance data from the object-distance measurement circuit 21 by the system control circuit 40. Then, at step S242, it is determined whether the retrieved object-distance data falls in a focusing-permissible range in which a focusing of the object is available. Namely, it is determined whether the object A to be photographed is located within a focusing-allowable distance range.

When the retrieved object-distance data falls in the focusing-permissible range, the control proceeds to step S243, in which the green lamp 64 is lit, thereby announcing that a photographing is possible. On the other hand, when the retrieved object-distance data is out of the focusing-permissible range, the control proceeds to step S244, in which the green lamp 64 is blinked ON and OFF, thereby announcing that a photographing is impossible.

In either event, at step S245, a photometry measurement routine is executed, whereby the luminance signal, which represents the luminance of the object A, is retrieved as a luminance data from the photometry measurement circuit 22 by the system control circuit 40. Then, at step S246, an automatic-exposure (AE) calculation routine is executed, whereby an exposure value is calculated on the basis of the retrieved luminance data. The calculated exposure value is utilized to determine whether the built-in flash device 16' should be allowed to emit a flash-light when the automatic internal flash mode is set.

Note, the AE calculation routine is explained in detail hereinafter with reference to FIG. 11.

At step S247, it is determined whether a flag F2 is "1" or "0". The flag F2 indicates whether the built-in flash device 16' should be allowed to emit a flash-light for illumination of the object A or for transmittance of a light-pulse signal to the external flash device 100. Namely, when the flash-allowing flag F2 is given a setting of "1", the built-in flash device 16' should be allowed to emit the flash-light, and, when the flash-allowing flag F2 is given a setting of "0", the built-in flash device 16' should be not allowed to emit the flash-light.

At step S247, if F2=1, the control proceeds to step S248, in which an additional-charging routine is executed for performing an additional-electrical charging of the main capacitor 16b such that the built-in flash device 16' is allowed to emit a flash-light in a photographing operation.

Note, the additional-charging routine is explained in detail hereinafter with reference to FIG. 10. At a beginning of an execution of the additional-charging routine, the red lamp 62 is blinked ON and OFF to announce that the built-in flash device 16' is in the course of the additional-electric charging state. When the additional charging of the main capacitor 16b is properly performed, the red lamp 62 is changed from the blinking-ON/OFF state to an ON-state. On the other hand, when the additional charging of the main capacitor 16b is improperly performed, the red lamp 62 is changed from the blinking-ON/OFF state to an OFF-state.

At step S249, it is determined whether the additional charging of the main capacitor 16b has been properly performed. When the performance of the additional charging of the main capacitor 16b is proper, the control proceeds to step S252. On the other hand, at step S247, if F2=0, i.e. if the built-in flash device 16' should be not allowed to emit the flash-light, the control directly proceeds to step S252.

At step S252, it is determined whether the photometry measurement switch 12a is still in the ON-state. When the photometry measurement switch 12a is in the ON-state, the control proceeds to step S253, in which it is determined whether the release switch 12b has been turned ON, i.e. whether the release switch button 12 has been fully depressed. If the release switch 12b is in the OFF-state, the control returns to step S252.

Namely, the routine comprising steps S252 and S253 is repeated until the release switch 12b is turned ON. During the execution of the routine comprising steps S252 and S253, if the photometry measurement switch 12a is turned OFF, i.e. if the partial depression of the release switch button 12 is emancipated, due to, for example, the photographing operation concerned being canceled, the control proceeds from step S252 to step S250, in which the green lamp 64 is turned OFF, with the red lamp 62 being also turned OFF, if lit. Then, the control returns to the main routine of FIG. 6.

Note, at step S249, if it is determined that the performance of the additional charging of the main capacitor 16b (S248) is improper, the control proceeds from step S249 to step S250, in which the green lamp 64 is turned OFF. Then, the control returns to the main routine of FIG. 6.

At step S253, when the turn-ON of the release switch 12b is confirmed, the control proceeds to step S256, in which the green lamp 64 is turned OFF, with the red lamp 62 being also turned OFF, if lit.

Then, at step S257, it is again determined whether the flash-allowing flag F2 is "1" or "0". If F2=1, i.e. if the built-in flash device 16' should be allowed to emit the flash-light, the control proceeds from step S257 to step S260, in which a flashmatic (FM) calculation routine is executed. Then, the control proceeds to step S261.

Note, the FM calculation routine is explained in detail hereinafter with reference to FIG. 12.

When the photographing operation concerned should be performed by emitting the flash-light from the built-in flash device 16', the first stop value, corresponding to a flash-light-emission aperture of the shutter, is calculated by the execution of the FM calculation routine. Note, as already stated, the flash-light-emission aperture is defined as an aperture of the shutter at which a flash-light is emitted from the built-in flash device 16' during an opening-action of the shutter.

On the other hand, when the photographing operation concerned is performed by emitting the flash-light from the external flash device 100 (FIG. 1), the second stop value, corresponding to a maximum aperture of the shutter during an opening-action of the shutter, is calculated by the execution of the FM calculation routine, and a flash-light emission of the external flash device 100 is initiated when an aperture of the shutter reaches the maximum aperture, as stated in detail hereinafter.

On the other hand, at step S257, if F2=0, i.e. if the built-in flash device 16' should be not allowed to emit the flash-light, the control directly proceeds to step S261.

At step S261, a focusing routine is executed. In the execution of the focusing routine, the focusing motor M2 is driven in accordance with the object-distance data obtained in step S241, thereby actuating the automatic focusing mechanism such that the photographing lens system 24 is moved from the initial position until the object A is focused on the photographing plane defined in the camera 10.

Then, at step S262, an exposure-controlling routine is executed. In executing the exposure-controlling routine, the shutter motor M3 is driven in accordance with the calculated results, obtained by the execution of the AE calculation routine (S246), thereby actuating the shutter such that the object A is photographed with a given proper exposure. Of course, if either the built-in flash device 16' or the external flash device 100 is required to emit the flash-light, the flash-light emission is performed in accordance with the calculated results obtained by the execution of the FM calculation routine (S260).

Note, the exposure-controlling routine is explained in detail hereinafter with reference to FIG. 15.

After the execution of the exposure-controlling routine is completed, the control proceeds to step S263, in which a lens-system returning routine is executed. In the execution of the lens-system returning routine, the focusing motor M2 is driven such that the photographing lens system 24 is returned to the initial position.

At step S264, a film-feeding routine is executed. In the execution of the film-feeding routine, the film-feeding motor M1 is driven such that the film is wound on from the film cartridge by a length corresponding to one frame. Then, at step S265, it is determined whether the film has ended. If more film remains, the control returns to the main routine of FIG. 6. At step S265, if the end of the film is confirmed, the control proceeds to step S266, in which a film-rewinding routine is executed, whereby the film-feeding motor M1 is reversely driven until the film is rewound.

Figure 9:
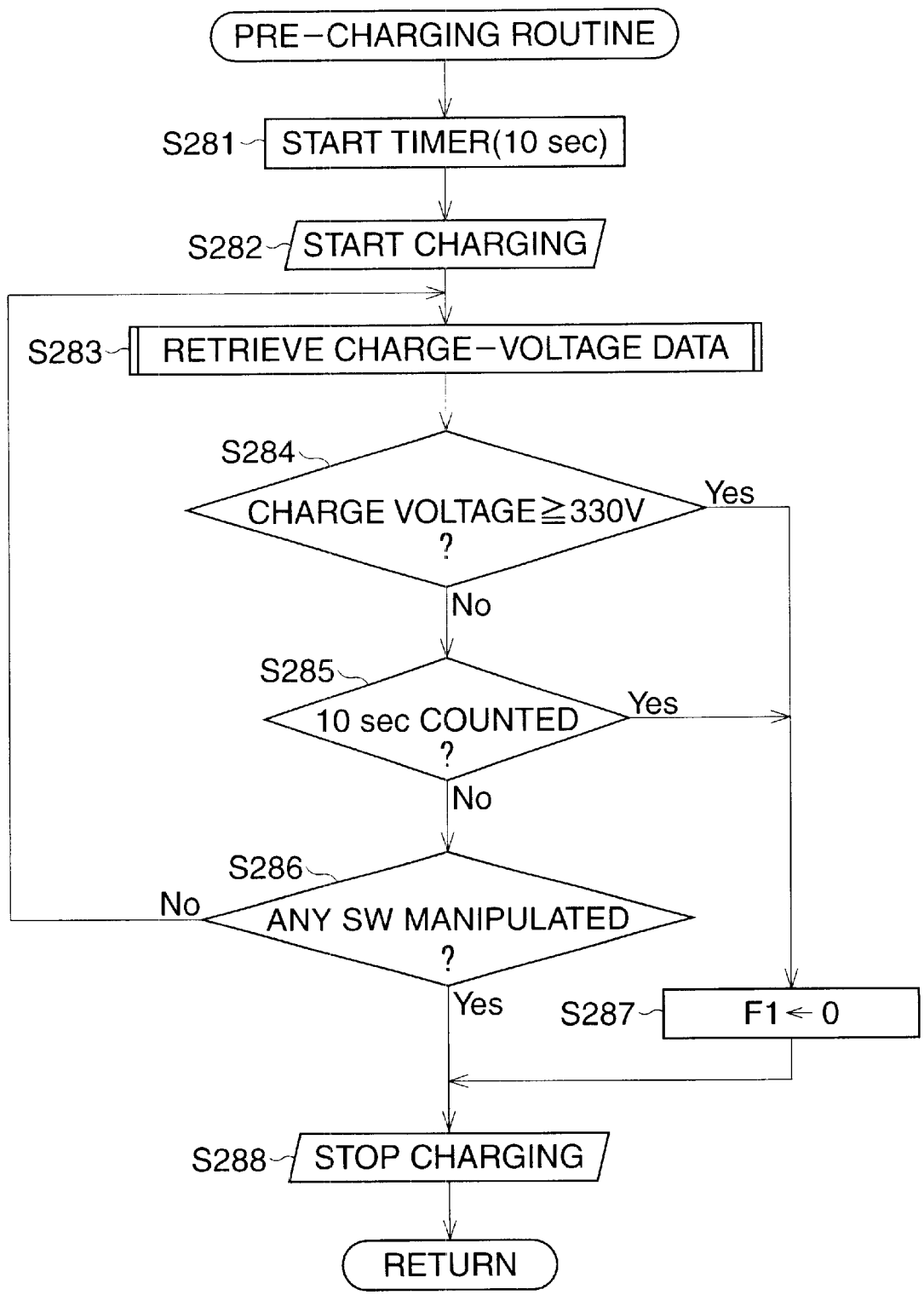
FIG. 9 is a flowchart of a pre-charging routine executed in the executed in the main routine of FIG. 6.

FIG. 9 shows a flowchart of the pre-charging routine executed in step S222 of the main routine of FIG. 6. Note, the pre-charging routine is executed after the execution of the power-ON/processing routine (S208) or after the flash-light emission of the built-in flash device 16', and the main capacitor 16b is fully charged by the execution of the pre-charging routine.

At step S281, a timer is started. For example, the timer is defined in the system control circuit 40, and is constituted to count a time period of 10 seconds. Then, at step S282, the step-up transformer circuit 16a is operated under control of the system control circuit 40, whereby an electrical charging of the main capacitor 16b is started.

At step S283, a charge voltage data, representing a charge voltage of the main capacitor 16b, is retrieved from the charge-voltage detector circuit 16e. Then, at step S284, it is determined whether the charge voltage of the main capacitor 16b has reached a predetermined maximum voltage, for example, 330 volts.

If the charge voltage of the main capacitor 16b is less than 330 volts, the control proceeds to step S285, in which it is determined whether the time period of 10 sec has been counted by the timer. When a counted time of the timer has not reached 10 sec, the control proceeds to step S286, in which it is checked whether any one of the switch buttons (11, 12, 13 and so on) has been manipulated. When no manipulation of any one of the switch buttons is confirmed, the control returns to step S283. Namely, the routine comprising steps S283, S284, S285 and S286 is repeatedly executed, thereby continuing the charging of the main capacitor 16b.

At step S284, when it is confirmed that the charge voltage of the main capacitor 16b has reached 330 volts, the control proceeds step S287, in which the charge-requiring flag F1 is made to be "0". Then, at step S288, the charging of the main capacitor 16b is stopped. Thereafter, the control returns to the main routine of FIG. 6.

At step S285, when a counted time of the timer has reached 10 sec without the charge voltage of the main capacitor 16b having reached 330 volts at step S284, the control also proceeds step S287, in which the charge-requiring flag F1 is made to be "0". Then, at step S288, the charging of the main capacitor 16b is forcibly stopped.

Note, the timer is provided for protecting the main capacitor 16b from being excessively charged. In particular, for example, when the charge voltage of main capacitor 16b cannot be properly detected due to the charge-voltage detector circuit 16e being damaged, the charging of the main capacitor 16b cannot be stopped. Thus, the timer is necessary for the main capacitor 16b to be protected from being excessively charged.

At step S286, when it is confirmed that any one of the switch buttons has been manipulated, the control proceeds to step S288, in which the charging of the main capacitor 16b is temporarily stopped. Then, the control returns to the main routine of FIG. 6, and a processing, concerning the manipulated switch button, is executed. When the execution of the processing concerned ends, the charging of the main capacitor 16b is resumed (F1=1).

Figure 10:
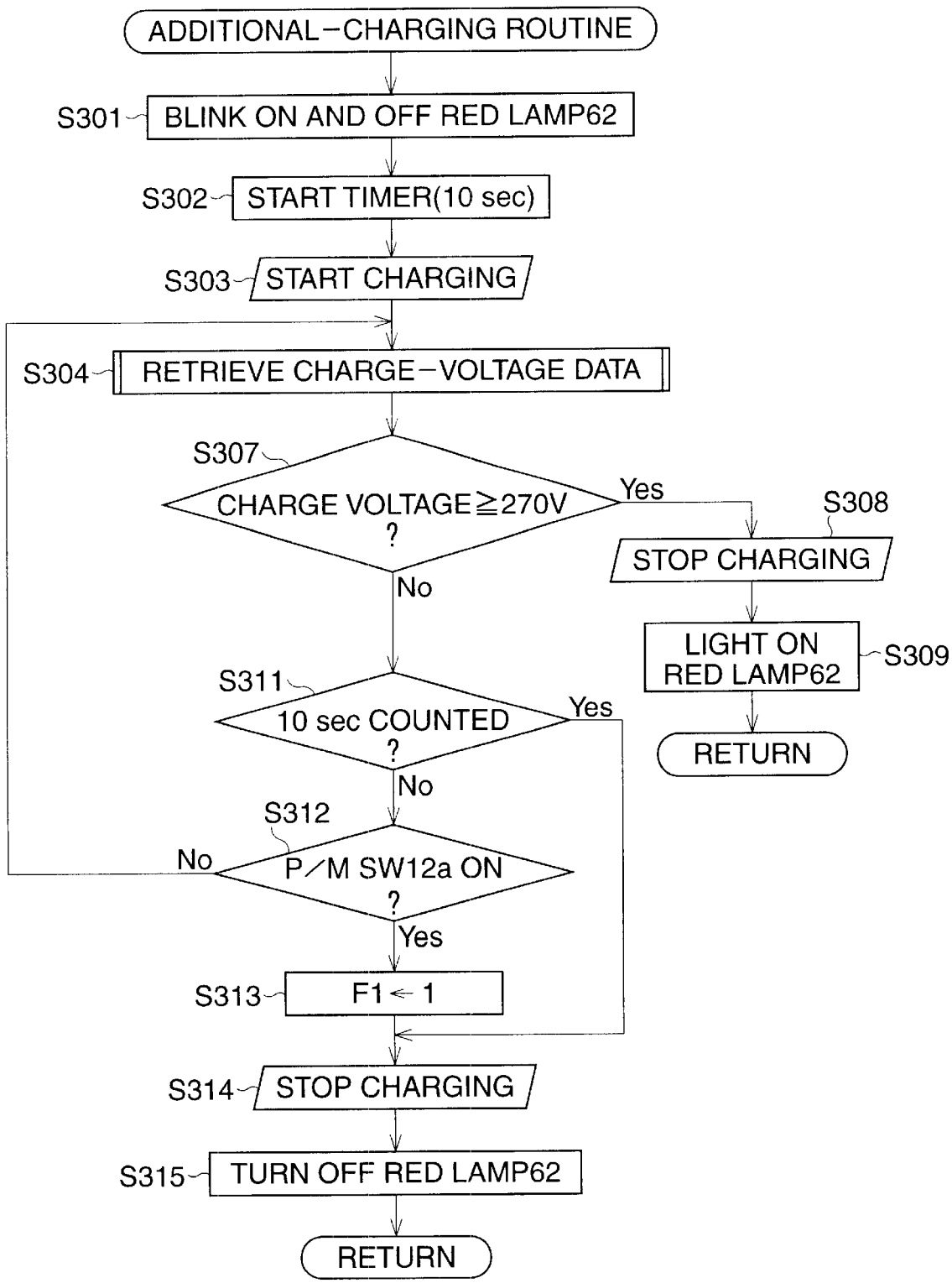
FIG. 10 is a flowchart of an additional-charging routine executed in the photographing operation routine of FIGS. 7 and 8.

FIG. 10 shows a flowchart of the additional charging routine executed in step S248 of the photographing operation routine of FIGS. 7 and 8.

At step S301, the red lamp 62 is blinked ON and OFF to announce that the built-in flash device 16' is in the course of the additional-electric charging state. Then, at step S302, the timer, used in the pre-charging routine of FIG. 9, is started, to count a time period of 10 seconds. Then, at step S303, the step-up transformer circuit 16a is operated under control of the system control circuit 40, whereby an electrical charging of the main capacitor 16b is started.

At step S304, a charge voltage data, representing a charge voltage of the main capacitor 16b, is retrieved from the charge-voltage detector circuit 16e. Then, at step S307, it is determined whether the charge voltage of the main capacitor 16b is at least 270 volts at which the xenon lamp 16c can emit a flash-light.

At step S307, if the charge voltage of the main capacitor 16b is equal to or more than 270 volts, the control proceeds to step S308, in which the charging of the capacitor 16b is stopped. Then, at step S309, the red lamp 62 is changed from the blinking-ON/OFF state to an ON-state. That is, the red lamp 62 is continuously lit, thereby announcing that the charge voltage of the capacitor 16b is high enough to emit a flash-light from the xenon lamp 16c. Thereafter, the control returns to the photographing operation routine of FIGS. 7 and 8.

At step S307, if the charge voltage of the main capacitor 16b less than 270 volts, the control proceeds to step S311, in which it is determined whether the time period of 10 sec has been counted by the timer. When a counted time of the timer has not reached 10 sec, the control proceeds to step S312, in which it is determined whether the photometry measurement switch 12a is in the OFF-state, i.e. whether the partial depression of the release switch button 12 is emancipated. When the photometry measurement switch 12a is still in the ON-state, the control returns to step S304. Namely, the routine comprising steps S304, S307, S311 and S312 is repeatedly executed, thereby continuing the charging of the main capacitor 16b.

At step S307, when it is confirmed that the charge voltage of the main capacitor 16b has reached 270 volts, the control proceeds step S308, in which the charging of the main capacitor 16b is stopped. Then, at step S309, the red lamp 62 is continuously lit. Thereafter, the control returns to the photographing operation routine of FIGS. 7 and 8.

At step S311, when a counted time of the timer has reached 10 sec without the charge voltage of the main capacitor 16b having reached 270 volts at step S307, the control skips to step S314, in which the charging of the capacitor 16b is stopped. Then, the red lamp 62 is changed from the blinking-ON/OFF state to an OFF-state. That is, the red lamp 62 is turned OFF, thereby announcing that the main capacitor 16b is not properly charged. Note, of course, the timer is provided for the same reasons as the timer used in the pre-charging routine of FIG. 9.

During the execution of the routine comprising steps S304, S307, S311 and S312, if the partial depression of the release switch button 12 is emancipated, thereby turning OFF the photometry measurement switch 12a (S312), i.e if the photographing operation concerned is canceled, the control proceeds from step S312 to step S313, in which the charge-requiring flag F1 is made to be "1". Then, at step S315, the red lamp 62 is turned OFF. Thereafter, the control returns to the photographing operation routine of FIGS. 7 and 8. Note, in this case, due to F1=1, the pre-charging routine of FIG. 9 is executed for preparing for a next photographing operation with a flash-emission of the built-in flash device 16'.

Figure 11:
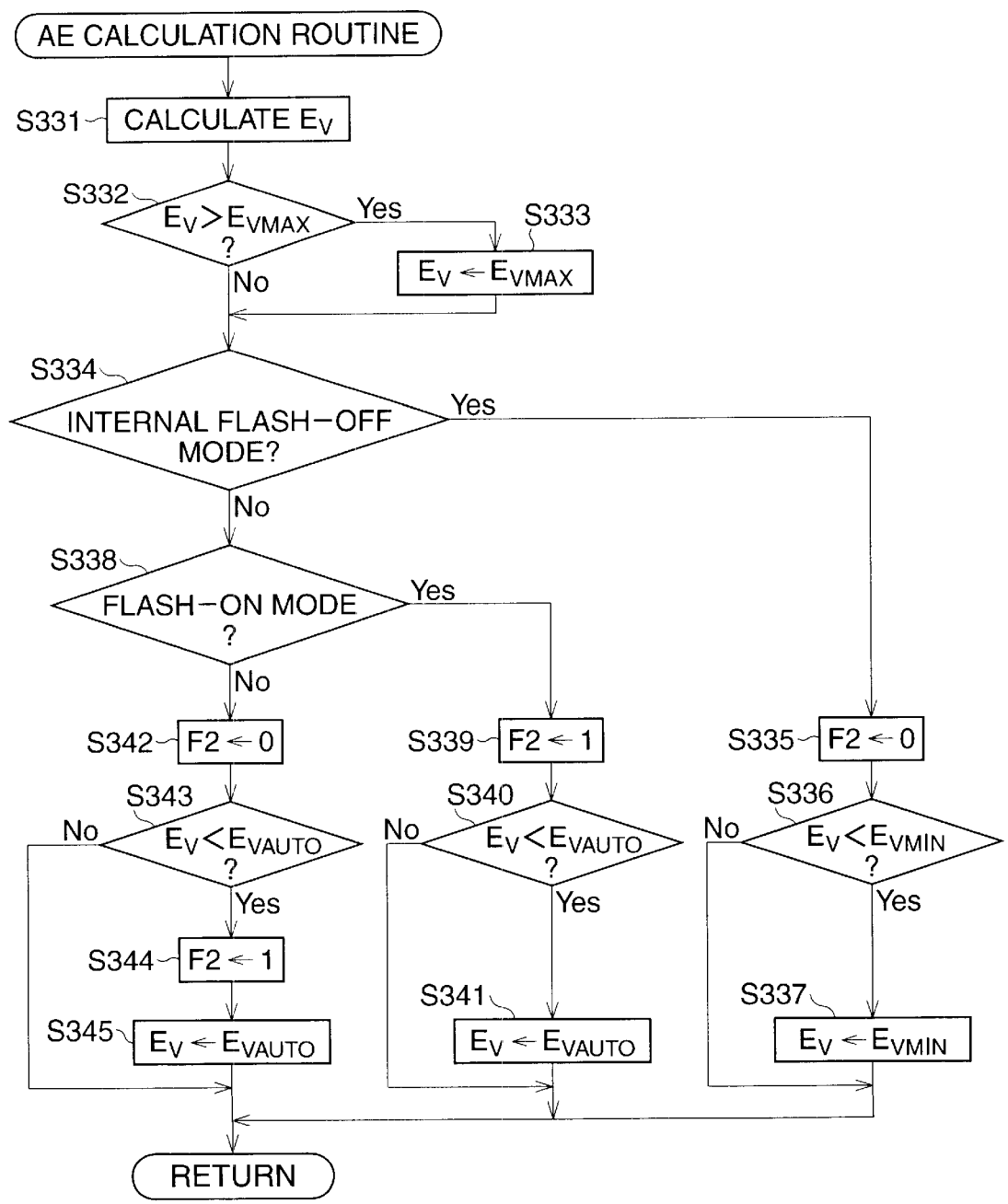
FIG. 11 is a flowchart of an AE calculation routine executed in the photographing operation routine of FIGS. 7 and 8.

FIG. 11 shows a flowchart of the AE calculation routine executed in step S246 of the photographing operation routine of FIGS. 7 and 8.

At step S331, an exposure value $E_V$ is calculated on the basis of the APEX (additive system of photographic exposure) system. Namely, the calculation of the exposure value $E_V$ is based on the following equation:

$$E_V = B_V + S_V$$

Herein: $B_V$ represents the luminance data retrieved from the photometry measurement circuit 22 (S245); and $S_V$ represents the DX code data or sensitivity of the photographic film concerned detected by the DX code detector circuit 26 (S205).

At step S332, it is determined whether the calculated exposure value $E_V$ is larger than a maximum exposure value $E_{VMAX}$, corresponding to a maximum shutter speed (i.e. a shortest exposure time) which is controllable by the shutter of the camera 10. If $E_V > E_{VMAX}$, the control proceeds to step S333, in which the calculated exposure value $E_V$ is given a setting of the maximum exposure value $E_{VMAX}$. Namely, whenever the calculated exposure value $E_V$ is larger than the maximum exposure value $E_{VMAX}$, the exposure value $E_V$ is handled as the maximum exposure value $E_{VMAX}$.

At step S334, it is determined whether the internal flash-OFF mode is selected. Of course, when the internal flash-OFF mode is selected, the built-in flash device 16' is not allowed to emit the flash-light. Thus, the control proceeds to step S335, in which the flash-allowing flag F2 is made to be "0", thereby prohibiting the flash-light emission of the built-in flash device 16'.

Then, at step S336, it is determined whether the calculated exposure value $E_V$ is smaller than a minimum exposure value $E_{VMIN}$, corresponding to a minimum shutter speed (i.e. a longest exposure time) which is previously set in the shutter of the camera 10. If $E_V < E_{VMIN}$, the control proceeds to step S337, in which the calculated exposure value $E_V$ is given a setting of the minimum exposure value $E_{VMIN}$. Thereafter, the control returns to the photographing operation routine of FIGS. 7 and 8. Namely, whenever the calculated exposure value $E_V$ is smaller than the minimum exposure value $E_{VMIN}$, the exposure value $E_V$ is handled as the minimum exposure value $E_{VMIN}$.

At step S336, if $E_V \geq E_{VMIN}$, the control immediately returns to the photographing operation routine of FIGS. 7 and 8. Thus, the calculated exposure value $E_V$ is handled as it stands.

At step S334, when it is determined that the internal flash-OFF mode is not selected, the control proceeds to step S338, in which it is determined whether either the internal flash-ON mode or the external flash-ON mode is selected. Of course, when either the internal flash-ON mode or the external flash-ON mode is selected, the built-in flash device 16' is allowed to emit the flash-light. Thus, the control proceeds to step S339, in which the flash-allowing flag F2 is made to be "1", thereby allowing the flash-light emission of the built-in flash device 16'.

Then, at step S340, it is determined whether the calculated exposure value $E_V$ is smaller than a predetermined exposure value $E_{VAUTO}$, corresponding to a hand-trembling-limit shutter speed at which a hand-trembling or camera-trembling is negligible upon photographing. Note, usually, the hand-trembling-limit shutter speed may be given a setting of 1/40 sec. If $E_V < E_{VAUTO}$, i.e. if a shutter speed, corresponding to the calculated exposure value $E_V$, is slower than the hand-trembling-limit shutter speed (1/40 sec), the control proceeds to step S341, in which the calculated exposure value $E_V$ is given a setting of the predetermined exposure value $E_{VAUTO}$. Thereafter, the control returns to the photographing operation routine of FIGS. 7 and 8. Namely, whenever the calculated exposure value $E_V$ is smaller than the predetermined exposure value $E_{VAUTO}$ the exposure value $E_V$ is handled as the predetermined exposure value $E_{VAUTO}$.

At step S340, if $E_V \geq E_{VAUTO}$, i.e. if the shutter speed, corresponding to the calculated exposure value $E_V$, is equal to or faster than the hand-trembling-limit shutter speed (1/40 sec), the control immediately returns to the photographing operation routine of FIGS. 7 and 8. Thus, the calculated exposure value $E_V$ is handled as it stands.

At step S338, when it is determined that neither the internal flash-ON mode nor the external flash-ON mode is selected, i.e. when it is determined that the automatic internal flash mode is selected, the control proceeds to step S342, in which the flash-allowing flag F2 is made to be "0", thereby prohibiting the flash-light emission of the built-in flash device 16'.

Then, at step S343, it is determined whether the calculated exposure value $E_V$ is smaller than the predetermined exposure value $E_{VAUTO}$. If $E_V < E_{VAUTO}$, i.e. if a shutter speed corresponding to the calculated exposure value $E_V$, is slower than the hand-trembling-limit shutter speed (1/40 sec), the control proceeds to step S344, in which the flash-allowing flag F2 is made to be "1", thereby allowing the flash-light emission of the built-in flash device 16'. Subsequently, at step S345, the calculated exposure value $E_V$ is given a setting of the predetermined exposure value $E_{VAUTO}$. Thereafter, the control returns to the photographing operation routine of FIGS. 7 and 8. Namely, whenever the calculated exposure value $E_V$ is smaller than the predetermined exposure value $E_{VAUTO}$, the exposure value $E_V$ is handled as the predetermined exposure value $E_{VAUTO}$.

At step S343, if $E_V \geq E_{VAUTO}$, i.e. if the shutter expeed, corresponding to the calculated exposure value $E_V$, is equal to or faster than the hand-trembling-limit shutter speed (1/40 sec), the control immediately returns to the photographing operation routine of FIGS. 7 and 8. Thus, the calculated exposure value $E_V$ is handled as it stands.

Figure 12:
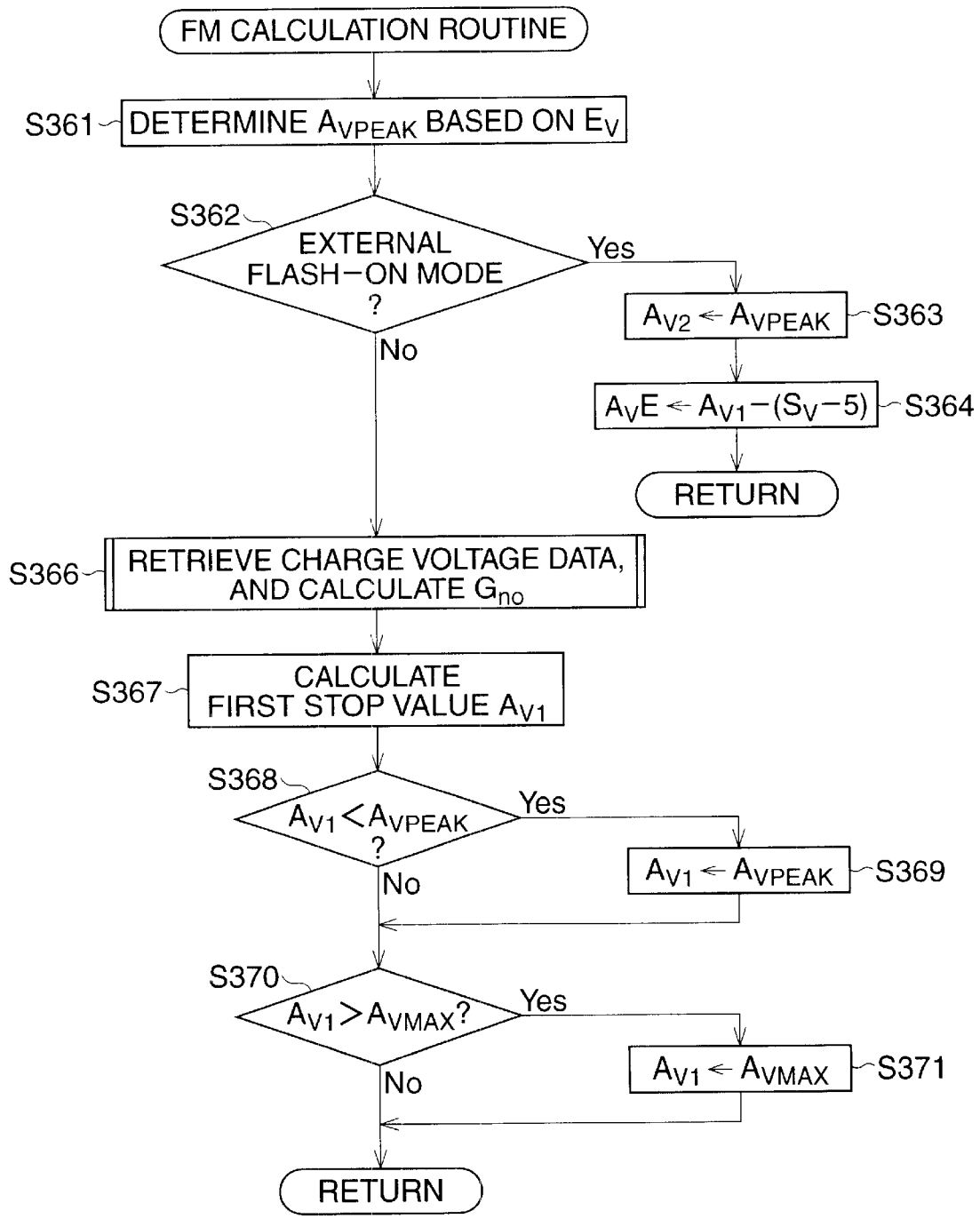
FIG. 12 is a flowchart of an FM calculation routine executed in the photographing operation routine of FIGS. 7 and 8.

FIG. 12 shows a flowchart of the FM calculation routine executed in step S260 of the photographing operation routine of FIGS. 7 and 8.

At step S361, a minimum stop value $A_{VPEAK}$ is calculated on the basis of the exposure value $E_V$ obtained by the execution of the EV calculation routine of FIG. 11. The minimum stop value $A_{VPEAK}$ corresponds to a maximum aperture of the shutter of the camera 10 during an opening-action of the shutter. Namely, in the execution of the exposure-controlling routine (S262), the shutter of the camera 10 is opened until an aperture of the shutter reaches the maximum aperture corresponding to the minimum stop value $A_{VPEAK}$, and then the shutter of the camera 10 is immediately closed.

Figures 13, 14:
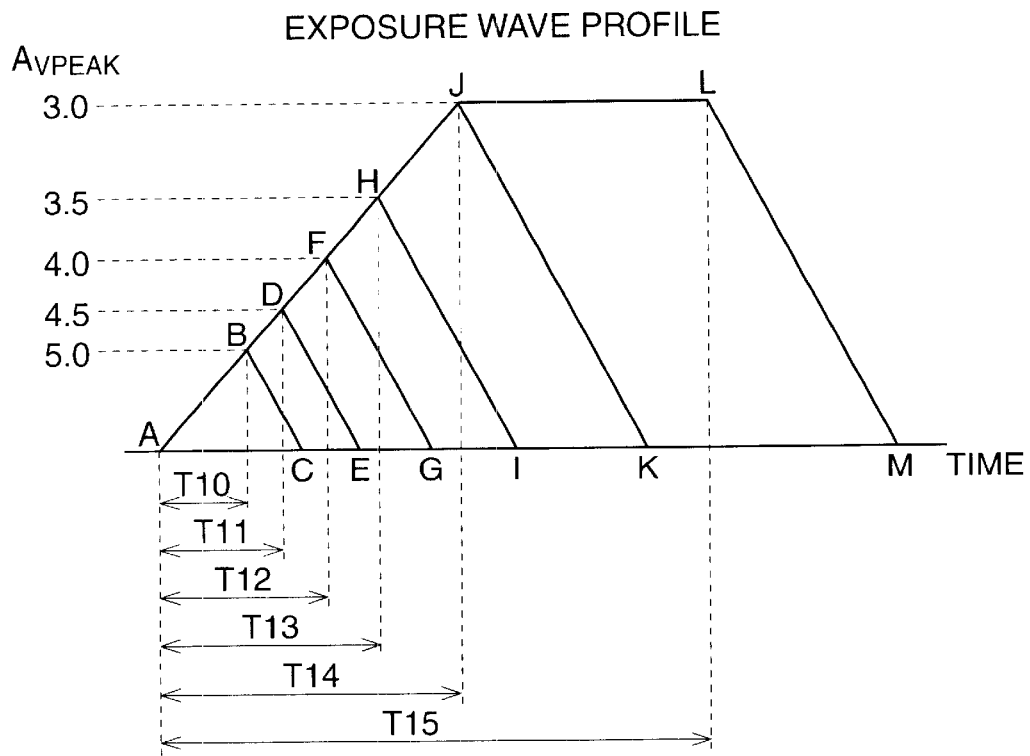
FIG. 13 is a graph conceptually showing a variation in an aperture of a shutter of the LS camera.
FIG. 14 is a table based on the graph of FIG. 13.

Referring to a graph of FIG. 13, a variation in the aperture of the shutter is conceptually shown by way of example, and, referring to a table of FIG. 14, a relationship between an exposure value $E_V$ and a corresponding minimum stop value $A_{VPEAK}$ is shown by way of example. In the table of FIG. 14, for example, when an exposure value $E_V$ is "11", the exposure value of "11" corresponds to a minimum stop value $A_{PEAK}$ of "3.5", corresponding to a maximum aperture of the shutter which is determined on the basis of the exposure value of "11". In this case, the aperture of the shutter is varied along an exposure wave profile ΔAHI, an apex (H) of which corresponds to the minimum stop value $A_{VPEAK}$ of "3.5".

Also, a duration of shutter-open time $TE_V$ of the shutter is defined as a time which is counted from a time of point (A), at which the shutter begins to open, to a point of time at which the aperture of the shutter reaches a minimum stop value $A_{VPEAK}$ (B, D, F, H, J). Thus, in the aforesaid example, the shutter-open time duration $TE_V$ is represented by "T13".

In the first embodiment, the table of FIG. 14 (except for the exposure wave profile column) is formed as a two-dimensional map, and is incorporated in the system control circuit 40. Thus, at step S361, the calculation of the minimum stop value $A_{VPEAK}$ based on the exposure value $E_V$ is immediately ascertained using the two-dimensional map.

At step S362, it is determined whether the external flash-ON mode is selected. When the external flash-ON mode is not selected, i.e. when the object A is illuminated by the flash-light emission of the built-in flash device 16', the control proceeds to step S366, in which a signal, representing a charge voltage of the main capacitor 16b, is retrieved as a charge voltage data from the charge-voltage detector circuit 16e, and a guide number $G_{no}$ is calculated on the basis of the retrieved charge voltage data.

As is well known, the guide number $G_{no}$ represents an amount of the flash-light emitted from the xenon lamp 16c when it is electrically energized with an electrical discharge of the charged main capacitor 16b, and the retrieved charge voltage data represents an amount of the electrical charges of the main capacitor 16b. Thus, it is possible to calculate the guide number $G_{no}$ on the basis of the retrieved charge voltage data.

In the first embodiment, a relationship between a guide number $G_{no}$ and a charge voltage data of the main capacitor 16b is also formed as a two-dimensional map, and is incorporated in the system control circuit 40. Thus, at step S366, the calculation of the guide number $G_{no}$ based on the retrieved charge voltage data is immediately ascertained using the two-dimensional map.

At step S367, a first stop aperture $A_{V1}$, corresponding to a flash-light-emission aperture, is calculated. Note, as explained hereinbefore, the flash-light-emission aperture is defined as an aperture of the shutter at which a flash-light emission of the built-in flash device 16' should be started during an opening-action of the shutter.

In particular, first, an f-number $F_{no}$ is calculated from the guide number $G_{no}$ as follows:

$$F_{no} = G_{no}/D$$

Herein: D is the object-distance data obtained in step S241 of the photographing operation routine of FIGS. 7 and 8.

Then, the first stop aperture $A_{V1}$ is calculated as follows:

$$A_{V1} = 2 \times \log(F_{no})/\log 2 + (S_v - 5)$$

Herein: $S_V$ represents the DX code data or sensitivity of the photographic film concerned detected by the DX code detector circuit 26 (S205), as already stated hereinbefore.

At step S368, it is determined whether the calculated first stop value $A_{V1}$ is less than the minimum stop value $A_{VPEAK}$ corresponding to the maximum aperture of the shutter of the camera 10. If $A_{V1} < A_{VPEAK}$, the control proceeds to step S369, in which the calculated first stop value $A_{V1}$ is given a setting of the minimum stop value $A_{PEAK}$. Namely, the calculated first stop value $A_{V1}$ is handled as the minimum stop value $A_{VPEAK}$.

At step S368, if $A_{V1} \geq A_{VPEAK}$, the control proceeds to step S370, in which it is determined whether the calculated first stop value $A_{V1}$ is larger than a maximum limit stop value $A_{VMAX}$ corresponding to a minimum aperture which is controllable by the shutter of the camera 10. If $A_{V1} > A_{VMAX}$, the control proceeds to step S371, in which the calculated first stop value $A_{V1}$ is given a setting of the maximum limit stop value $A_{MAX}$. Namely, the calculated first stop value $A_{V1}$ is handled as the maximum limit stop value $A_{VMAX}$.

At step S370, if $A_{V1} \leq A_{VMAX}$, the control returns to the photographing operation routine of FIGS. 7 and 8. In this case, of course, the calculated first stop value $A_{V1}$ is handled as it stands.

At step S362, when the external flash-ON mode is selected, i.e. when the object A is illuminated by the flash-light emission of the external flash device 100, the control proceeds to step S363, in which a second stop value $A_{V2}$, at which the flash-light emission of the external flash device 100 should be started, is given a setting of the minimum stop value $A_{VPEAK}$. Namely, the flash-light emission of the external flash device 100 is started when the aperture of the shutter reaches the maximum aperture corresponding to the minimum stop value $A_{VPEAK}$.

Then, at step S364, an exposure factor $A_V E$ to be transmitted to the external flash device 100 is calculated by subtracting a film sensitivity correction value $(S_V-5)$ from the second stop value $A_{V2}$ as follows:

$$A_V E \leftarrow A_{V2} - (S_V - 5)$$

Herein: of course, $S_V$ represents the DX code data or sensitivity of the photographic film concerned detected by the DX code detector circuit 26 (S205), and the film sensitivity correction value $(S_V-5)$ is determined on the basis of "ISO 100". Note, the exposure factor $A_V E$ is a factor corresponding to the stop value of the shutter during the opening-action of the shutter.

Thereafter, the control returns to the photographing operation routine of FIGS. 7 and 8.

Note, as stated in detail hereinafter, when a light-flash is emitted from the external flash device 100, an amount of the flash-light emission is determined in accordance with the exposure factor $A_V E$. Also, note, in the first embodiment, it is possible to omit a setting of a film-sensitivity to be given to the external flash device 100, because the exposure factor $A_V E$ is obtained by processing the second stop value $A_{V2}$ with the correction value $(S_V-5)$.

Figure 15:
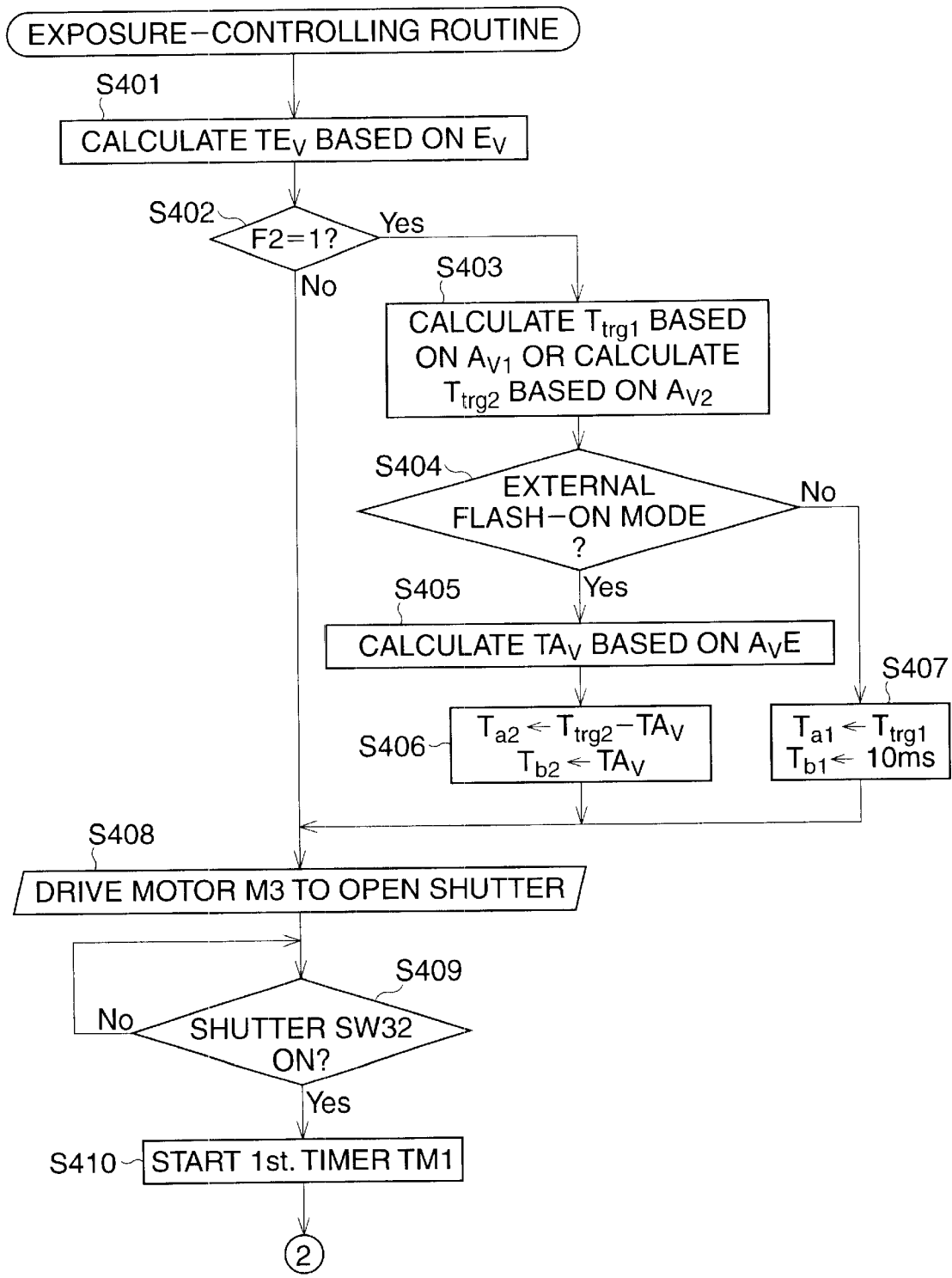
FIG. 15 is a part of a flowchart of an exposure-controlling routine executed in the photographing operation routine of FIGS. 7 and 8.
Figure 16:
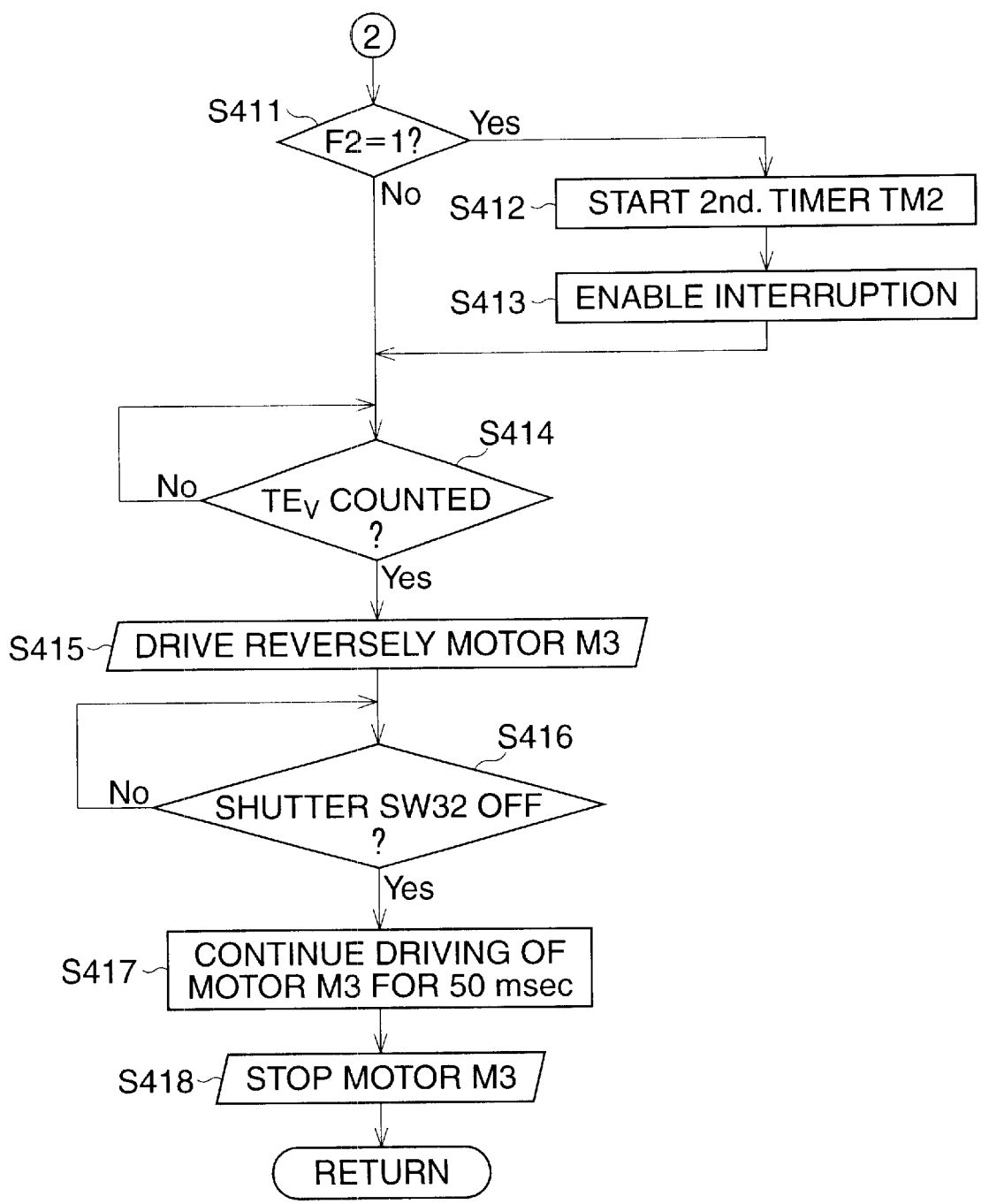
FIG. 16 is the remaining part of the flowchart of the exposure-controlling routine executed in the photographing operation routine of FIGS. 7 and 8.

FIGS. 15 and 16 show a flowchart of the exposure-controlling routine executed in step S262 of the photographing operation routine of FIGS. 7 and 8.

At step S401, a duration of shutter-open time $TE_V$ of the shutter is calculated on the basis of the exposure value $E_V$ obtained by the execution of the AE calculation routine of FIG. 11. Namely, the shutter-open time duration $TE_V$ is immediately determined from the aforesaid two-dimensional map based on the table of FIG. 14.

At step S402, it is determined whether the flash-allowing flag F2 is "1" or "0". If F2=0, i.e. if the photographing operation is executed without emitting the flash-light from either the built-in flash device 16' or the external flash device 100, the control proceeds to step S408, in which the shutter motor M3 is driven so that the shutter of the camera 10 is opened.

Then, at step S409, it is monitored whether the shutter switch 32 has been turned ON. When it is confirmed that the shutter switch 32 is turned ON, i.e. when an opening-action of the shutter has just started, the control proceeds to step S410, in which a first timer TM1 is started. Note, a starting point of the shutter-opening-action is indicated by reference "A" in the graph of FIG. 13.

For example, the first timer TM1 is defined in the system control circuit 40, and is constituted to count a duration of shutter-open time of the shutter. Namely, at step S410, the shutter-open duration time TEv obtained in step S401 is set in the first timer TM1, and a time-counting is started by the first timer TM1.

At step S411, it is again determined whether the flash-allowing flag F2 is "1" or "0". If F2=0, the control proceeds to step S414, in which it is monitored whether the shutter-open duration time $TE_V$ has been counted by the first timer TM1. When it is confirmed that the shutter-open duration time $TE_V$ has been counted by the first timer TM1, i.e. when it is confirmed that the aperture of the shutter has reached the maximum aperture corresponding to the minimum stop value $A_{VPEAK}$ concerned, the control proceeds to step S415, in which the shutter motor M3 is reversely driven so that a closing-action of the shutter is started.

At step S416, it is monitored whether the shutter switch 32 has been turned OFF. When it is confirmed that the shutter switch 32 has been turned OFF, i.e. when the shutter has returned to the starting point of the shutter-opening-action, as indicated by reference "A" in the graph of FIG. 14, the control proceeds to step S417, in which the reverse-driving of the shutter motor M3 is continued for a short time period of, for example, 50 ms, whereby the blades of shutter can be completely returned to the initial position.

Then, at step S418, the shutter motor M3 is stopped, and thus the exposure-controlling routine ends without emitting the flash-light from the built-in flash device 16' nor the external flash device 100 (F2=0). Thereafter, the control returns to the photographing operation routine of FIGS. 7 and 8.

At step S402, if F2=1, i.e. if the photographing operation is executed with emitting the flash-light from either the built-in flash device 16' or the external flash device 100, the control proceeds to step S403, in which either a first trigger time $T_{trg1}$ or a second trigger time $T_{trg2}$ is calculated. Note, the first trigger time $T_{trg1}$ is defined as a time at which a flash-light should be emitted from the built-in flash device 16', and the second trigger time $T_{trg2}$ is defined as a time at which a flash-light should be emitted from the external flash device 100 should be started. The first and second trigger times $T_{trg1}$ and $T_{trg2}$ are calculated on the basis of the first and second stop values $A_{V1}$ and $A_{V2}$, respectively.

When the first stop value $A_{V1}$ is obtained by the execution of the FM calculation routine of FIG. 13, i.e. when the external flash-ON mode is not selected (S362), the trigger time $T_{trg1}$ is calculated as a period of time between the time at which the opening-action of the shutter is started and the time at which the aperture of the shutter reaches the flash-light-emission aperture corresponding to the first stop value $A_{V1}$. Referring to a graph of FIG. 17, a relationship between a first stop value $A_{V1}$ and a trigger time $T_{trg1}$ is shown. For example, when the first stop value $A_{V1}$ is "4", the trigger time $T_{trg1}$ is given a setting of "T23".

Figure 17:
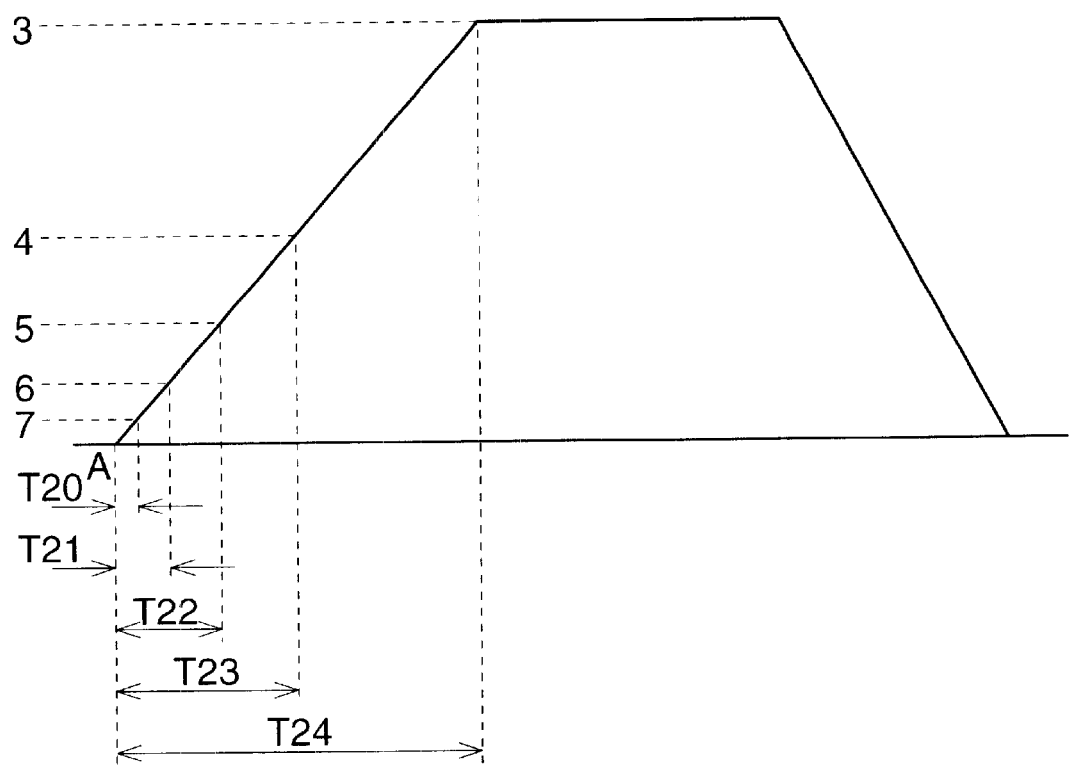
FIG. 17 is a graph showing a relationship between a stop value of the shutter, at which a flash-light emission of a built-in flash device of the LS camera is started, and a trigger time, at which the flash-light emission of the built-in flash device is triggered.

Note, in the first embodiment, the relationship as shown in the graph of FIG. 17 is formed as a two-dimensional map, and is incorporated in the system control circuit 40, whereby the calculation of the trigger time $T_{trg1}$ can be immediately ascertained using the two-dimensional map.

On the other hand, when the second stop value $A_{V2}$ is obtained by the execution of the FM calculation routine of FIG. 12, i.e. when the external flash-ON mode is selected (S362), the trigger time $T_{trg2}$ is calculated as the shutter-open duration time $TE_V$. Namely, the calculation of the trigger time $T_{trg2}$ can be immediately ascertained using the aforesaid two-dimensional map based on the table of FIG. 14. Note, as stated above, the flash-light emission of the external flash device is started when the aperture of the shutter has reached the maximum aperture corresponding to the minimum stop value $A_{VPEAK}$.

At step S404, it is determined whether the external flash-ON mode is selected. When it is confirmed that the external flash-ON mode is not selected, the control proceeds to step S407, in which a variable or time $T_{a1}$ is made to be "$T_{trg1}$", and a variable or time $T_{b1}$ is made to be, for example, "10 ms".

On the other hand, at step S404, when it is confirmed that the external flash-ON mode is selected, the control proceeds to step S405, in which a time interval data $TA_V$ is calculated on the basis of the exposure factor $A_VE$ obtained in step S364 of the FM calculation routine of FIG. 12.

As is apparent from the foregoing, when the external flash-ON mode is selected, a flash-light is twice emitted as a light-pulse signal from the built-in flash device 16' such that the exposure factor $A_VE$ is represented by the time interval $TA_V$ between the twice-emitted light-pulse signals: the first light-pulse signal and the second light-pulse signal, and such that the second light-pulse signal serves as a flash-timing signal for initiating the flash-light-emission of the external flash device 100.

Referring to a table of FIG. 18, a relationship between an exposure factor $A_VE$ and a time interval $TA_V$ is shown. For example, when the exposure factor $A_VE$ is "2.8", the time interval $TA_V$ is given a setting of "1.2 ms". Note, the relationship between the exposure factor $A_VE$ and the time interval $TA_V$ is formed as a two-dimensional map, and is incorporated in the system control circuit 40, whereby the calculation of the time interval $TA_V$ can be immediately ascertained by referring to the two-dimensional map.

At step S406, a variable or time $T_{a2}$ is made to be "$(T_{trg2}-TA_V)$", and a variable or time $T_{b2}$ is made to be "$TA_V$".

After the setting of either the times $T_{a1}$ and $T_{b1}$ or the times $T_{a2}$ and $T_{b2}$ (S407 or S406), the routine comprising steps S408, S409 and S410 is executed in the same manner as mentioned above.

Then, at step S411, it is determined whether the flash-allowing flag F2 is "1" or "0". At this stage, since F2=1, the control proceeds from step S411 to step S412, in which a second timer TM2 is given a setting of either the time $T_{a1}$ or the time $T_{a2}$, and is then started. Of course, when the external flash-ON mode is not selected, the time $T_{a1}$ is set in the second timer TM2, and, when the external flash-ON mode is selected, the time $T_{a2}$ is set in the second timer TM2.

Note, similarly to the first timer TM1, the second timer TM2 is defined in the system control circuit 40, and is constituted to count the set time ($T_{a1}$ or $T_{a2}$). Also, note, when the set time ($T_{a1}$ or $T_{a2}$) has been counted by the second timer TM2, an interruption signal is output from the second timer TM2 to the CPU of the system control circuit 40.

Figure 19:
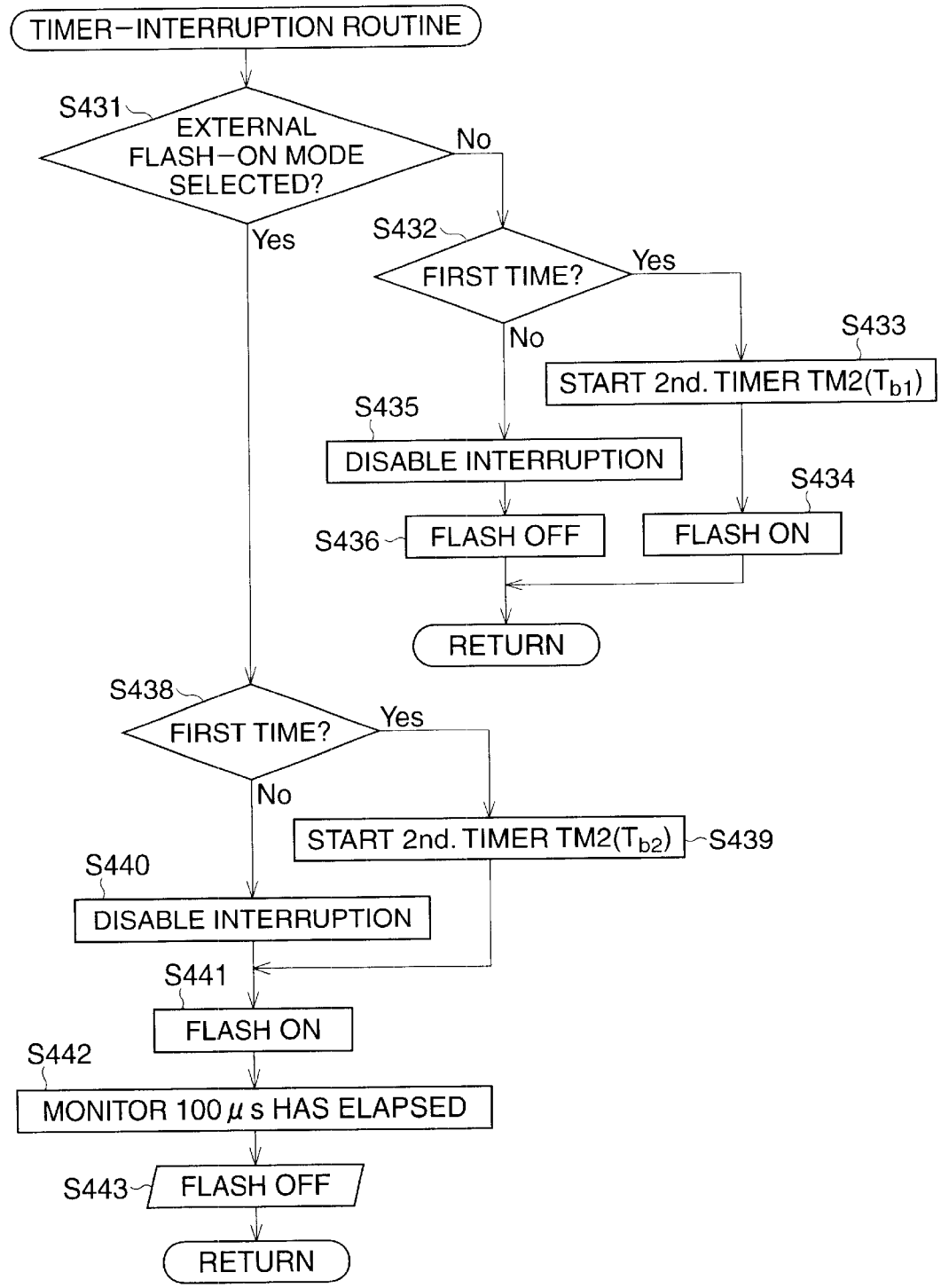
FIG. 19 is a flowchart of a timer-interruption routine executed in the photographing operation routine of FIGS. 7 and 8.

At step S413, the interruption signal to be output from the second timer TM2 is enabled to execute a timer-interruption routine as shown in FIG. 19. Thereafter, the routine comprising steps S414 to S418 is executed in the same manner as mentioned above.

FIG. 19 shows a flowchart of the timer-interruption routine, which is executed by outputting an interruption signal from the second timer TM2.

At step S431, it is determined whether the external flash-ON mode is selected. When it is confirmed that the external flash-ON mode is not selected, i.e when the second timer TM2 is given the setting of the time $T_{a1}$ ($T_{trg1}$), the control proceeds to step S432, in which it is determined whether the outputting of the interruption signal from the second timer TM2 is a first time. When the outputting of the interruption signal is the first time, the control proceeds to step S433, in which the second timer TM2 is given a setting of the time $T_{b1}$ (10 ms), and is again started.

Then, at step S434, a trigger signal is output from the system control circuit 40 to the IGBT of the flash-light-mission control circuit 16d, thereby turning ON the IGBT, resulting in energization of the xenon lamp 16c by discharging the electrical charges from the main capacitor 16b. Thus, a flash-light emission of the built-in flash device 16' is started. Thereafter, the control returns to the exposure-controlling routine of FIGS. 15 and 16.

When the set time $T_{b1}$ (10 ms) has been counted by the second timer TM2, an interruption signal is output as a second time signal from the-second timer TM2 to the CPU of the system control circuit 40, whereby the timer-interruption routine is again executed. Thus, in the second time execution of the timer-interruption routine, the control proceeds from step S432 to step S435, in which an interruption signal to be output from the second timer TM2 is disabled.

Then, at step S436, the outputting of the trigger signal from the system control circuit 40 to the IGBT of the flash-light-emission control circuit 16d is stopped, thereby turning OFF the IGBT, resulting in de-energization of the xenon lamp 16c. Thus, the flash-light emission of the built-in flash device 16' is stopped.

Note, the time $T_{b1}$ (10 ms) is selected as a time long enough to complete the discharge of the electrical charges from the fully-charged main capacitor 16b. Also, note, since a total time of the times $T_{a1}$ and $T_{b1}$ is shorter than the shutter-open duration time $TE_V$, the execution of the timer-interruption routine can be twice repeated until the shutter-open duration time $TE_V$ has been counted by the first timer TM1 (S414).

At step S431, when it is confirmed that the external flash-ON mode is selected, i.e when the second timer TM2 is given the setting of the time $T_{a2}$ ($T_{trg2}-TA_V$), the control proceeds to step S438, in which it is determined whether the outputting of the interruption signal from the second timer TM2 is a first time. When the outputting of the interruption signal is the first time, the control proceeds to step S439, in which the second timer TM2 is given a setting of the time $T_{b2}$ ($TA_V$), and is again started.

At step S441, a trigger signal is output from the system control circuit 40 to the IGBT of the flash-light-emission control circuit 16d, thereby turning ON the IGBT, resulting in energization of the xenon lamp 16c by discharging the electrical charges from the main capacitor 16b. Thus, a flash-light emission of the built-in flash device 16' is started.

Then, at step S442, it is monitored whether a very short time of, for example, 100 µs has elapsed. When it is confirmed that the very short time of 100 µs has elapsed, the control proceeds to step S443, in which the outputting of the trigger signal from the system control circuit 40 to the IGBT of the flash-light-emission control circuit 16d is stopped, thereby turning OFF the IGBT, resulting in de-energization of the xenon lamp 16c. Thus, the flash-light emission of the built-in flash device 16' is stopped.

In short, the flash-light emission of the built-in flash device 16' is continued over the very short time of 100 μs, and is thus received as a first light-pulse signal by the external flash device 100. Thereafter, the control returns to the exposure-controlling routine of FIGS. 15 and 16.

When the set time $T_{b2}$ ($TA_V$) has been counted by the second timer TM2, an interruption signal is output as a second time signal from the second timer TM2 to the CPU of the system control circuit 40, whereby the timer-interruption routine is again executed. Thus, in the second time execution of the timer-interruption routine, the control proceeds from step S438 to step S440, in which an interruption signal to be output from the second timer TM2 is disabled.

At step S441, a trigger signal is again output from the system control circuit 40 to the IGBT of the flash-light-emission control circuit 16d, thereby turning ON the IGBT, resulting in energization of the xenon lamp 16c by discharging the electrical charges from the main capacitor 16b. Thus, a flash-light emission of the built-in flash device 16' is again started.

Then, at step S442, it is monitored whether a very short time of, for example, 100 μs has elapsed. When it is confirmed that the very short time of 100 μs has elapsed, the control proceeds to step S443, in which the outputting of the trigger signal from the system control circuit 40 to the IGBT of the flash-light-emission control circuit 16d is stopped, thereby turning OFF the IGBT, resulting in de-energization of the xenon lamp 16c. Thus, the flash-light emission of the built-in flash device 16' is stopped.

In short, the second flash-light emission of the built-in flash device 16' is also continued over the very short time of 100 μs, and is thus received as a second light-pulse signal by the external flash device 100. Thereafter, the control returns to the exposure-controlling routine of FIGS. 15 and 16.

Figure 20:
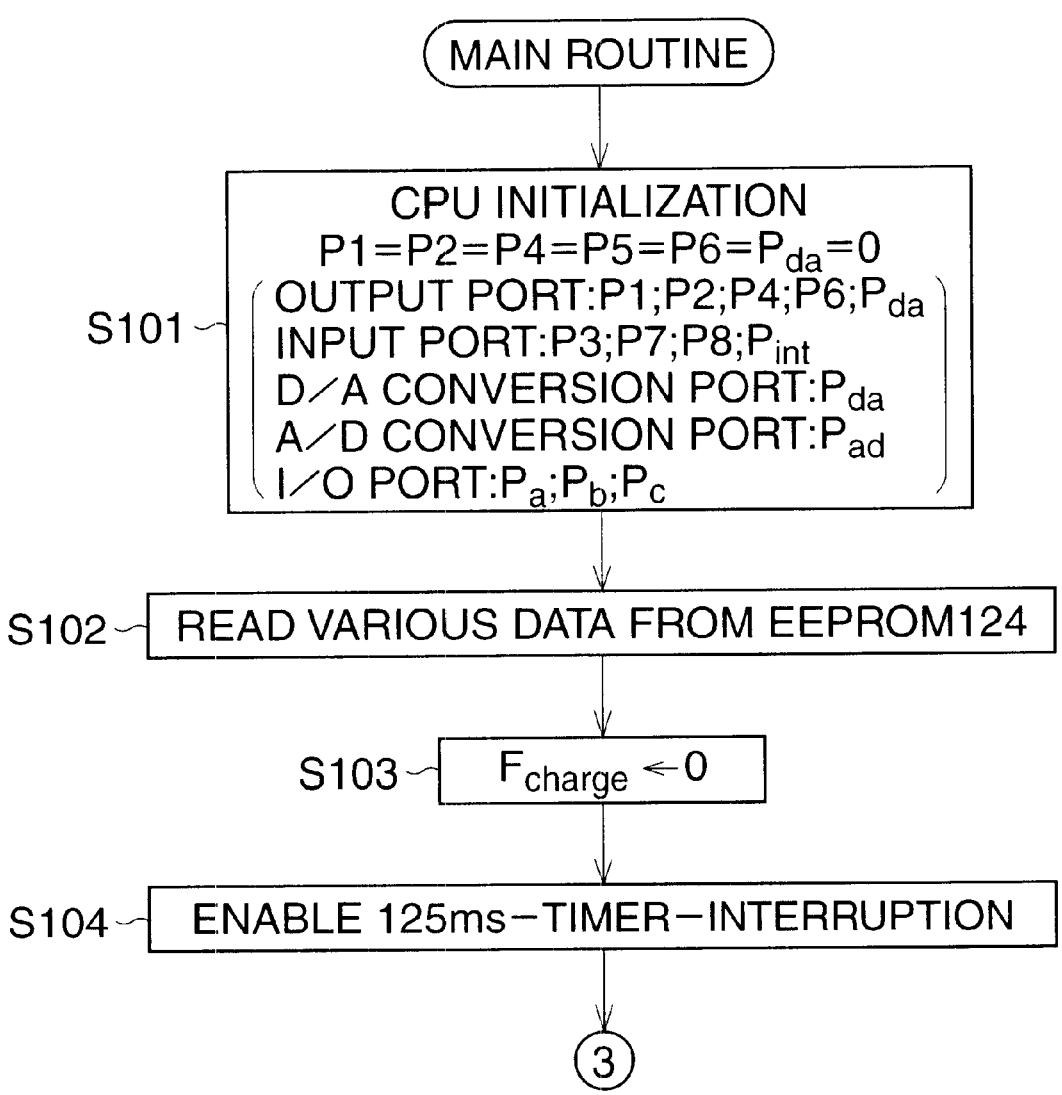
FIG. 20 is a part of a flowchart of a main routine executed in a CPU of the external flash device.
Figure 21:
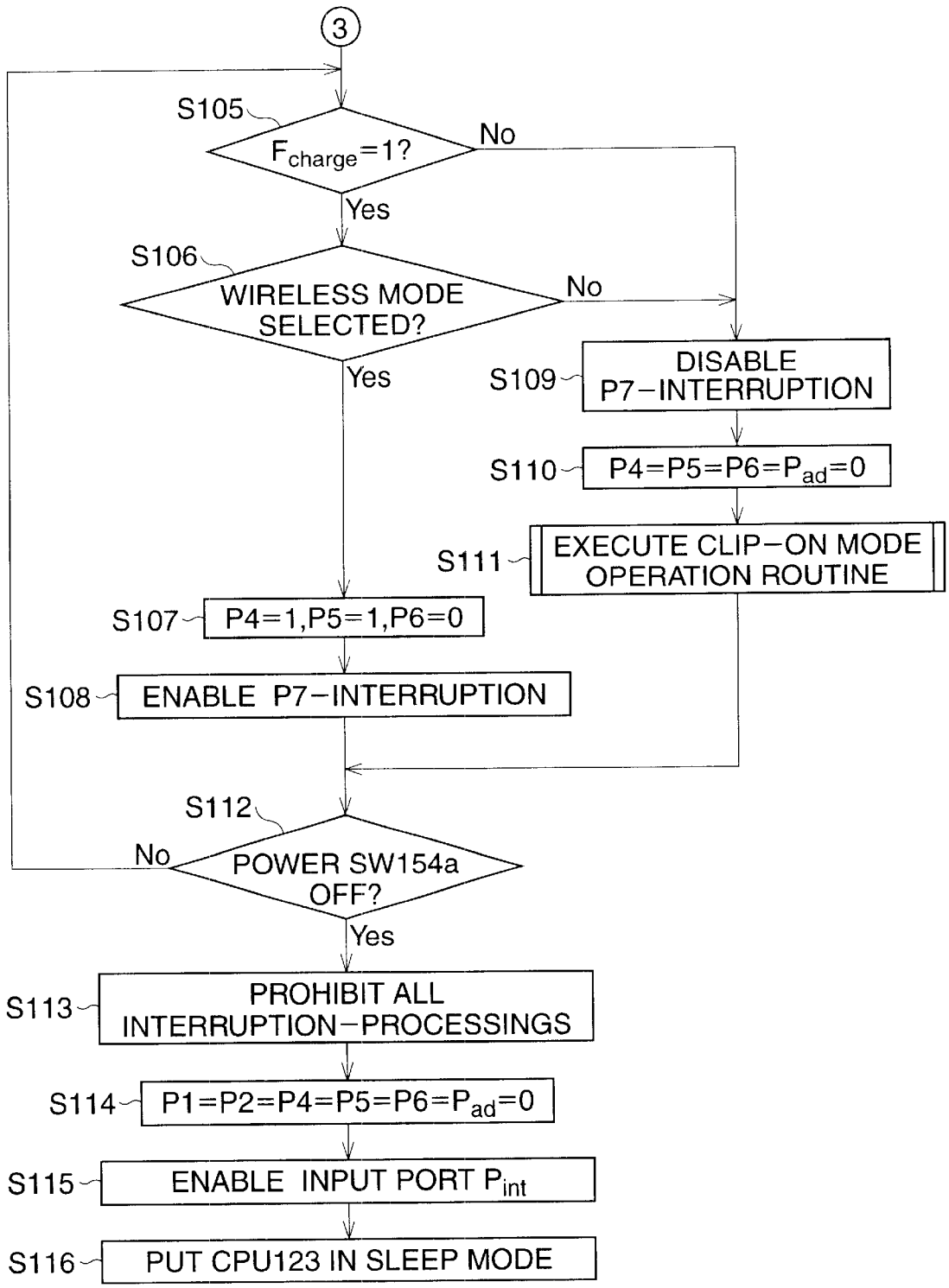
FIG. 21 is the remaining part of the flowchart of the main routine executed in the CPU of the external flash device.

FIGS. 20 and 21 show a flowchart of a main routine executed in the CPU 123 of the external flash device 100. Note, the main routine is executed when the battery 106 is loaded or when the power ON/OFF switch 154a is turned ON by depressing the power ON/OFF switch button 154.

At step S101, the CPU 123 is initialized. For example, in each of the output ports P1, P3, P4, P5, P6 and $P_{da}$, an output signal level is set to be a low level [0]. Also, each of other input ports P3, P7, P8, $P_{int}$, $P_a$, $P_b$, $P_c$, $P_{ad}$ and so on is initialized so that a predetermined function can be properly performed.

At step S102, the various data, including flash-light-emission correction data, are read from the EEPROM 124 via the port $P_a$, and the read data are stored in a memory contained in the CPU 123. Then, at step S103, a charge-indicating flag $F_{charge}$ is reset to be "0". Note, if $F_{charge}=0$, it indicates that an electrical charge of the main capacitor 109 is unfinished, and, if $F_{charge}=1$, it indicates that an electrical charge of the main capacitor 109 is finished.

Figure 22:
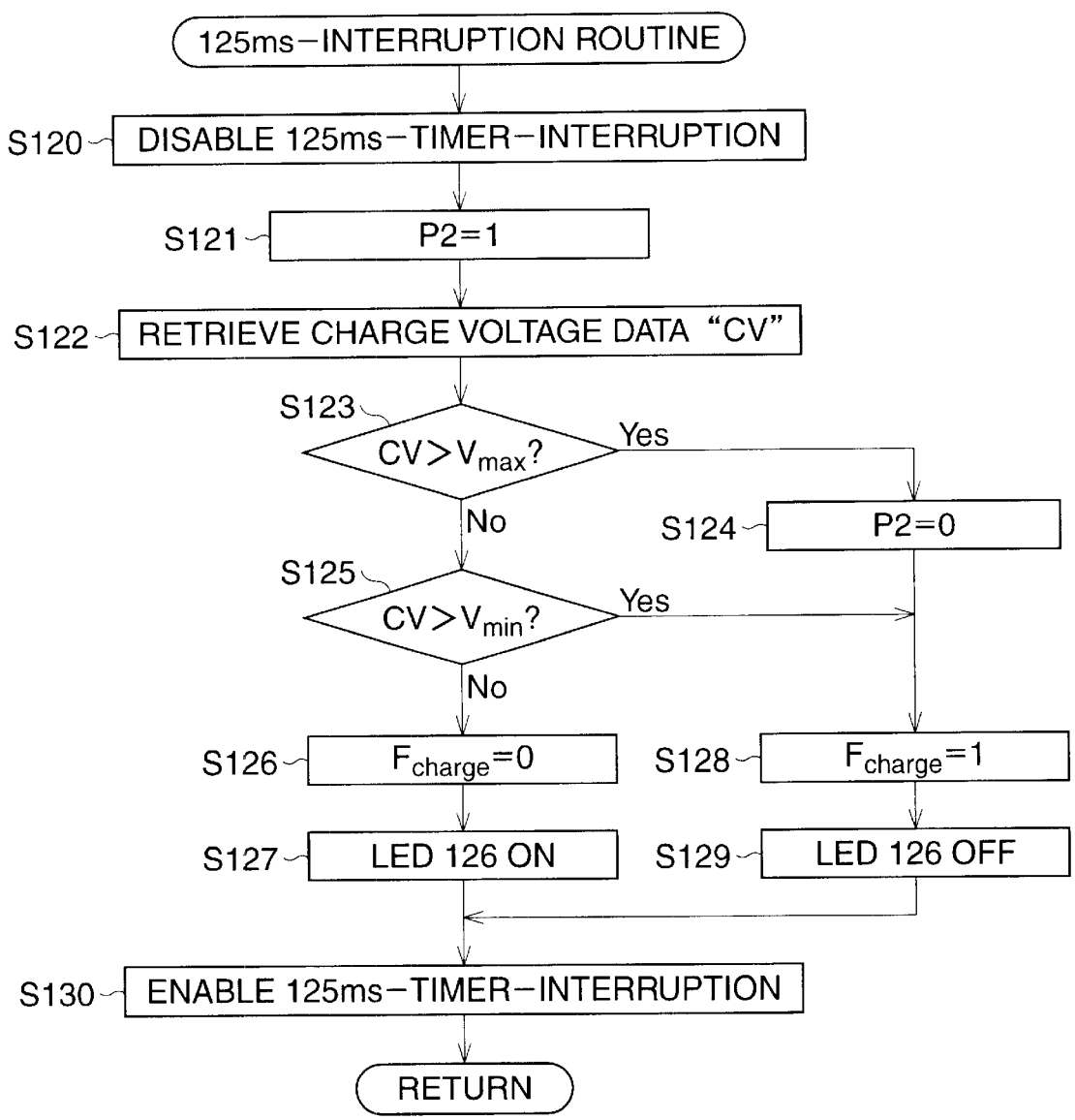
FIG. 22 is a flowchart of a 125 ms-interruption routine executed in the main routine of FIGS. 20 and 21.

At step S104, a 125 ms-timer-interruption is enabled. In particular, the CPU 123 is provided with a timer which outputs an interruption signal at a regular time-interval of 125 ms, and a 125 ms-timer-interruption routine, as shown in FIG. 22, is executed by every outputting of the interruption signal from the timer, whereby the main capacitor 109 is electrically charged to a predetermined charge voltage, as stated in detail hereinafter. In short, the execution of the 125 ms-timer-interruption routine is allowed only while the 125 ms-timer-interruption is enabled.

At step S105, it is determined whether the flag $F_{charge}$ is "1" or "0". If $F_{charge}=1$, i.e. if the charge of the main capacitor 109 is finished, the control proceeds to step S106, in which it is determined whether the wireless mode is selected by manipulating the mode selection switch button 152.

When the wireless mode is selected, the control proceeds to step S107, in which the signal level of the output port P4 is caused to be high [1], thereby turning ON the analog switch 130, resulting in energization of the light-receiver circuit G5. Also, at step S107, the signal level of the output port P5 is caused to be high [1], thereby turning ON the analog switch 131. Further, the signal level of the output port P6 is caused to be low [0], thereby turning ON the analog switches 133 and 134. At this time, of course, the analog switch 132 is in the OFF-state. Thus, the external flash device 100 makes preparations for receiving a light-pulse signal from the built-in flash device 16' of the camera 10.

Figure 23:
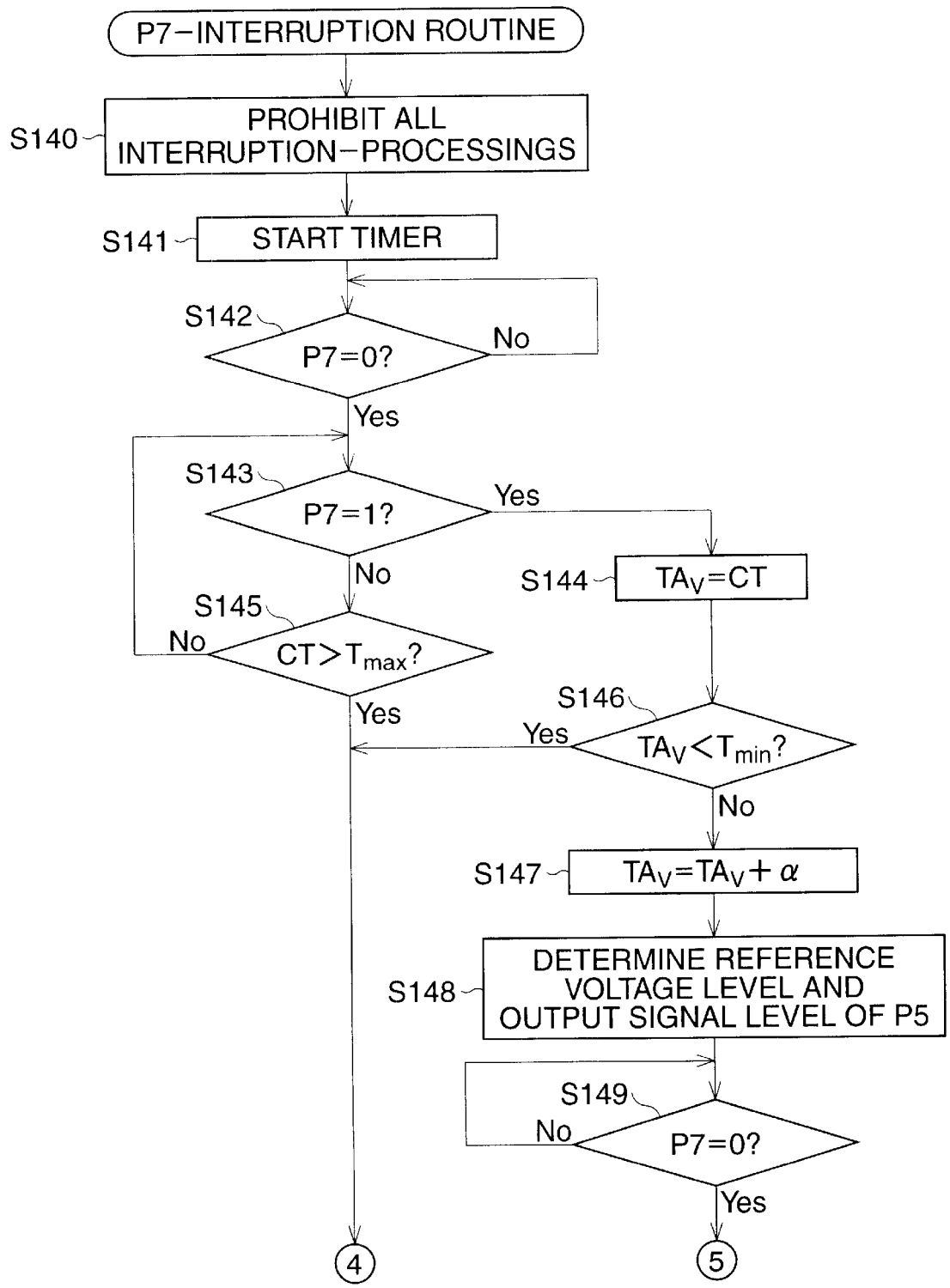
FIG. 23 is a part of a flowchart of a P7-interruption routine executed in the main routine of FIGS. 20 and 21.
Figure 24:
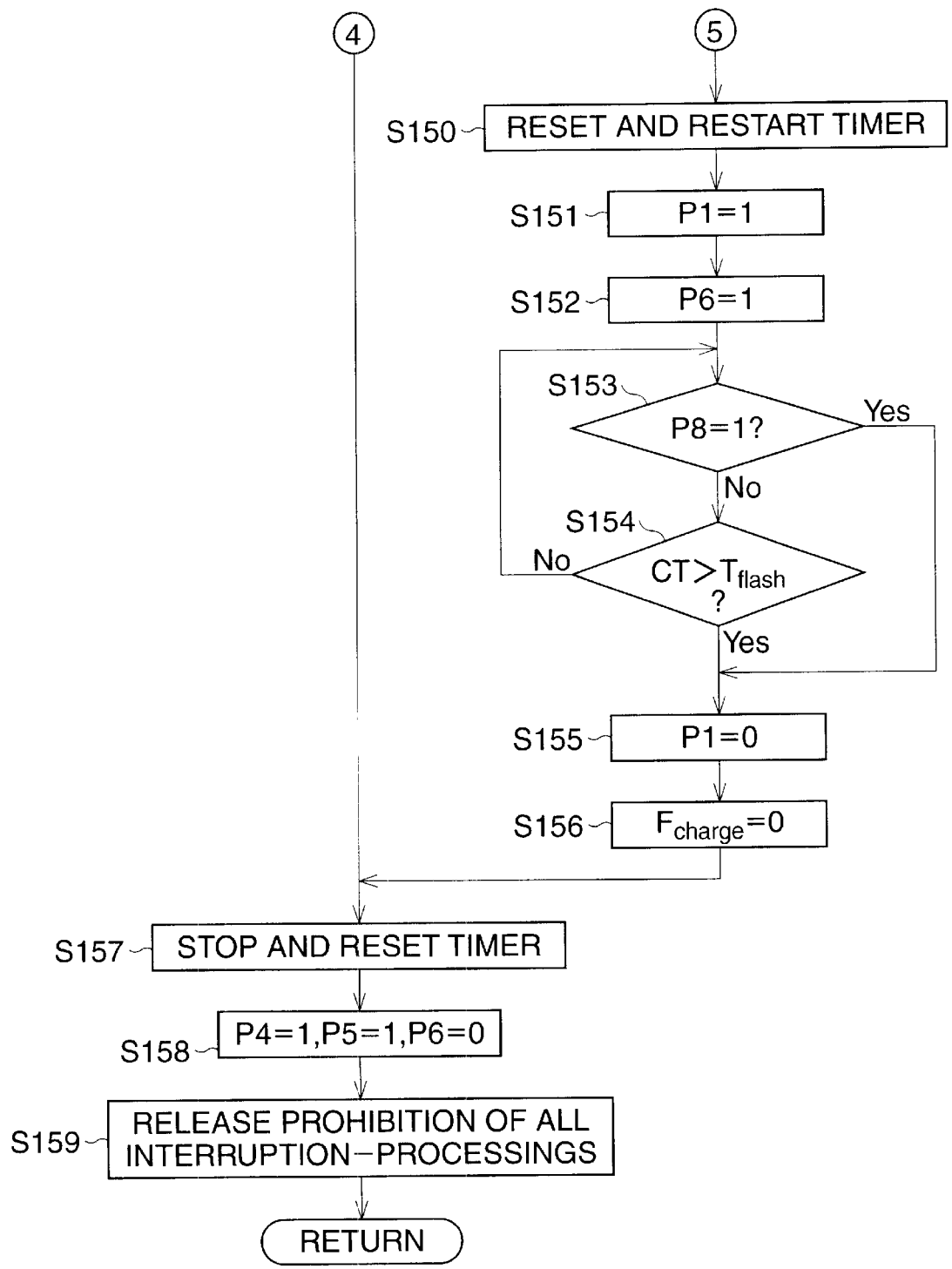
FIG. 24 is the remaining part of the flowchart of the P7-interruption routine executed in the main routine of FIGS. 20 and 21.

At step S108, a P7-interruption is enabled. Namely, when the signal level of the input port P7 is changed from the low level [0] to the high level [1], the high level signal [1] is allowed to be retrieved as an interruption signal by the CPU 123, thereby executing a P7-interruption routine as shown in FIGS. 23 and 24. Note, in the execution of the P7-interruption routine, a flash-light emission of the external flash device 100 is performed in accordance with an emission of aforesaid first and second light-pulse signals from the built-in flash device 16', as stated in detail hereinafter.

At step S112, it is determined whether the power ON/OFF switch 154a is in the OFF-state. When the power ON/OFF switch 154a is in the ON-state, the control returns to step S105.

On the other hand, at step S105, when $F_{charge}=0$, i.e. when the charging of the main capacitor 109 is unfinished, the control proceeds to step S109, in which the P7-interruption is disabled, due to the charging of the main capacitor 109 being unfinished. Also, at step S106, when the wireless mode is not selected, i.e. when the clip-on mode is selected, the control proceeds to step S109, in which the P7-interruption is disabled, whereby the flash-light emission of the external flash device 100 is prohibited in the wireless mode. In short, when the flag $F_{charge}$ is "0" or when the clip-on mode is selected, the P7-interruption routine cannot be executed.

At step S110, the signal level of the output port P4 is caused to be low [0], thereby turning OFF the analog switch 130, resulting in de-energization of the light-receiver circuit G5. Also, at step S110, the signal level of the output port P5 is caused to be low [0], and the signal level of the output port P6 is caused to be low [0], resulting in a standstill of the photo-transistor 138. Further, at step S110, the input level of the port $P_{ad}$ is caused to be low [0], thereby disabling a detection of a charge voltage of the main capacitor 109. Thus, the external flash device 100 can not operate in the wireless mode.

At step S111, a clip-on mode operation routine is executed so that the CPU 123 can be communicated with the system control circuit 40 of the camera 10 in a well-known manner, whereby a flash-light emission of the external flash device 100 is controlled by the system control circuit 40 of the camera 10.

Then, the control proceeds to step S112, in which it is determined whether the power ON/OFF switch 154a is in the OFF-state. When the power ON/OFF switch 154a is in the ON-state, the control returns to step S105.

As is apparent from the foregoing, as long as the power ON/OFF switch 154a is in the ON-state, the routine comprising steps S105 to S112 is repeatedly executed.

At step S112, when it is confirmed that the power ON/OFF switch is in the OFF-state, the control proceeds to step S113, in which all interruption-processings are prohibited in the CPU 123. At step S114, the output ports P1, P3, P4, P5, P6 and $P_{da}$ are initialized. Then, at step S115, the input port $P_{int}$ is enabled so as to receive an ON-signal from the power ON/OFF switch 145a. Thereafter, at step S116, the CPU 123 is put in a sleep mode in which a power consumption is approximately zero. Thus, the main routine cannot be executed until the power ON/OFF switch 154a is turned ON.

FIG. 22 shows a flowchart of the 125 ms-interruption routine. As stated above, when the 125 ms-timer-interruption is enabled at step S104 of the main routine of FIGS. 20 and 21, the 125 ms-interruption routine is executed at the regular time-interval of 125 ms.

At step S120, the 125 ms-timer-interruption is disabled, due to the CPU 123 being in the course of the execution of the 125 ms-interruption routine.

At step S121, the signal level of the output port P2 is caused to be high [1], thereby starting an electrical charge of the main capacitor 109. Then, at step S122, a digital charge voltage data CV, representing a charge voltage of the main capacitor 109, is retrieved from the charge-voltage detector circuit G2 via the port $P_{ad}$. At step S123, it is determined whether the charge voltage data CV is larger than a predetermined maximum voltage data $V_{max}$ (e.g. 330 volts). Note, the maximum voltage data $V_{max}$ is stored in the EEPROM 124, and is read from the EEPROM 124 in step S102 of the main routine of FIGS. 20 and 21.

At step S123, if $CV \leq V_{max}$, the control proceeds to step S125, in which it is determined whether the charge voltage data CV is larger than a minimum voltage data $V_{min}$, which is necessary to electrically energize the xenon lamp 115. Note, the minimum voltage data $V_{min}$ is also stored in the EEPROM 124, and is read from the EEPROM 124 in step S102 of the main routine of FIGS. 20 and 21.

At step S125, if $CV \leq V_{min}$, the control proceeds to step S126, in which the charge-indicating flag $F_{charge}$ is made to be "0". Then, at step S127, the indicator or LED 126 is lit to announce that the electrical charge of the main capacitor 109 is unfinished. Thereafter, at step S130, the 125 ms-timer-interruption is enabled, and the control returns to the main routine of FIGS. 20 and 21.

At step S123, if $CV > V_{max}$, i.e. if the main capacitor 109 is sufficiently charged, the control proceeds to step S124, in which the signal level of the output port P2 is caused to be low [0], thereby stopping the electrical charge of the main capacitor 109. Then, at step S128, the flag $F_{charge}$ is made to be "1". Subsequently, at step S129, the indicator or LED 126 is turned OFF to announce that a flash-light emission of the external flash device 100 is allowable.

At step S125, if $CV > V_{min}$, i.e. if the main capacitor 109 is charged to a level which is necessary to electrically energize the xenon lamp 115, the control proceeds to step 128, in which the flag $F_{charge}$ is made to be "1". Then, at step S129, the indicator or LED 126 is turned OFF to announce that a flash-light emission of the external flash device 100 is allowable.

Accordingly, when the power ON/OFF switch 154a is in the ON-state, the main capacitor 109 can be charged to the maximum voltage level (e.g. 330 volts).

FIGS. 23 and 24 show a flowchart of the P7-interruption routine. As mentioned above, the P7-interruption routine is executed when the P7-interruption is enabled at step S108 of the main routine of FIGS. 21 and 22, and when the signal level of the input port P7 is changed from the low level [0] to the high level [1]. Namely, the execution of the P7-interruption routine is started when the first light-pulse signal, emitted from the built-in flash device 16' of the camera 10, is detected by the light receiving circuit G5. Thus, the time, at which the signal level of the input port P7 is changed from the low level [0] to the high level [1], corresponds to the time of T1 shown in the timing chart of FIG. 5.

At step S140, all interruption-processings are prohibited in the CPU 123. Then, at step S141, a timer is started. Note, the timer may be defined in the CPU 123, and is utilized to count a time between the first and second light-pulse signals emitted from the built-in flash device 16'.

At step S142, it is monitored whether the signal level of the input port P7 is changed from the high level [1] to the low level [0]. When the change of the signal level of input port P7 from the high level [1] to the low level [0] is confirmed (T2 in FIG. 5), the control proceeds to step S143, in which it is determined whether the signal level of the input port P7 is again changed from the low level [0] to the high level [1], i.e. it is determined whether the second light-pulse signal, emitted from the built-in flash device 16' of the camera 10, is detected by the light receiving circuit G5.

At step 143, when the change of the signal level of input port P7 from the low level [0] to the high level [1] is not confirmed, the control proceeds to step S145, in which it is determined whether a time CT, counted by the timer, is larger than a predetermined maximum time data $T_{max}$ (e.g. 2.0 ms), which is determined on the basis of a control range of the exposure factor $A_VE$ in the external flash device 100. Note, the maximum time data $T_{max}$ is stored in the EEPROM 124, and is read from the EEPROM 124 in step S102 of the main routine of FIGS. 20 and 21.

At step S145, if $CT \leq T_{max}$, the control returns to step S143. When the change of the signal level of input port P7 from the low level [0] to the high level [1] is confirmed without the counted time CT reaching the maximum time data $T_{max}$, i.e. when the second light-pulse signal, emitted from the built-in flash device 16' of the camera 10, has been detected by the light receiving circuit GS (T3 in FIG. 5), the control proceeds from step S143 to step S144, in which the counted time CT is set as a time interval data $TA_V$ between the emissions of the first and second light-pulse signals from the built-in flash device 16'.

At step S146, it is determined whether the set time interval data $TA_V$ is smaller than a predetermined minimum time data $T_{min}$ (e.g. 0.9 ms), which is determined on the basis of the control range of the exposure factor $A_VE$ in the external flash device 100. Note, the minimum time data $T_{min}$ is also stored in the EEPROM 124, and is read from the EEPROM 124 in step S102 of the main routine of FIGS. 20 and 21.

At step S146, if $TA_V \geq T_{min}$, the control proceeds to step S147, a correction data α is added to the time interval data $TA_V$. The correction data α is to correct characteristic variations in electronic parts, such as the photo-transistor 138, the capacitors 134 and 134 and so on, of the external flash device 100. Note, the correction data α is also stored in the EEPROM 124, and is read from the EEPROM 124 in step S102 of the main routine of FIGS. 20 and 21.

At step S148, the output signal level of the output port P5 is determined in accordance with a magnitude of the corrected time interval data $TA_V$. Also, at step S148, a reference voltage is output to the second input terminal (+) of the comparator 145 via the output port $P_{da}$ (S28 in FIG. 5) and a level of the output reference voltage is determined in accordance with the magnitude of the corrected time interval data $TA_V$.

Referring to the table of FIG. 18, a relationship between the time interval data $TA_V$, the reference voltage and the output signal level of the output port P6 are shown. Note, in this table, "$VA_V$" represents the reference voltage.

As shown in the table of FIG. 18, when the time interval data $TA_V$ is equal to or smaller than "1.5 ms", the signal level of the output port P5 is caused to be low [0], thereby turning OFF the analog switch 131 so that an electrical connection is established between the collector of the photo-transistor 138 and the capacitor 137 exhibiting the small capacitance (of course, provided that P6=1). On the other hand, when the time interval data $TA_V$ is larger than "1.5 ms", the signal level of the output port P5 is caused to be high [1], thereby turning ON the analog switch 131 so that an electrical connection is established between the collector of the photo-transistor 138 and both the capacitor 136 exhibiting the large capacitance and the capacitor 137 exhibiting the small capacitance (of course, provided that P6=1). Note, the ratio of the capacitor 137 to the capacitor 136 in capacitance is 1:31, as stated above.

At step S149, it is monitored whether the signal level of the input port P7 is changed from the high level [1] to the low level [0]. When the change of the signal level of input port P7 from the high level [1] to the low level [0] is confirmed (T4 in FIG. 5), the control proceeds to step S150, in which the timer is reset, and is restarted.

At step S151, the signal level of the output port P1 is caused to be high [1], thereby turning ON the IGBT 117 so that an flash-light emission of the xenon lamp 115 starts (T5 and S22 in FIG. 5). Note, as already stated, the time period $T_{d1}$, as shown in FIG. 5, is as very short as negligible, and thus the times of T4 and T5 substantially coincide with each other.

At step S152, the signal level of the output port P6 is caused to be high [1], thereby turning ON the analog switch 132 so that an electric connection is established between the collector of the photo-transistor 138 and either only the capacitor 137 or both the capacitors 136 and 137. Thus, a part of the flash-light emission of the xenon lamp 115 is detected as a reflected light by the photo-transistor 138 of the light receiver 155, thereby producing a collector current in the photo-transistor 138 (S10 in FIG. 5), and the produced collector current is accumulated in either only the capacitor 137 or both the capacitors 136 and 137, thereby developing a charge voltage therein. The developed charge voltage is gradually increased (S25 in FIG. 5), and is input to the first input terminal (−) of the comparator 145.

At step S153, it is determined whether the signal level of the input port P8 has been changed from the low level [0] to the high level [1], i.e. it is determined whether the charge voltage, developed in either only the capacitor 137 or both the capacitors 136 and 137 has reached the reference voltage $VA_V$. When the change of the signal level of the input port P8 from the low level [0] to the high level [1] is not confirmed, the control proceeds to step S154, in which it is determined whether a time CT, counted by the timer, is larger than a maximum flashing-time data $T_{flash}$ of the external flash device 100.

At step S154, if $CT \leq T_{flash}$, the control returns to step S153. When the change of the signal level of input port P8 from the low level [0] to the high level [1] is confirmed without the counted time CT reaching the maximum charging-time data $T_{flash}$, i.e. when the charge voltage, developed in either only the capacitor 137 or both the capacitors 136 and 137 reaches the reference voltage $VA_V$ (T6 in FIG. 5), the control proceeds the control proceeds from step S153 to step S155, in which the signal level of the output port P1 is caused to be low [0], thereby turning OFF the IGBT 117, resulting in stoppage of the flash-light emission from the xenon lamp 115.

At step S156, the flag $F_{charge}$ is made to be "0" in order to start an electrical charging of the main capacitor 109. Then, at step S157, the timer is stopped and reset.

At step S158, the signal level of each of the output ports P4 and P5 is caused to be high [1], and the signal level of the output port P6 is caused to be low [0]. Namely, these output ports are returned to the previous state prior to the execution of the P7-interruption routine. Then, at step S159, the prohibition of all interruption-processings in the CPU 123 is released. Thereafter, the control returns to the main routine of FIGS. 20 and 21.

At step S145, when the counted time CT reaches the maximum time data $T_{max}$ without confirming the change of the signal level of input port P7 from the low level [0] to the high level [1], i.e. when the emission of the second light-pulse signal from the built-in flash device 16' cannot be detected by the photo-transistor 138, the control immediately proceeds from step S145 to step S157, and the routine comprising steps S157, S158 and S159 is executed as mentioned above, resulting in discontinuance of the execution of the P7-interruption routine.

Also, at step S146, when the set time interval data $TA_V$ is smaller than the minimum time data $T_{min}$ (e.g. 0.9 ms), it is determined that the emission of the second light-pulse signal from the built-in flash device 16' is erroneously detected by the photo-transistor 138. Thus, the control immediately proceeds from step S146 to step S157, and the routine comprising steps S157, S158 and S159 is executed as mentioned above, resulting in discontinuance of the execution of the P7-interruption routine.

Further, at step S154, when the counted time CT, is larger than the maximum flashing-time data $T_{flash}$ of the external flash device 100, it is determined that the flash-light emission of the external flash device 100 is erroneously controlled. Thus, the control immediately proceeds from step S154 to step S155, and the routine comprising steps S155, S156, S157, S158 and S159 is executed as mentioned above, resulting in discontinuance of the execution of the P7-interruption routine.

Figure 25:
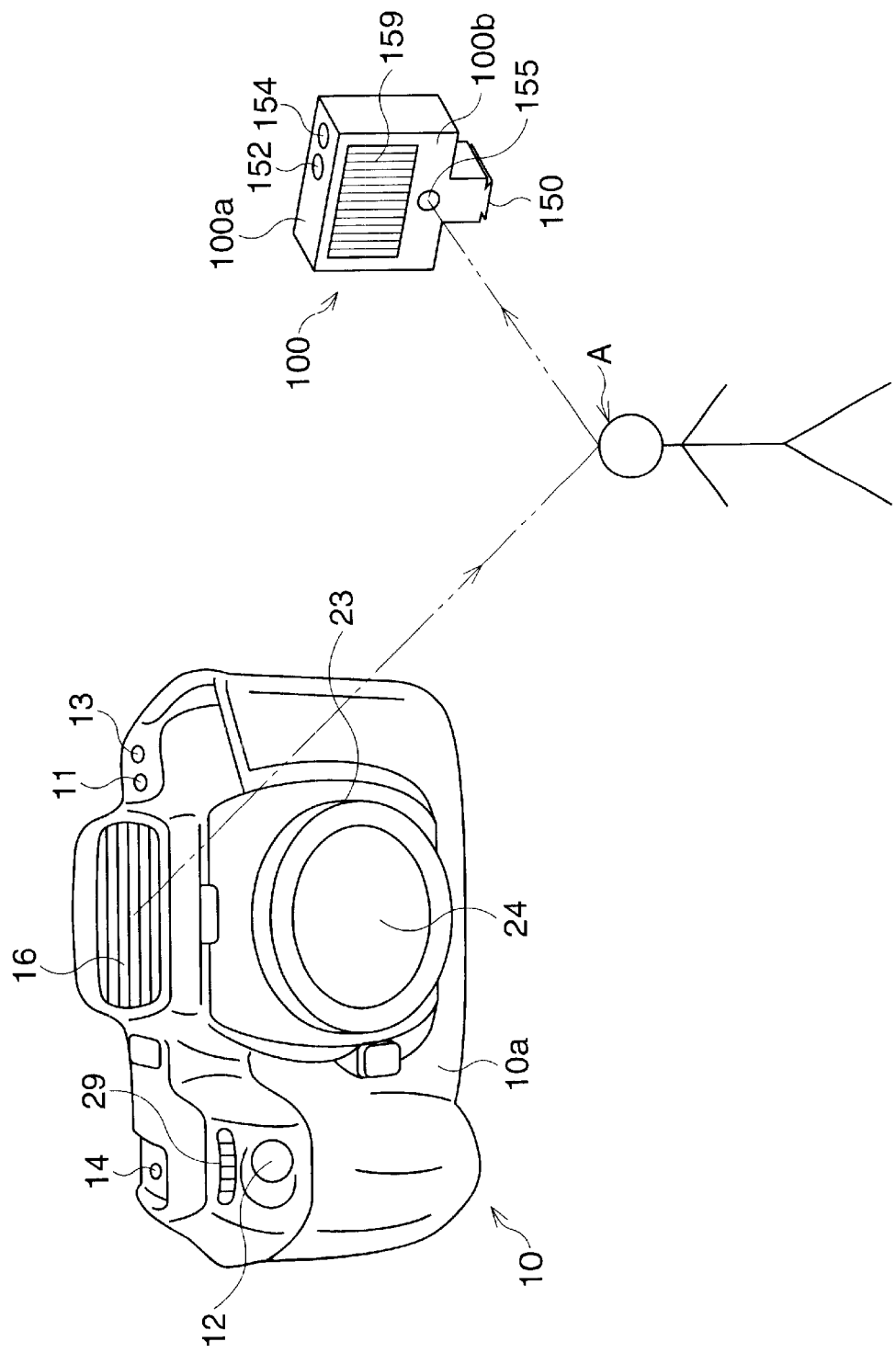
FIG. 25 is a perspective view schematically showing a situation in which an object is photographed by a single lens reflex (SLR) type camera, using an external flash device, in accordance with a second embodiment of a flash control system of the present invention.

FIG. 25 schematically shows a situation in which the object A is photographed by a single lens reflex type camera (referred to as SLR camera hereinafter) 110, using the aforesaid external flash device 100, and a flash-light-emission of the external flash device 100 is controlled by a second embodiment of a flash-control system according to the present invention. In FIG. 25, the elements similar to those of the camera 10 shown in FIG. 1 are indicated by the same references. Namely, in this drawing, respective references 10a, 11, 12, 13, 16, 23 and 24 indicate a camera body, a flash-mode selection switch button 11, a release switch button 12, a power ON/OFF switch button 13, a flash-window 16, a lens barrel 23 and a photographing lens system 24, and each of these elements functions in substantially the same manner as mentioned above. Note, in FIG. 25, reference 29 indicates a rotary dial for manually setting a stop value of a diaphragm of the SLR camera 110.

Figure 26:
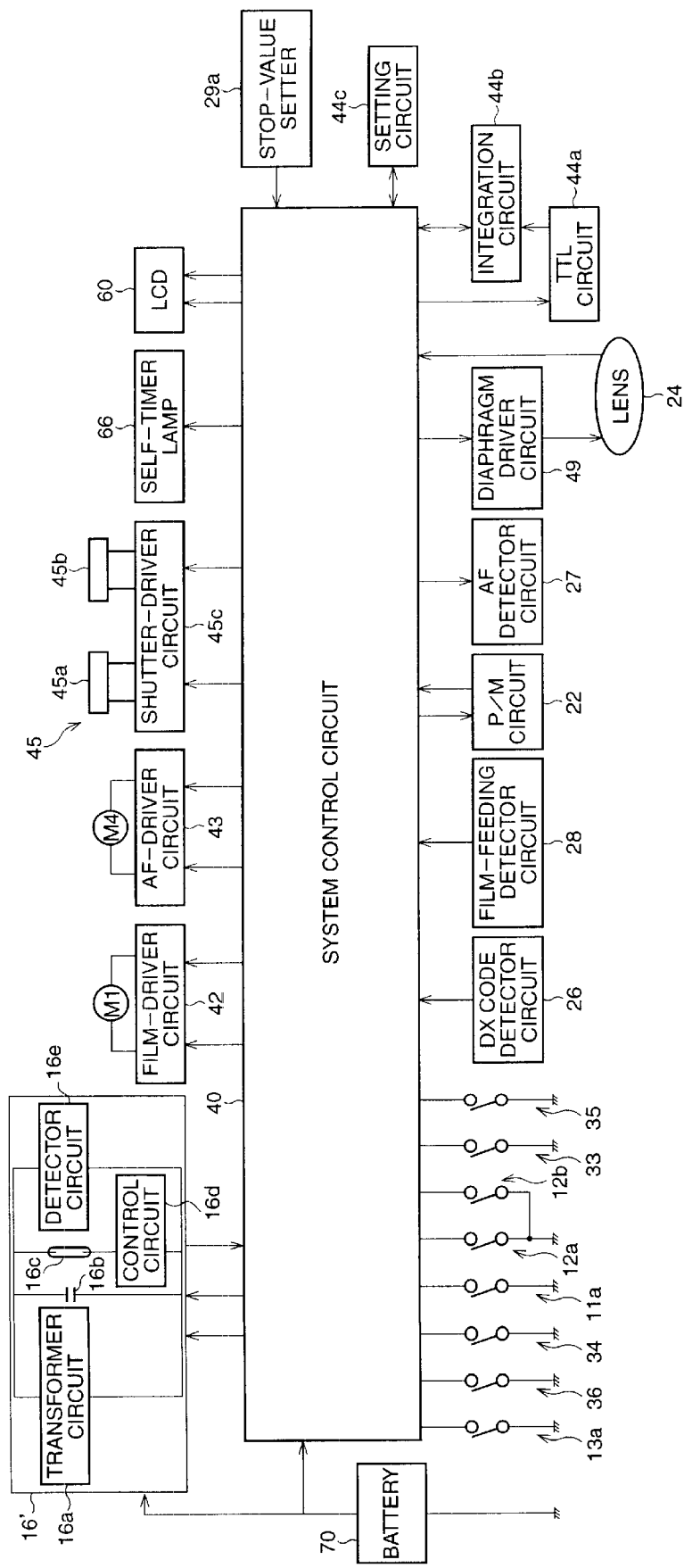
FIG. 26 is a schematic block diagram of the SLR camera.

FIG. 26 schematically shows an block diagram of the SLR camera 110. In this drawing, the features similar to those of FIG. 2 are indicated by the same references.

Similar to the aforesaid LS camera 10, the SLR camera 110 is also provided with a system control circuit 40, which may be constituted as a microcomputer, used to control the SLR camera 110 as a whole, comprising, a central processing unit (CPU), a read-only memory (ROM) for storing programs and constants, a random-access memory (RAM) for storing temporary data, and an input/output interface circuit (I/O).

The system control circuit 40 is electrically powered by a battery 70, and the power ON/OFF switch button 13 is associated with a power ON/OFF switch 13a, which is turned ON and OFF by manipulating the power switch button 13. When the power ON/OFF switch is turned OFF, the CPU of the system control circuit 40 is put in a sleep mode in which a power consumption is approximately zero, and, when the power ON/OFF switch is turned ON, the CPU of the system control circuit 40 is put in an active mode.

As well known, the SLR camera 110 features a focal-plane shutter, generally indicated by reference 45, which includes an electromagnetic leading-shutter-actuating mechanism 45a, an electromagnetic trailing-shutter-actuating mechanism 45b, and a shutter driver circuit 45c for driving both the mechanisms 45a and 45b under control of a system control circuit 40. The focal-plane shutter 45 further includes a leading shutter curtain and a trailing shutter curtain actuated by the mechanisms 45a and 45b, respectively.

Each of the shutter curtains is movable between a first position (i.e. an initial position) and a second position (i.e. an end position), and is associated with a spring such hat each curtain is elastically moved from the first position toward the second position. Usually, each of the shutter curtains is constrained by the corresponding mechanism (45a, 45b) at the first position against the elastic force of the spring. During a photographing operation, the leading shutter curtain is released from the first position so as to be elastically moved toward the second position, thereby opening the focal-plane shutter 45, and then the trailing shutter curtain is released from the first position so as to be elastically moved toward the second position, thereby closing the focal-plane shutter 45. Namely, a duration of a shutter-open time is defined as a duration of time between a time at which the leading shutter curtain is released from the first position and a time at which the trailing shutter curtain is released from the first position.

Also, in the SLR camera 110, the aforesaid diaphragm, which may be manually operated by the rotary dial 29, is incorporated in a photographing lens system 24 to adjust an amount of light passing therethrough. The diaphragm comprises a plurality of blades which are radially and movably arranged so as to define continuously varying apertures, whereby the amount of light passing through the photographing lens system 24 is adjustable. Usually, an aperture of the diaphragm is represented as a stop value. Of course, the larger the aperture of the diaphragm, the smaller the stop value, and vice versa.

The stop value of the diaphragm is adjustable in either an automatic program mode or a manual mode.

In the automatic program mode, the diaphragm is actuated by a diaphragm motor incorporated in the lens barrel 23, and the diaphragm motor is driven by a diaphragm driver circuit 49 provided in the lens barrel 23. Of course, in the automatic program mode, the diaphragm is automatically given a setting of the stop value, as stated in detail hereinafter. Note, when the lens barrel 23 is attached to the camera body 10a, as shown in FIG. 25, the diaphragm driver circuit 49 is electrically connected to the system control circuit 40.

On the other hand, in the manual mode, the diaphragm is manually given a setting of the stop value by manipulating the rotary dial 29 (FIG. 25). The rotary dial 29 is associated with a manual stop-value setter 29a (FIG. 26) having a stop-value detector for detecting a stop value manually set thereby, and the manual stop-value setter 29a is connected to the system control circuit 40 via the stop-value detector. Thus, the manually-set stop value is suitably retrieved as a stop value data by the system control circuit 40 from the manual stop-value-setter 29a.

Similar to the aforesaid LS camera 10, the SLR camera 110 is provided with an internal or built-in flash device, associated with the flash-window 16, which is generally indicated by reference 16', and the built-in flash device 16' is electrically powered by the battery 70. The built-in flash device 16' is essentially identical to that of FIG. 2. Namely, respective references 16a, 16b, 16c, 16d and 16e indicate a step-up transformer circuit, a main capacitor, a flash lamp, such as a xenon lamp, a flash-light-emission control circuit, a charge-voltage detector circuit, and each of these elements functions in essentially the same manner as explained with reference to FIG. 2. Also, the flash-light-emission control circuit 16d has an insulated-gate bipolar transistor (IGBT) incorporated therein to control the energization of the flash lamp 16c, i.e. a turn-ON and a turn-OFF of the flash lamp 16c.

Note, the focal-plane shutter 45 is associated with a shutter switch 33, which is turned ON when the leading shutter curtain reaches the second position, i.e. when the focal-plane shutter 45 is fully opened, and the shutter switch 33 is utilized to determine a timing at which a flash-light should be emitted from the built-in flash device, as explained in detail hereinafter.

Similar to the aforesaid LS camera 10, a back-cover switch 36 is used to detect whether a back-cover of the camera body 10a is opened or closed, and functions in essentially the same manner as in FIG. 2. Of course, the back-cover switch 36 is associated with a DX code detector circuit 26. When it is detected by a change of the back-cover switch 36 from an OFF-state to an ON-state that a film cartridge has been loaded in the camera 110, a DX code data, representing a sensitivity of a photographic film concerned, is read from the loaded film cartridge by the DX code detector circuit 26, and is then retrieved by the system control circuit 40.

Also, the back-cover switch 36 is associated with a film-driver circuit 42 for driving a film-feeding motor M1, and the film-driver circuit 42 is operated under control of the system control circuit 40. When the loading of the film cartridge, i.e. the change of the back-cover switch 36 from the OFF-state to the ON-state is detected by the system control circuit 40, the film-driver circuit 42 is operated, thereby driving the film-feeding motor M1 such that the film is drawn out of the film cartridge by a predetermined length, and thus a first frame of the film is positioned onto a photographing plane.

Of course, similar to the aforesaid LS camera 10, whenever a photographing operation is completed, the film-feeding motor M1 is automatically driven by the film-driver circuit 42 such that the film is fed from the film cartridge by one frame length of the film. Namely, a film-feeding detector circuit 28 is used to detect a feeding of one frame of the film. When the feeding of one frame of the film is detected by the film-feeding detector circuit 28, the driving of the film-feeding motor M1 is stopped.

Similar to the aforesaid LS camera 10, a film-rewinding switch 34 is manipulated by a film-rewinding switch button, which may be provided in a bottom of the camera body 10a of the SLR camera 110, and is associated with the film-driver circuit 42 for driving the film-feeding motor M1. When the film-rewinding switch 34 is turned ON, the film-feeding motor M1 is reversely driven such that the film is forcibly rewound in the film cartridge. Of course, after the last frame of the film is exposed by a photographing operation, the film-feeding motor M1 is reversely driven for rewinding all the film in the film cartridge. Note, it is detected by the film-feeding detector circuit 28 whether the rewinding of the film is completed.

In the SLR camera 110, the release switch button 12 is also associated with both a photometry measurement switch 12a and a release switch 12b. Similar to the aforesaid LS camera 10, when the release switch button 12 is partly depressed, the photometry measurement switch 12a is turned ON, and, when the release switch button 12 is fully depressed, the release switch 12b is turned ON.

The photometry measurement switch 12a is associated with a photometry measurement circuit 22 having a photometry measurement sensor. When photometry measurement switch 12a is turned ON, it detects an intensity of light, reflected from the object A, through the photographing lens system 24, thereby producing a luminance signal representing a luminance of the object A. The respective luminance signal is suitably retrieved as a luminance data by the system control circuit 40.

Further, the photometry measurement switch 12a is associated with an automatic-focusing (AF) detector circuit 27 having an image sensor for detecting a defocus-amount of an image of the object A formed on the image sensor through the photographing lens system 24, and the detected defocus-amount of the image is retrieved as a defocus data from the AF detector circuit 27 by the system control circuit 40. The AF detector circuit 27 is then associated with an AF-driver circuit 43 for driving an AF-focusing motor M4, and the AF-driver circuit 43 is operated under control of the system control circuit 40 to drive the AF-focusing motor M4, which is associated with an automatic focusing mechanism incorporated in the photographing lens system 24. Whenever the photometry measurement switch 12a is turned ON, the automatic focusing mechanism is actuated by driving the AF-focusing motor M4, such that the photographing lens system 24 is moved from an initial position in accordance with the retrieved defocus data, thereby properly focusing the image of the object A on the aforesaid image sensor.

Further, the release switch 12b is associated with the shutter-driver circuit 45c of the focal-plane shutter 45. Namely, when the release switch 12b is turned ON, the focal-plane shutter 45 is opened over a given shutter-open time duration by actuating in turn the leading-shutter-actuating mechanism 45a and the trailing-shutter-actuating mechanism 45b. In particular, as stated above, the leading shutter curtain is released from the first position so as to be elastically moved toward the second position, thereby opening the focal-plane shutter 45, and then the trailing shutter curtain is released from the first position so as to be elastically moved toward the second position, thereby closing the focal-plane shutter 45.

Similar to the aforesaid LS camera, the flash-mode selection switch button 11 is associated with a flash-mode selection switch 11a, which is turned ON by a depression of the flash-mode selection switch button 11. By manipulating the flash-mode selection switch button 11, one of an automatic internal flash mode, an internal flash-OFF mode, an internal flash-ON mode and the external flash-ON mode is selected. Namely, a selection of each individual flash mode is sequentially and cyclically switched in a given order by every turning ON of the flash-mode selection switch 11a.

As shown in FIG. 26, the system control circuit 40 is provided with a self-timer switch 35, which is operated by a self-timer switch button provided at a suitable location on the camera body 10a of the SLR camera 110. When the self-timer switch 35 is turned ON, the focal-plane shutter 45 cannot be immediately operated by a turn-ON of the release switch 12b. Namely, the operation of the focal-plane shutter 45 is delayed until a given time period, for example, 10 sec elapses after the turn-ON of the release switch 12b. Also, the system control circuit 40 is provided with a self-timer lamp 66, which is blinked ON and OFF while the aforesaid given time period elapses.

Further, the system control circuit 40 is provided with a TTL (through the lens) light-receiver circuit 44a, which is utilized to control an amount of a flash-light emission of the built-in flash device 16' when the object A is photographed with the flash-light emission of the built-in flash 16'. The TTL light-receiver circuit 44a has a photo-sensor which is arranged such that light, made incident on a film to be photographed, is sensed as a reflected light by the photo-sensor. Namely, during the flash-light emission of the built-in flash device 16', the light, which passes through the photographing lens system 24, is sensed as a part of the flash-light emission of the built-in flash device 16' by the photo-sensor of the TTL light-receiver circuit 44a.

As shown in FIG. 26, the TTL light-receiver circuit 44a is associated with an integration circuit 44b. The light, sensed by the photo-sensor of the TTL light-receiver circuit 44a, is converted into an electric charge, and the converted electric charge is accumulated in the integration circuit 44b, in which a voltage is developed in accordance with the accumulation of the electric charge. The developed voltage is suitably retrieved as a voltage data by the system control circuit 40 from the integration circuit 44b. Of course, the retrieved voltage data represents a total amount of the light sensed by the photo-sensor of the TTL light-receiver circuit 44a.

The TTL light-receiver circuit 44a is also associated with a reference-voltage setting circuit 44c which outputs a reference voltage to the system control circuit 40. In the reference-voltage setting circuit 44c, a reference voltage is produced on the basis of a DX code data, obtained from the DX code detector circuit 26, and so on, and thus the produced reference voltage corresponds to an amount of a flash-light to be emitted from the built-in flash device 16' to photograph the object with a proper exposure. The produced reference voltage is suitably retrieved as a reference voltage data by the system control circuit 40 from the reference-voltage setting circuit 44c.

During the flash-light emission of the built-in flash device 16', the voltage data, representing a total amount of the light sensed by the photo-sensor of the TTL light-receiver circuit 44a, is compared with the reference voltage data obtained from the reference-voltage setting circuit 44c. When the voltage data reaches the reference voltage data, the flash-light emission of the built-in flash device 16' is stopped.

Similar to the aforesaid LS camera 10, the SLR camera 110 is also provided with a liquid crystal display (LCD) 30 which is arranged at a suitable location on the camera body 10a of the SLR camera 110. Of course, the LCD 30 is operated under control of the system control circuit 40, and displays various messages regarding a selected flash mode, a number of frames of a loaded film cartridge and so on.

Similar to the aforesaid first embodiment, when a photographing operation is performed in the situation as shown in FIG. 25, i.e. when the external flash-ON mode and the wireless mode are selected in the SLR camera 110 and the external flash device 100, respectively, the built-in flash device of the SLR camera 110 is used as a light-signal-producing source for controlling both an amount of flash-light-emission and a flash-timing of the external flash device 100.

Figure 27:
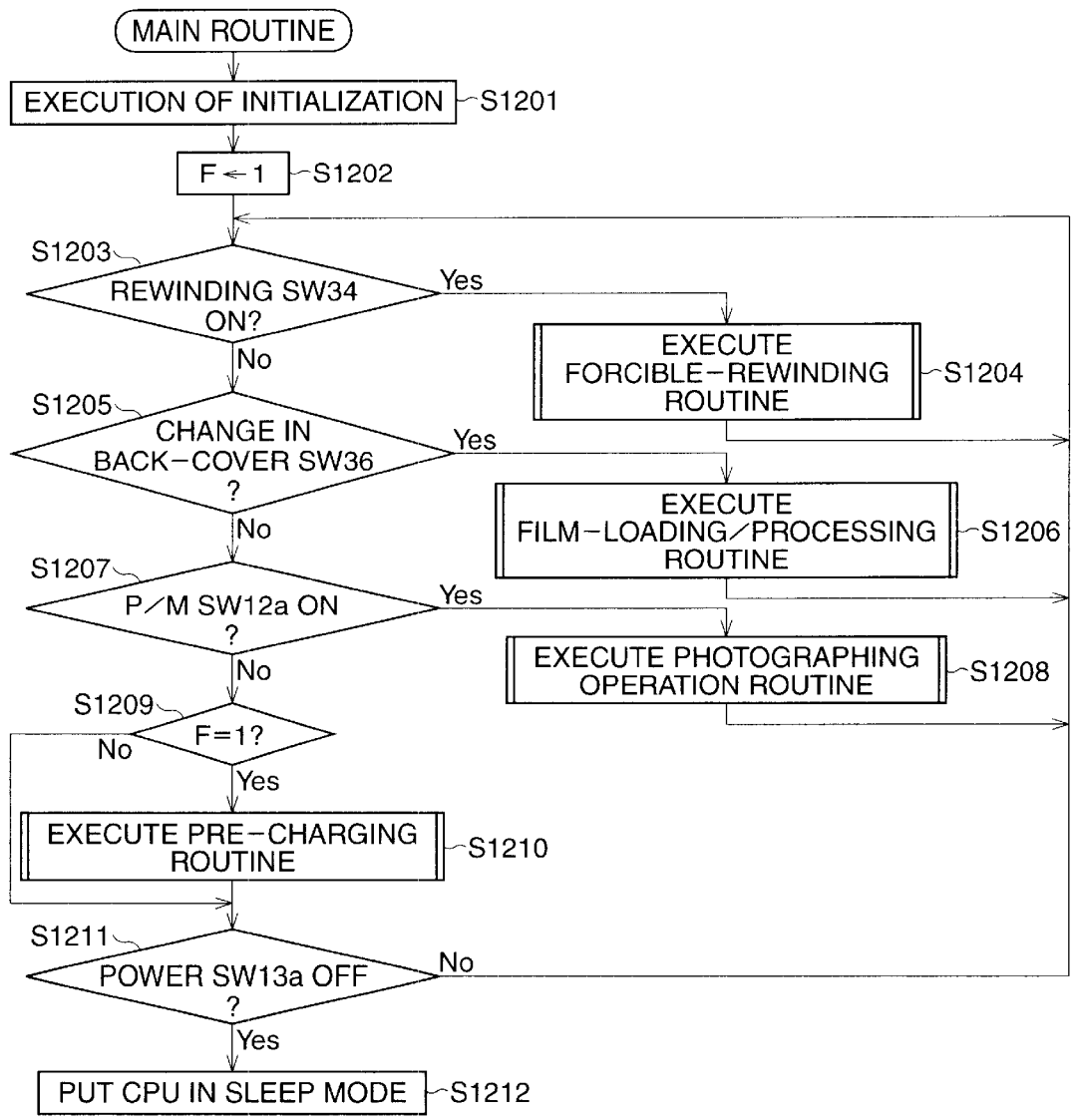
FIG. 27 is a flowchart of a main control routine executed in a system control circuit of the SLR camera.

FIG. 27 shows a flowchart of a main routine executed in the system control circuit 40 of the SLR camera 110. Namely, the SLR camera 110 operates in accordance with the main routine. The main routine is executed by turning ON the power ON/OFF switch 13a, and the execution of the main routine is repeated as long as the power ON/OFF switch 13a is in the ON-state.

At step S1201, the system control circuit 40 is subjected to initialization. Namely, the system control circuit 40 includes various elements, such as CPU, RAM, input ports, output ports, registers and so on, and these elements are initialized.

At step S1202, a flag F is made to be "1". The flag F indicates whether an electrical charging of the main capacitor 16b of the built-in flash device 16' is required. Namely, when the charge-requiring flag F is given a setting of "1", the electrical charging of the main capacitor 16b is required, and, when the charge-requiring flag F is given a setting of "0", the electrical charging of the main capacitor 16b is not required.

At step S1203, it is determined whether the film-rewinding switch 34 has been turned ON. When the turn-ON of the switch 34 is confirmed, the control proceeds to step S1204, in which a forcible-rewinding routine is executed. Namely, the film, loaded in the SLR camera 110, is forcibly rewound. Thereafter, the control returns step S1203. Note, it is detected by the film-feeding detector circuit 28 whether the rewinding of the film has been completed.

At step S1203, if the film-rewinding switch 34 is in the OFF-state, the control proceeds to step S1205, in which it is determined whether a change of the back-cover switch 36 has occurred. When the back-cover switch 36 has changed from an OFF-state to an ON-state, i.e. when it is reckoned that a loading of a film cartridge has been performed, the control proceeds to step S1206, in which a film-loading/processing routine, involved in the loading of the film cartridge, is executed. Thereafter, the control returns to step S1203.

In executing the film-loading/processing routine, first, a film counter, contained in the system control circuit 40, is reset to "0" when the back-cover switch 36 is turned OFF (i.e. when the back-cover is opened). Note, a counting result of the film counter is displayed on the LCD 30. Also, the driver circuit 42 is operated, thereby driving the film-feeding motor M1 such that the film is drawn out of the film cartridge by a predetermined length, and thus a first frame of the film is positioned onto the photographing plane. Further, a DX code data, representing a sensitivity of the film, is read from the loaded film cartridge by the DX code detector circuit 26.

At step S1205, when a change has not occurred in the back-cover switch 36, the control proceeds to step S1207, in which it is determined whether the photometry measurement switch 12a has been turned ON, i.e. whether the release switch button 12 has been partly depressed. When the turn-ON of the photometry measurement switch 12a is confirmed, the control proceeds to step S1208, in which a photographing operation routine is executed. Thereafter, the control returns to step S1203.

Of course, as stated above, when the switch 12a is turned ON, the photometry measurement circuit 22 are electrically energized. Namely, a luminance of the object A is measured by the photometry measurement circuit 22, thereby producing a luminance signal in the circuit 22.

Note, the photographing operation routine is explained in detail hereinafter with reference to FIGS. 28 and 29.

At step 1207, when the turn-ON of the photometry measurement switch 12a is not confirmed, the control proceeds to step S1209, in which it is determined whether the charge-requiring flag F is "1" or "0". If F=1, the control proceeds to step S1210, in which a pre-charging routine, as shown in FIG. 9, is executed for performing the electrical charging of the main capacitor 16b, whereby the built-in flash device 16' is made available for a flash-light emission, and then the control proceeds to step S1211. On the other hand, at step S1209, if F=0, the control skips to step S1211.

In either event, at step S1211, it is determined whether the power ON/OFF switch 13a has been turned OFF. If the power ON/OFF switch is in the ON-state, the control returns to step S1203. Namely, as long as the power ON/OFF switch 13a is in the ON-state, the routine comprising steps S1201 to S1211 is repeated.

At step S1211, when the OFF-state of the power ON/OFF switch 13a is confirmed, the control proceeds to step S1212, in which the CPU of the system control circuit 40 is put in the sleep mode, and the main routine cannot be executed until the power ON/OFF switch 13a is turned ON.

Figure 28:
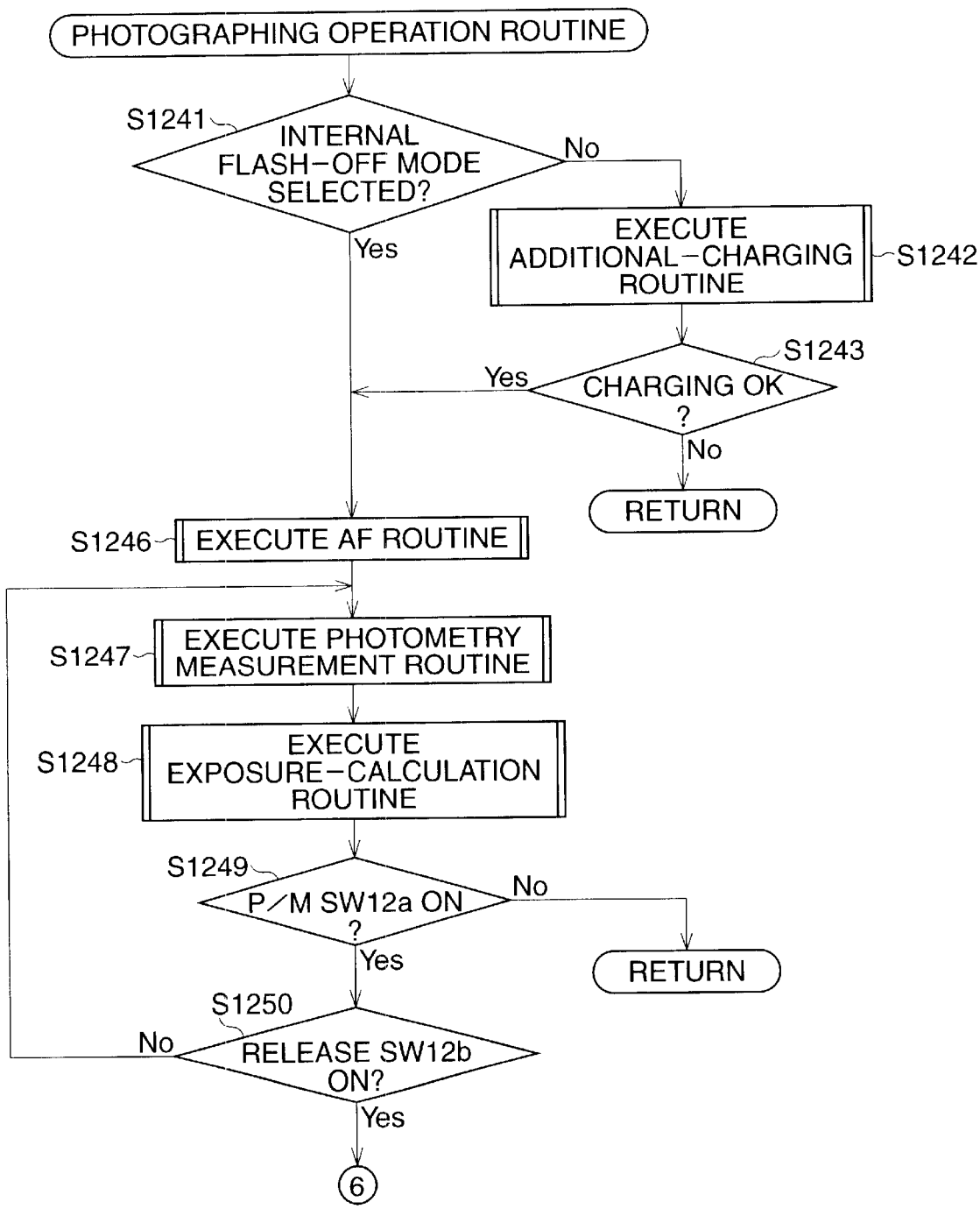
FIG. 28 is a part of a flowchart of a photographing operation routine executed in the main routine of FIG. 27.
Figure 29:
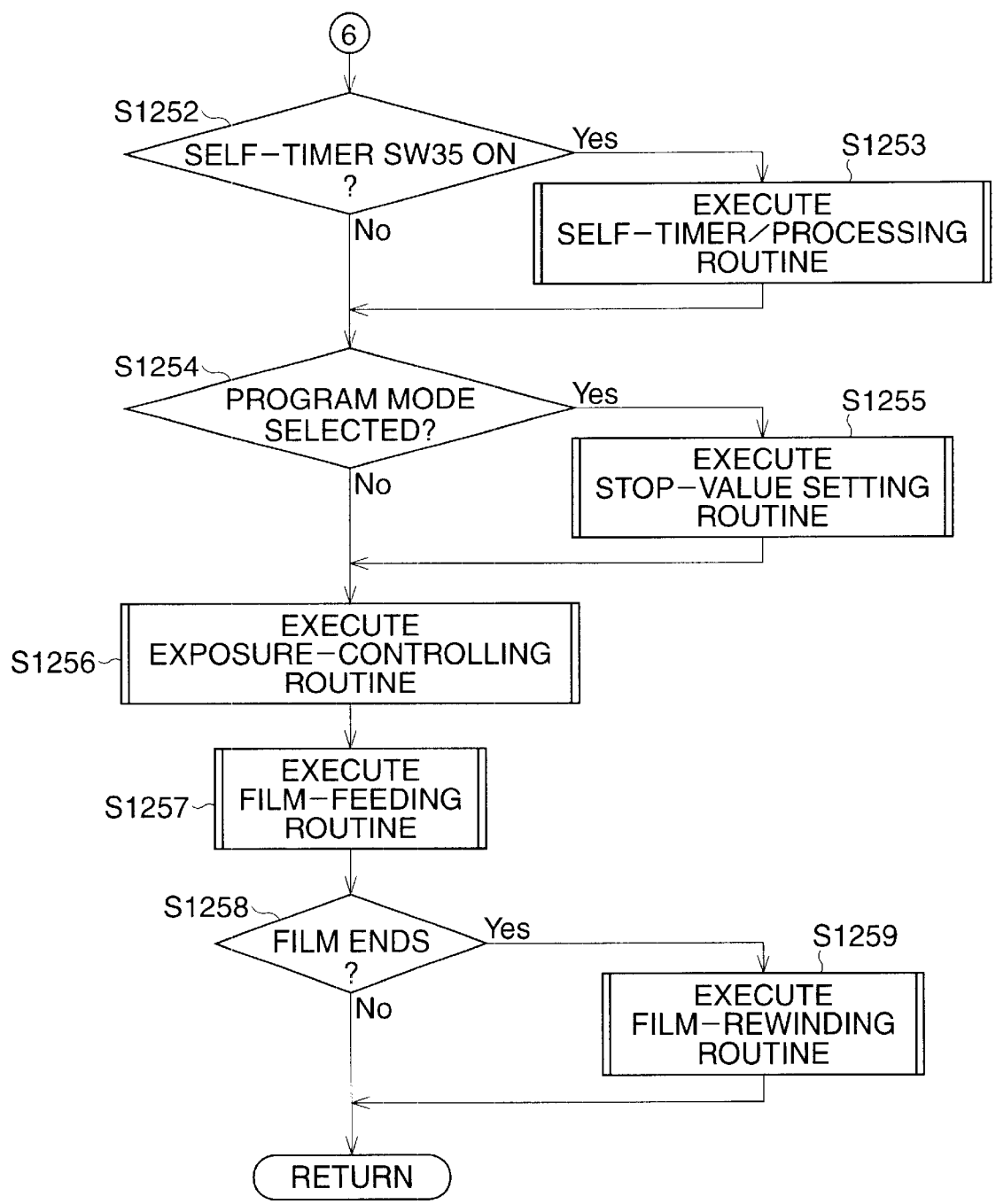
FIG. 29 is the remaining part of the flowchart of the photographing operation routine executed in the main routine of FIG. 27.

FIGS. 28 and 29 show a flowchart of the photographing operation routine executed in step S1208 of the main routine of FIG. 27.

At step S1241, it is determined whether the internal flash-OFF mode has been selected. When the selection of the internal flash-OFF mode is not confirmed, i.e. when a flash-light emission of the built-in flash device 16' is allowed upon photographing, the control proceeds to step S1242, in which an additional-charging routine is executed for performing an additional-electrical charging of the main capacitor 16b such that the built-in flash device 16' is allowed to emit a flash-light in a photographing operation.

Note, the additional-charging routine, executed at step S1204, is substantially identical to that shown in FIG. 10, except that: at step S301, a suitable symbol is displayed on the LCD 30 in a blinking mode, in place of blinking ON and OFF the red lamp 62, thereby announcing that the built-in flash device 16' is in the course of the additional-electric charging state; at step S309, the display of the symbol on the LCD 30 is changed from the blinking mode to a continuously-displayed mode, in place of continuously lighting the red lamp 62, thereby announcing that the additional-charging of the main capacitor 16b is properly performed; and, at step 315, the symbol disappears from the LCD 30, in place of turning OFF the red lamp 62, thereby announcing that the additional-charging of the main capacitor 16b is improperly performed.

At step S1243, it is determined whether the additional-charging of the main capacitor 16b has been properly performed by the execution of the additional-charging routine. If the additional-charging of the main capacitor 16b is improper, the control immediately returns to the main routine of FIG. 27.

At step S1243, when the additional-charging of the main capacitor 16b is proper, the control proceeds to step S1246. Also, at step 1241, when the selection of the internal flash-OFF mode is confirmed, i.e. when a flash-light emission of the built-in flash device 16' is not allowed upon photographing, the control skips to step S1246.

In either event, at step 1246, an automatic focusing (AF) routine is executed. In the execution of the AF routine, a defocus data, representing a degree of defocus of an image of the object A to be photographed, is retrieved from the AF detector circuit 27, and the automatic focusing mechanism, incorporated in the photographing lens system 24, is actuated by driving the AF-focusing motor M4, such that the lens system 24 is moved from the initial position in accordance with the retrieved defocus data, thereby properly focusing the image of the object A on a photographing plane.

At step S1247, a photometry measurement routine is executed, whereby a luminance signal, representing a luminance of the object A, is retrieved as a luminance data from the photometry measurement circuit 22 by the system control circuit 40. Then, at step S1248, an exposure-calculation routine is executed. By executing the exposure-calculation routine, a shutter speed data for the focal-plane shutter 45 is calculated on the basis of the retrieved luminance data. Also, when the automatic program mode is selected, a stop value data for the diaphragm is further calculated on the basis of the retrieved luminance data.

Note, the exposure-calculation routine is explained in detail hereinafter with reference to FIGS. 30 and 31.

At step S1249, it is determined whether the photometry measurement switch 12a is still in the ON-state. When the photometry measurement switch 12a is in the ON-state, the control proceeds to step S1251, in which it is determined whether the release switch 12b has been turned ON, i.e. whether the release switch button 12 has been fully depressed. If the release switch 12b is in the OFF-state, the control returns to step S1247.

Namely, the routine comprising steps S1247, S1248, S1249 and S1251 is repeated until the release switch 12b is turned ON. During the execution of the routine comprising steps S1247, S1248, S1249 and S1251, if the photometry measurement switch 12a is turned OFF, i.e. if the partial depression of the release switch button 12 is emancipated, due to, for example, the photographing operation concerned being canceled, the control immediately returns to the main routine of FIG. 27.

At step S1251, when the turn-ON of the release switch 12b is confirmed, the control proceeds to step S1252, in which it is determined whether the self-timer switch 35 is in the ON-state. When the turn-ON state of the self-timer switch 35 is confirmed, the control proceeds to step S1253, in which a self-timer/processing routine is executed. In the execution of the self-timer/processing routine, it is monitored whether a time period of 10 sec has elapsed, and the self-timer lamp 66 is blinked ON and OFF during the time period of 10 sec.

After it is confirmed that the time period of 10 sec has elapsed, the self-timer lamp 66 is turned OFF, and then the control proceeds to step 1254. On the other hand, at step S1252, when the turn-ON state of the self-timer switch 35 is not confirmed, the control directly proceeds from step S1252 to step 1254.

In either event, at step 1254, it is determined whether the automatic program mode is selected. When the selection of the automatic program mode is confirmed, the control proceeds to step S1255, in which a stop-value setting routine is executed. In the execution of the stop-value setting routine, the diaphragm is given a setting of the calculated stop value data, which is obtained by the execution of the an exposure-calculation routine (S1248).

After the setting of the calculated stop value data in the diaphragm, the control proceeds to step S1256. On the other hand, when the selection of the automatic program mode is not confirmed, the control directly proceeds from step 1254 to step S1256. Note, of course, when the automatic program mode is not selected, a stop value data of the diaphragm is manually set, as stated above.

In either event, at step S1256, an exposure-controlling routine is executed. In executing the exposure-controlling routine, the focal-plane shutter 45 is operated in accordance with the calculated shutter speed data, which is obtained by the execution of the an exposure-calculation routine (S1248).

Note, the exposure-controlling routine is explained in detail with reference to FIGS. 32, 33 and 34.

After the execution of the exposure-controlling routine, the control proceeds to step S1257, in which a film-feeding routine is executed. In the execution of the film-feeding routine, the film-feeding motor M1 is driven such that the film is wound on from the film cartridge by a length corresponding to one frame. Then, at step S1258, it is determined whether the film has ended. If more film remains, the control returns to the main routine of FIG. 27. At step S1258, if the end of the film is confirmed, the control proceeds to step S1259, in which a film-rewinding routine is executed, whereby the film-feeding motor M1 is reversely driven until the film is rewound.

Figure 30:
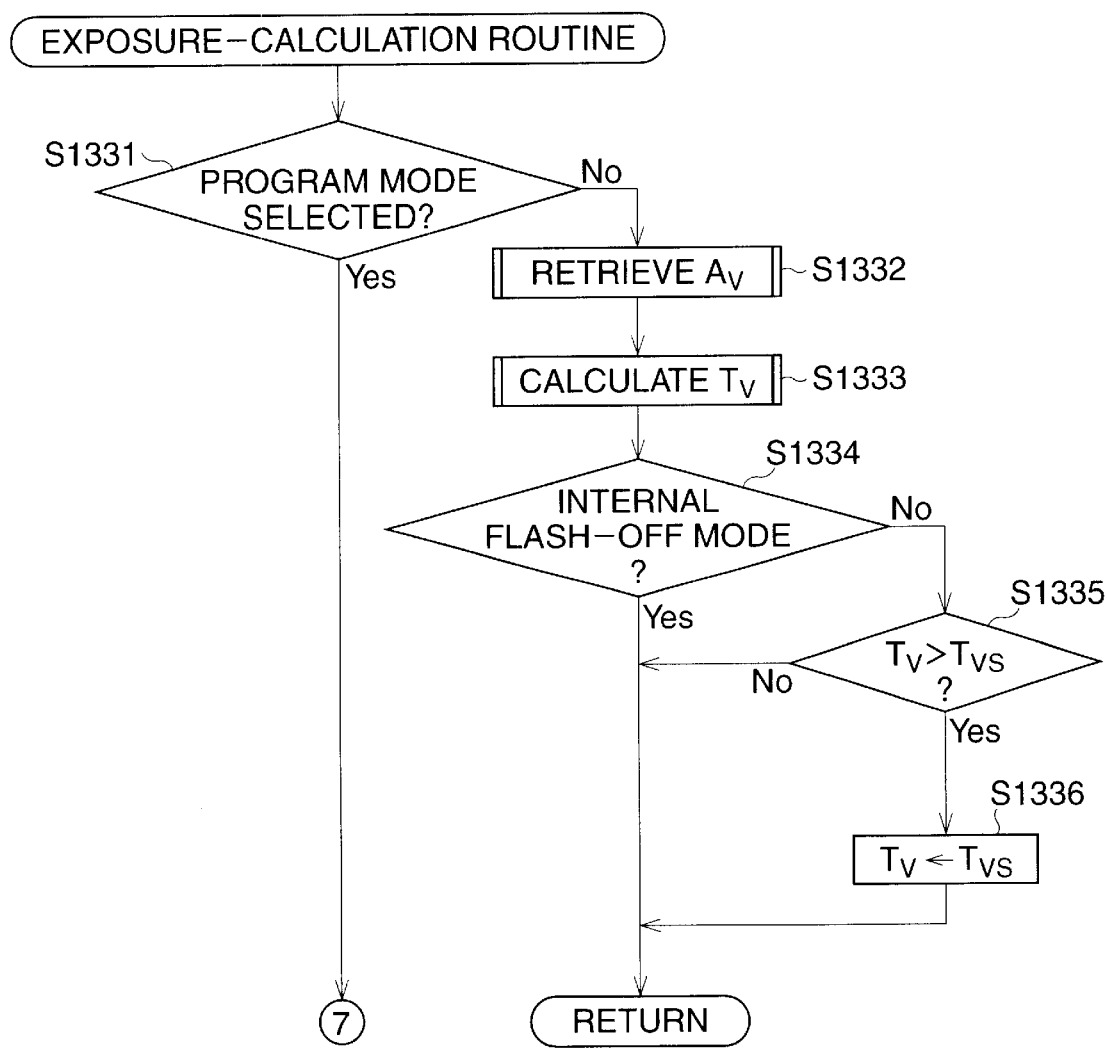
FIG. 30 is a part of a flowchart of an exposure-calculation routine executed in the photographing operation routine of FIGS. 28 and 29.
Figure 31:
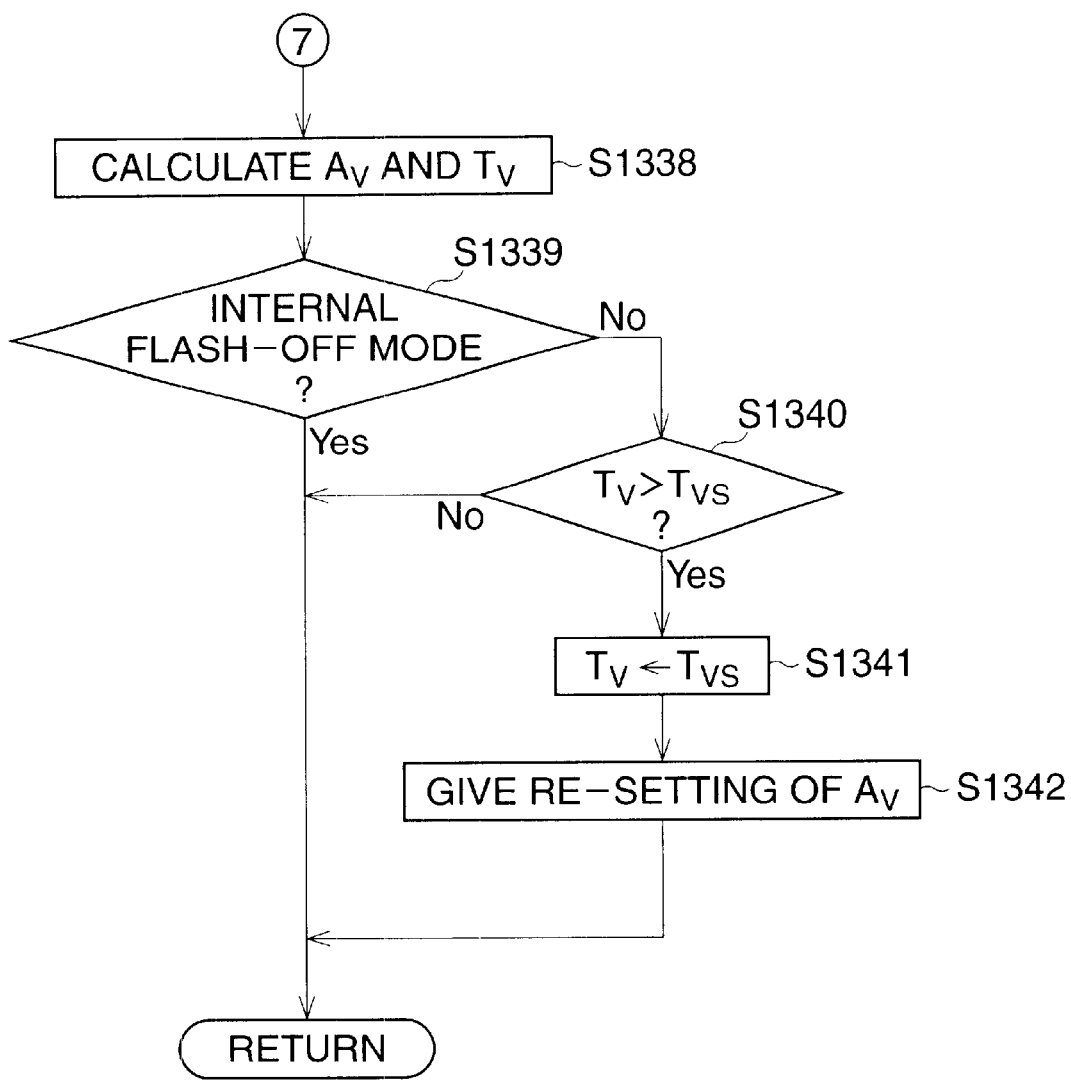
FIG. 31 is the remaining part of the flowchart of the exposure-calculation routine executed in the photographing operation routine of FIGS. 28 and 29.

FIGS. 30 and 31 show a flowchart of the exposure-calculation routine executed in step S1248 of the photographing operation routine of FIGS. 28 and 29.

At step S1331, it is determined whether the automatic program mode is selected. When the automatic program mode is not selected, i.e. when the manual mode is selected, the control proceeds to step S1332, in which a stop value data $A_V$ is retrieved from the manual stop-value-setter 29a. Then, at step S1333, a shutter speed data $T_V$ is calculated, using the retrieved stop value data $A_V$, on the basis of the APEX system. Namely, the calculation of the shutter speed data $T_V$ is based on the following equation:

$$T_V = B_V + S_V - A_V$$

Herein: of course, $B_V$ represents the luminance data retrieved from the photometry measurement circuit 22 (S1247); and $S_V$ represents the DX code data or sensitivity of the photographic film concerned detected by the DX code detector circuit 26 (S1206).

At step S1334, it is determined whether the internal flash-OFF mode is selected. When the internal flash-OFF mode is selected, i.e. when the built-in flash device 16' is not allowed to emit a flash-light upon photographing, the control immediately returns to the photographing operation routine of FIGS. 28 and 29.

On the other hand, when the internal flash-OFF mode is not selected, i.e. when the built-in flash device 16' is allowed to emit a flash-light upon photographing (e.g. the internal flash-ON mode or the external flash-ON mode), the control proceeds from step S1334 to step S1335, in which it is determined whether the calculated shutter speed data $T_V$ is larger than a flash-synchronous shutter speed data $T_{VS}$.

Note, the flash-synchronous shutter speed data $T_{VS}$ is defined as a fastest shutter speed that ensures a full opening of the focal-plane shutter 45. In other words, such a shutter speed may be defined as a time period counted from a time, at which the leading shutter curtain is released from the first position, to a time, at which the trailing shutter curtain is released from the first position which occurs as soon as the leading shutter curtain reaches the second position. Usually, the flash-synchronous shutter speed data $T_{VS}$ may be a shutter speed of 1/125 sec.

At step S1335, if $T_V > T_{VS}$, the control proceeds to step S1336, in which the calculated shutter speed data $T_V$ is given a setting of the flash-synchronous shutter speed data $T_{VS}$. Namely, whenever the calculated shutter speed data $T_V$ is larger than the flash-synchronous shutter speed data $T_{VS}$, the calculated shutter speed data $T_V$ is handled as the flash-synchronous shutter speed data $T_{VS}$. Thereafter, the control returns to the photographing operation routine of FIGS. 28 and 29.

On the other hand, at step S1335, if $T_V \leq T_{VS}$, the control immediately returns to the photographing operation routine of FIGS. 28 and 29. In this case, of course, the calculated shutter speed data $T_V$ is handled as it stands.

At step S1331, when the automatic program mode is selected, the control proceeds to step S1338, in which a stop value data $A_V$ and a shutter speed data $T_V$ are calculated on the basis of the luminance data $B_V$, retrieved from the photometry measurement circuit 22 (S1247), and the DX code data $S_V$ or sensitivity of the photographic film concerned, detected by the DX code detector circuit 26 (S1206).

At step S1339, it is determined whether the internal flash-OFF mode is selected. When the internal flash-OFF mode is selected, i.e. when the built-in flash device 16' is not allowed to emit a flash-light upon photographing, the control immediately returns to the photographing operation routine of FIGS. 28 and 29.

On the other hand, when the internal flash-OFF mode is not selected, i.e. when the built-in flash device 16' is allowed to emit a flash-light upon photographing (e.g. the internal flash-ON mode or the external flash-ON mode), the control proceeds from step S1339 to step S1340, in which it is determined whether the calculated shutter speed data $T_V$ is larger than the flash-synchronous shutter speed data $T_{VS}$ as defined above.

At step S1340, if $T_V > T_{VS}$, the control proceeds to step S1341, in which the calculated shutter speed data $T_V$ is given a setting of the flash-synchronous shutter speed data $T_{VS}$. Namely, whenever the calculated shutter speed data $T_V$ is larger than the flash-synchronous shutter speed data $T_{VS}$, the calculated shutter speed data $T_V$ is handled as the flash-synchronous shutter speed data $T_{VS}$. Then, at step 1342, the calculated shutter speed data $T_V$ is revised on the basis of the change of the calculated shutter speed data $T_V$ into the flash-synchronous shutter speed data $T_{VS}$. Thereafter, the control returns to the photographing operation routine of FIGS. 28 and 29.

On the other hand, at step S1340, if $T_V \leq T_{VS}$, the control immediately returns to the photographing operation routine of FIGS. 28 and 29. In this case, of course, the calculated shutter speed data $T_V$ is handled as it stands.

Figure 32:
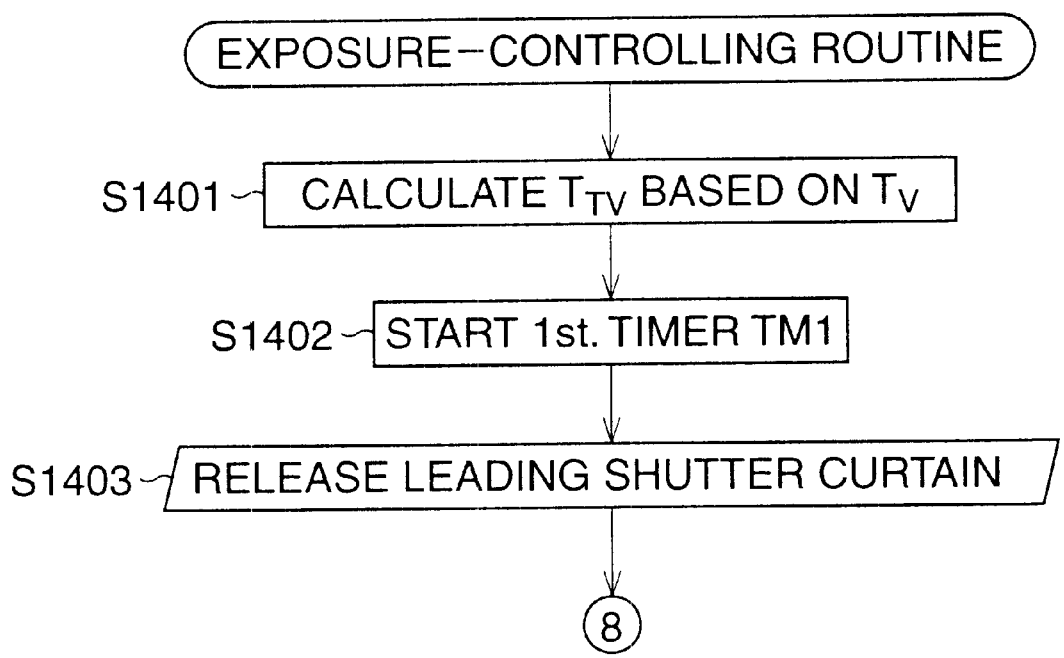
FIG. 32 is a part of a flowchart of an exposure-controlling routine executed in the photographing operation routine of FIGS. 28 and 29.
Figure 33:
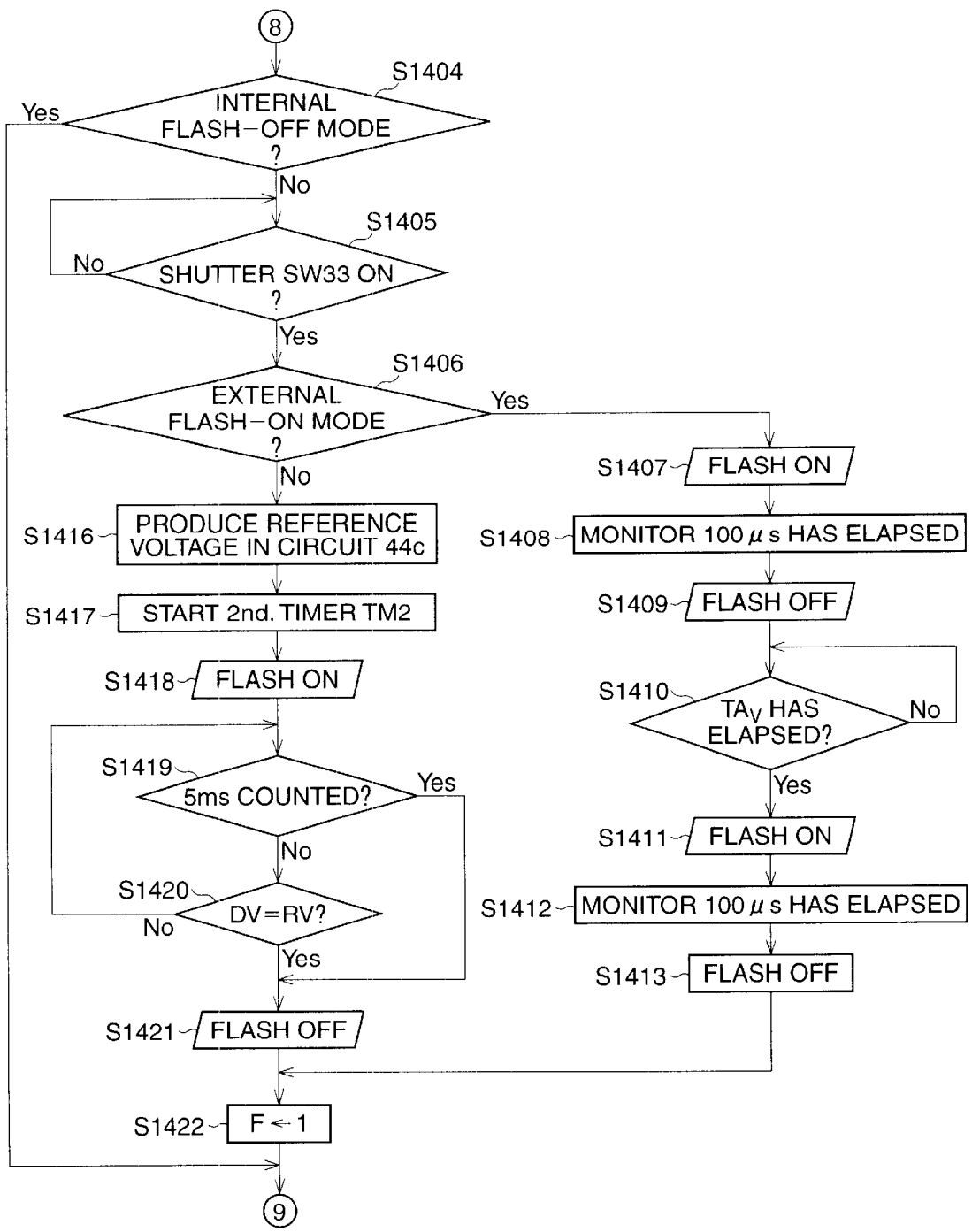
FIG. 33 is another part of the flowchart of the exposure-controlling routine executed in the photographing operation routine of FIGS. 28 and 29.
Figure 34:
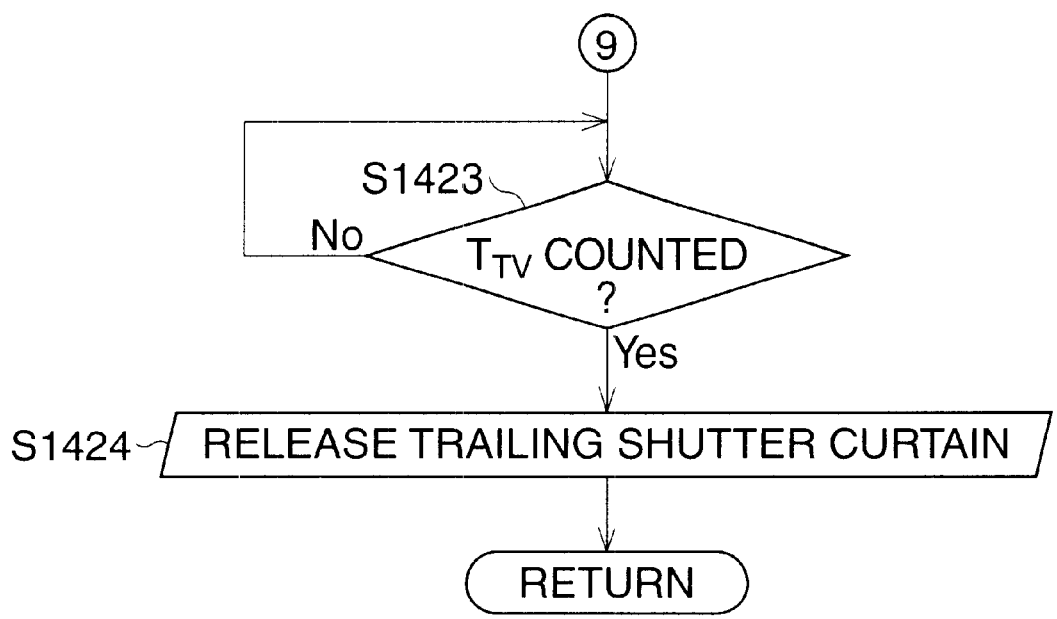
FIG. 34 is the remaining part of the flowchart of the exposure-controlling routine executed in the photographing operation routine of FIGS. 28 and 29.

FIGS. 32, 33 and 34 show a flowchart of the exposure-controlling routine executed in step S1256 of the photographing operation routine of FIGS. 28 and 29.

At step S1401, a duration of shutter-open time $T_{TV}$ for focal-plane shutter 45 is calculated on the basis of the shutter speed data $T_V$ obtained by the execution of the exposure-calculation routine of FIGS. 30 and 31. Then, at step S1402, the calculated shutter-open duration time $T_{TV}$ is set in a first timer TM1, and a time-counting is started by the first timer TM1. Subsequently, at step S1403, the leading shutter curtain of the focal-plane shutter 45 is released from the first position so as to be elastically moved toward the second position, thereby opening the focal-plane shutter 45.

Note, the first timer TM1 may be defined in the system control circuit 40, and is utilized to count shutter-open duration time $T_{TV}$.

At step S1404, it is determined whether the internal flash-OFF mode has been selected. When the selection of the internal flash-OFF mode is confirmed, i.e. when a flash-light emission of the built-in flash device 16' is not allowed upon photographing, the control jumps to step S1423, in which it is monitored whether the shutter-open duration time $T_{TV}$ has been counted by the first timer TM1. When it is confirmed that the shutter-open duration time $T_{TV}$ has been counted by the first timer TM1, the control proceeds to step S1424, in which the trailing shutter curtain is released from the first position so as to be elastically moved toward the second position, thereby closing the focal-plane shutter 45. Thereafter, the control returns to the photographing operation routine of FIGS. 28 and 29.

At step S1404, when the selection of the internal flash-OFF mode is not confirmed, i.e. when a flash-light emission of the built-in flash device 16' is allowed upon photographing, the control proceeds to step S1405, in which it is monitored whether the shutter switch 33 has been turned ON. When the turn-ON of the shutter switch 33 is confirmed, i.e. when it is confirmed that the leading shutter curtain has reached the second position, the control proceeds to step S1406, in which it is determined whether the external flash-ON mode is selected.

At step S1406, when the external flash-ON mode is not selected, i.e. when the object A is photographed with a flash-light emission of the built-in flash 16', the control proceeds to step S1416, in which a reference voltage is produced in the reference-voltage setting circuit 44c on the basis of the DX code data, detected by the DX code detector circuit 26, and so on, and is retrieved as a reference voltage data RV by the system control circuit 40 from the reference-voltage setting circuit 44c. Note, as stated above, the produced reference voltage corresponds to an amount of a flash-light to be emitted from the built-in flash device 16' to photograph the object A with a proper exposure.

At step S1417, a suitable time period of, for example, 5 ms is set in a second timer TM2, and a time-counting is started by the second timer TM2. Then, at step S1418, a trigger signal is output from the system control circuit 40 to the IGBT of the flash-light-emission control circuit 16d, thereby turning ON the IGBT, resulting in energization of the xenon lamp 16c by discharging the electrical charges from the main capacitor 16b.

Thus, a flash-light emission of the built-in flash device 16' is started, whereby a part of the flash-light emission of the built-in flash device 16' is detected as a reflected light by the photo-sensor of the TTL light-receiver circuit 44a, resulting in development of a voltage in the integration circuit 44b, and the developed voltage is retrieved as a voltage data DV by the system control circuit 40 from the integration circuit 44b.

At step S1419, it is determined whether the time period of 5 ms has been counted by the second timer TM2. When the counted time of the second timer TM2 has not reached the time period of 5 ms, the control proceeds to step S1420, in which it is determined whether the retrieved voltage data DV has reached the reference voltage RV obtained from the reference-voltage setting circuit 44c. If the retrieved voltage data DV has not reached the reference voltage RV, the control returns to step S1419.

Namely, the routine comprising steps S1419 and S1420 is repeated until either the time period of 5 ms has been counted by the second timer TM2 or the retrieved voltage data DV has reached the reference voltage RV. When the time period of 5 ms has been counted by the second timer TM2, or when the retrieved voltage data DV has reached the reference voltage RV, the control proceeds to step S1421, in which the flash-light emission of the built-in flash device 16' is stopped.

Note, the setting of 5 ms in the second timer TM2 is selected as a time long enough to control an amount of the flash-light emission of the built-in flash device 16'. Thus, even if the TTL light-receiver circuit 44a fails to properly detect the light-flash emission of the built-in flash device 16', so that the retrieved voltage data DV cannot reach the reference voltage RV, the flash-light emission of the built-in flash device 16' is forcibly stopped after the time period of 5 ms has elapsed.

After the flash-light emission of the built-in flash device 16' is stopped, the control proceeds from step S1421 to step S1422, in which the charge-requiring flag F is made to be "1". Then, at step S1423, it is monitored whether the shutter-open duration time $T_{TV}$ has been counted by the first timer TM1. When it is confirmed that the shutter-open duration time $T_{TV}$ has been counted by the first timer TM1, the control proceeds to step S1424, in which the trailing shutter curtain is released from the first position so as to be elastically moved toward the second position, thereby closing the focal-plane shutter 45. Thereafter, the control returns to the photographing operation routine of FIGS. 28 and 29.

At step S1406, when the external flash-ON mode is selected, the control proceeds to step S1407, in which a trigger signal is output from the system control circuit 40 to the IGBT of the flash-light-emission control circuit 16d, thereby turning ON the IGBT, resulting in energization of the xenon lamp 16c by discharging the electrical charges from the main capacitor 16b. Thus, a flash-light emission of the built-in flash device 16' is started.

Then, at step S1408, it is monitored whether a very short time of, for example, 100 µs has elapsed. When it is confirmed that the very short time of 100 µs has elapsed, the control proceeds to step S1409, in which the outputting of the trigger signal from the system control circuit 40 to the IGBT of the flash-light-emission control circuit 16d is stopped, thereby turning OFF the IGBT, resulting in de-energization of the xenon lamp 16c. Thus, the flash-light emission of the built-in flash device 16' is stopped.

In short, the flash-light emission of the built-in flash device 16' is continued over the very short time of 100 µs, and is thus received as a first light-pulse signal by the external flash device 100.

At step S1410, it is determined whether a time period, corresponding a time interval data $TA_V$, has elapsed. Note, the time interval data $TA_V$ is calculated as an exposure factor to be transmitted to the external flash device 100, on the basis of the calculated stop value data $A_V$ obtained by the exposure-calculation routine of FIGS. 30 and 31. Note, the calculation of the time interval data $TA_V$ may be performed by referring to, for example, a look-up table based on a relationship between stop value data ($A_V$) and time interval data ($TA_V$) and included in the system control circuit 40.

At step S1410, when it is confirmed whether the time period, corresponding the time interval data $TA_V$, has elapsed, the control proceeds to step S1411, in which a trigger signal is again output from the system control circuit 40 to the IGBT of the flash-light-emission control circuit 16d, thereby turning ON the IGBT, resulting in energization of the xenon lamp 16c by discharging the electrical charges from the main capacitor 16b. Thus, a flash-light emission of the built-in flash device 16' is again started.

Then, at step S1412, it is monitored whether a very short time of, for example, 100 µs has elapsed. When it is confirmed that the very short time of 100 µs has elapsed, the control proceeds to step S1413, in which the outputting of the trigger signal from the system control circuit 40 to the IGBT of the flash-light-emission control circuit 16d is stopped, thereby turning OFF the IGBT, resulting in de-energization of the xenon lamp 16c. Thus, the flash-light emission of the built-in flash device 16' is stopped.

In short, the second flash-light emission of the built-in flash device 16' is also continued over the very short time of 100 µs, and is thus received as a second light-pulse signal by the external flash device 100.

Then, at step S1422, the charge-requiring flag F is made to be "1". Subsequently, at step S1423, it is monitored whether the shutter-open duration time $T_{TV}$ has been counted by the first timer TM1. When it is confirmed that the shutter-open duration time $T_{TV}$ has been counted by the first timer TM1, the control proceeds to step S1424, in which the trailing shutter curtain is released from the first position so as to be elastically moved toward the second position, thereby closing the focal-plane shutter 45. Thereafter, the control returns to the photographing operation routine of FIGS. 28 and 29.

As is apparent from the exposure-controlling routine of FIG. 32, the emission of the first and second light-pulses from the built-in flash device 16' is performed just after the shutter switch 33 has been turned ON (S1405), i.e. after the leading shutter curtain has reached the second position. This is because a time period for the movement of the leading shutter curtain from the first position to the second position is not necessarily constant.

Of course, when the first and second light-pulse signals are received by the external flash device 100, a flash-light is emitted from the external flash device 100 in substantially the same manner as mentioned hereinbefore. Namely, the second light-pulse serves as a trigger signal for initiating the flash-light emission of the external flash device 100, and a total amount of the flash-light emission of the external flash device 100 corresponds to the time interval data $TA_V$ between the emissions of the first and second light-pulse signals.

In the aforesaid second embodiment, a timing of the flash-light emission of the external flash device 100 is somewhat postponed from the time at which the focal-plane shutter 45 is fully opened, i.e. at which the shutter switch 33 is turned ON (S1405). Namely, the timing of the flash-light emission of the external is postponed for a time corresponding to the time interval data $TA_V$. Nevertheless, this postponement is negligible, because the time interval data $TA_V$ is set within a range of 2 ms, and because a longest flash-light emission time of the external flash device 100 is 5 ms. In short, the total time 7 ms is substantially smaller than the aforesaid flash-synchronous shutter speed $T_{VS}$ (1/125 sec).

As is apparent from the foregoing, according to the flash control system of the present invention, when a wireless mode is selected in an external flash device, an exposure factor or stop value, necessary to photograph an object with a proper exposure, can be transmitted from a camera to the external flash device. Thus, a flash-light emission of the external flash device in the wireless mode can be properly controlled.

Finally, it will be understood by those skilled in the art that the foregoing description is of preferred embodiments of the system, and that various changes and modifications may be made to the present invention without departing from the spirit and scope thereof.

The present disclosure relates to subject matter contained in Japanese Patent Application No. 11-076232 (filed on Mar. 19, 1999) which is expressly incorporated herein, by reference, in its entirety.

What is claimed is:

1. A flash control system for remotely controlling an external flash device by a camera associated with said external flash device, said system comprising:

a stop value calculator, incorporated in said camera, that calculates a stop value as an exposure factor for said external flash device;

a light signal source, incorporated in said camera, that emits a light signal;

a light signal controller, incorporated in said camera, that controls said light signal source to emit at least two light signals therefrom at a time interval such that said stop value is represented by said time interval between said at least two light signals;

a light signal detector, incorporated in said external flash device, that detects said at least two light signals emitted from said light signal source; and a flash-light emission controller, incorporated in said external flash device, that controls an amount of flash-light emission of said external flash device in accordance with said time interval between said at least two light signals.

2. A flash control system as set forth in claim 1, wherein the calculation of said stop value by said stop value calculator is based on at least a photometry measurement performed by said camera upon photographing.

3. A flash control system as set forth in claim 1, wherein said light signal source comprises a flash lamp of a built-in flash device incorporated in said camera.

4. A flash control system as set forth in claim 1, further comprising a flash-light emission timing calculator, incorporated in said camera, that calculates a flash-light emission timing at which a flash-light should be emitted from said external flash device, wherein said light signal controller further controls an emission of one of said at least two light signals such that said flash-light emission timing is represented by the emission of said one of said at least two light signals, and said flash-light emission controller further controls a timing of the flash-light emission of said external flash device in accordance with the emission of said one of said at least two light signals.

5. A flash control system as set forth in claim 4, wherein the control of the timing of the flash-light emission of said external flash device by said flash-light emission controller is based on a last light signal of said at least two light signals.

6. A flash control system as set forth in claim 1, wherein said flash-light emission controller includes:

a light detector that detects the flash-light emission of said external flash device as a reflected light;

a first processor that processes the reflected light, detected by said light detector, to produce a first light-quantitative data representing an amount of the reflected light;

a second processor that processes said time interval to produce a second light-quantitative data deriving from said stop value; and a comparator that compares said first light-quantitative data with said second light-quantitative data, such that the flash-light emission of said external flash device is stopped when it is determined by said comparator that the first-quantitative data coincides with said second light-quantitative data.

7. A flash control system as set forth in claim 6, wherein said light detector comprises said light signal detector for detecting said at least two light signals.

8. An external flash device comprising:

a flash lamp that emits a flash-light;

a light signal detector that detects two light signals emitted at a time interval representing a stop value as a photographic exposure factor; and a flash-light emission controller that controls an amount of a flash-light emission of said flash lamp in accordance with said time interval between said at least two light signals.

9. An external flash device as set forth in claim 8, further comprising a timing controller that controls a timing of the flash-light emission of said flash lamp on the basis of a detected-timing at which one of said at least two light signals is detected by said light signal detector.

10. An external flash device as set forth in claim 9, wherein the control of the timing of the flash-light emission of said flash lamp by said flash-light emission controller is based on a last light signal of said at least two light signals.

11. An external flash device as set forth in claim 8, wherein said flash-light emission controller includes:

a light detector that detects the flash-light emission of said external flash device as a reflected light;

a first processor that processes the reflected light, detected by said light detector, to produce a first light-quantitative data representing an amount of the reflected light;

a second processor that processes said time interval to produce a second light-quantitative data deriving from said stop value; and a comparator that compares said first light-quantitative data with said second light-quantitative data, such that the flash-light emission of said flash lamp is stopped when it is determined by said comparator that the first-quantitative data coincides with said second light-quantitative data.

12. An external flash device as set forth in claim 11, wherein said light detector comprises said light signal detector for detecting said at least two light signals.

13. A camera comprising:

a stop value calculator that calculates a stop value as a photographic exposure factor for an external flash device;

a light signal source that emits a light signal to said external flash device; and a light signal controller that controls said light signal source to emit at least two light signals therefrom at a time interval such that said stop value is represented by said time interval between said at least two light signals.

14. A camera as set forth in claim 13, wherein said light signal source comprises a flash lamp of a built-in flash device incorporated in said camera.

15. A camera as set forth in claim 13, wherein the calculation of said stop value by said stop value calculator is based on at least a photometry measurement performed by said camera upon photographing.

16. A camera as set forth in claim 13, further comprising a flash-light emission timing calculator that calculates a flash-light emission timing at which a flash-light should be emitted from said external flash device, wherein said light signal controller further controls the emission of said at least two light signals such that said flash-light emission timing is represented by an emission of one of said at least two light signals.

17. A flash control system as set forth in claim 16, wherein the control of the emission of said at least two light signals by said light signal controller is performed such that said flash-light emission timing is represented by an emission of a last light signal of said at least two light signals.

18. A camera as set forth in claim 17, wherein said camera comprises a lens shutter type camera, and a timing of the emission of the last light signal of said at least two light signals coincides with a time at which an aperture of a shutter of said lens shutter type camera reaches a maximum aperture during an opening-action of said shutter.

19. A camera as set forth in claim 17, wherein said camera comprises a single lens reflex type camera, and a timing of an emission of a first light signal of said at least two light signals coincides with a time, at which a leading shutter curtain of a focal-plane shutter of said single lens reflex type camera reaches an end position thereof.

* * * * *